US011873651B2

(12) United States Patent
Akchurin

(10) Patent No.: US 11,873,651 B2
(45) Date of Patent: Jan. 16, 2024

(54) SUSTAINABLE NET ZERO MODULAR BUILDING AND ASSEMBLY METHOD

(71) Applicant: Akchurin Inc, New York, NY (US)

(72) Inventor: Chingiz Akchurin, New York, NY (US)

(73) Assignee: Akchurin Inc, New York, NY (US)

( * ) Notice: Subject to any disclaimer, the term of this patent is extended or adjusted under 35 U.S.C. 154(b) by 343 days.

(21) Appl. No.: 17/118,972

(22) Filed: Dec. 11, 2020

(65) Prior Publication Data

US 2021/0180334 A1 Jun. 17, 2021

Related U.S. Application Data

(60) Provisional application No. 62/946,669, filed on Dec. 11, 2019.

(51) Int. Cl.

| | |
|---|---|
| ***E04F 17/04*** | (2006.01) |
| ***E04F 19/04*** | (2006.01) |
| ***E06B 3/70*** | (2006.01) |

(52) U.S. Cl.

CPC .............. *E04F 17/04* (2013.01); *E04F 19/04* (2013.01); *E06B 3/70* (2013.01); *E04F 2019/044* (2013.01); *E06B 2003/7059* (2013.01); *E06B 2003/7094* (2013.01)

(58) Field of Classification Search

CPC .... E04F 17/04; E04F 2019/044; E06B 1/528; E06B 1/30; E06B 7/10; E06B 3/70; E06B 2003/7094; E06B 2003/7059

See application file for complete search history.

(56) References Cited

U.S. PATENT DOCUMENTS

| | | | | |
|---|---|---|---|---|
| 3,861,099 A * | 1/1975 | Faudree | E06B 1/18 52/211 |
| 10,337,238 B1 * | 7/2019 | Crittenden | F24F 7/003 |
| 2008/0237559 A1 * | 10/2008 | Marchio | E06B 11/02 49/56 |

FOREIGN PATENT DOCUMENTS

| | | | |
|---|---|---|---|
| DE | 202013101937 U1 * | 11/2013 | E06B 7/10 |
| FR | 3003292 A1 * | 9/2014 | E06B 5/16 |
| WO | WO-2004025047 A1 * | 3/2004 | E04F 13/0869 |
| WO | WO-2008068792 A2 * | 6/2008 | E06B 1/00 |

* cited by examiner

*Primary Examiner* — Christine T Cajilig

(74) *Attorney, Agent, or Firm* — Outlier Patent Attorneys, PLLC

(57) ABSTRACT

Disclosed is a system and method of constructing modular homes, which are assembled from a numbered of prefabricated components and delivered as finished goods using standard containers. The modular design further provides for a self-sufficient structure where the three main engineering systems, namely, plumbing, electrical and HVAC, are completely integrated allowing the structure to maximize energy usage efficiencies. Emphasis is placed on using only environmentally friendly materials and on recycle or multi-purposing components into energy or resource gathering and production. Another emphasis is placed on speed of assembly using standardized structures that streamline on the job assembly processes.

20 Claims, 52 Drawing Sheets

Fig. 9B
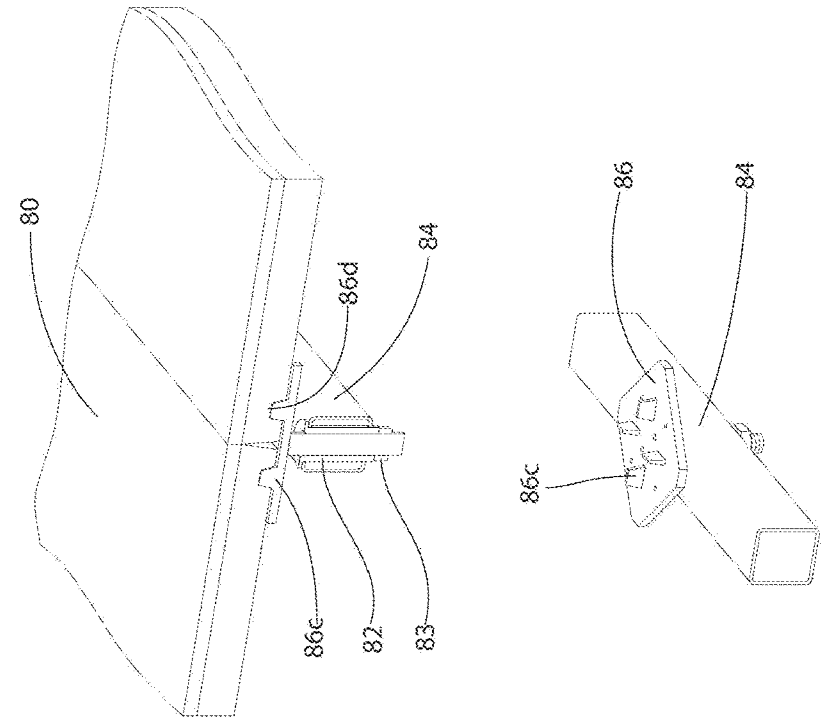
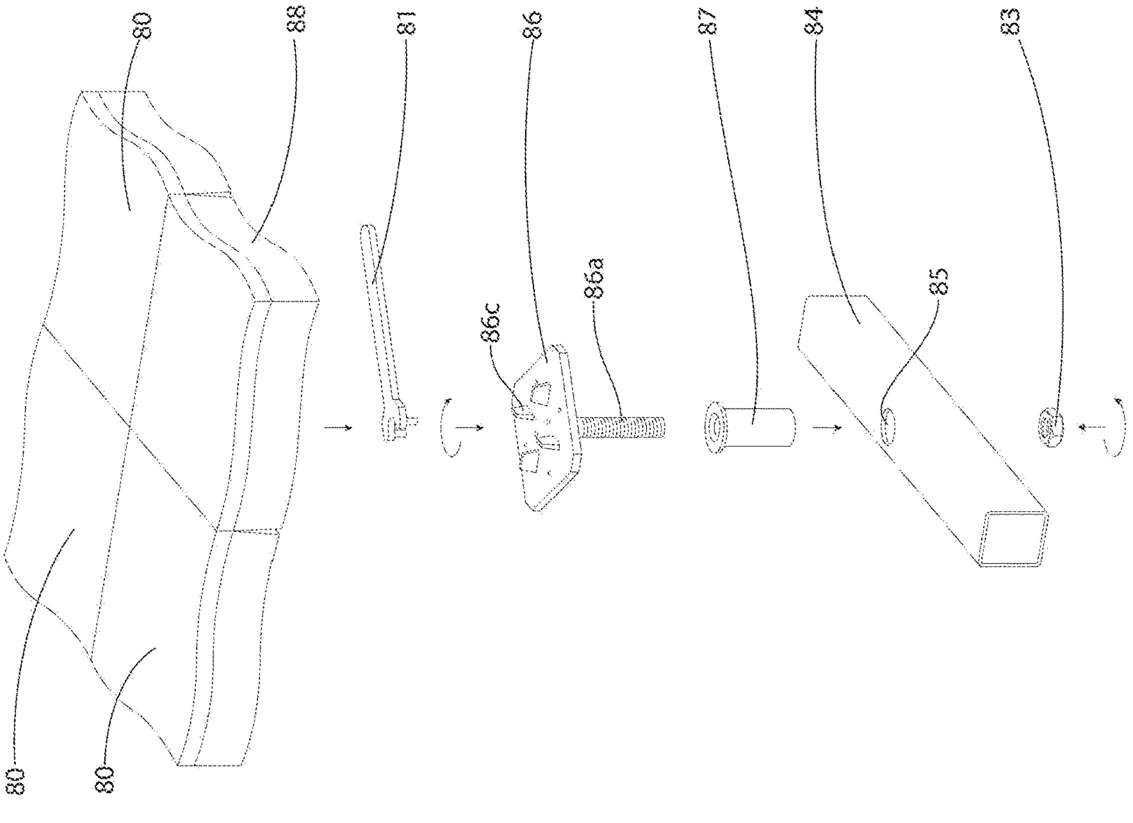
Fig. 9A

SUSTAINABLE NET ZERO MODULAR BUILDING AND ASSEMBLY METHOD

CLAIM OF PRIORITY

This application claims priority of U.S. Provisional Application No. 62/946,669 filed on Dec. 11, 2019, the contents of which are fully incorporated herein by reference.

FIELD OF THE INVENTION

The present invention relates to modular structures designed to be constructed using green technologies and environmentally responsible materials. The disclosed resultant modular structure is environmentally hermetically sealed and is capable of being entirely self-sufficient with regard to supply of water and energy.

BACKGROUND OF THE INVENTION

Presently all construction begins at ground level and works its way up until the roof and façade are installed. The first step in existing construction methodologies begin with the pouring of a cement footing and the buildup of the cement tub or a cinderblock foundation. Anchors and beams are installed on top of this and more concrete is poured to form the first floor. For residential two- or three-story construction, the floors are assembled using wooden trusses supporting plywood sheets for walls and floor partitions.

The walls and beams for each floor are then installed using the lower floor as support. Each floor is assembled brick by brick and beam by beam until the desired size, layout and structural stiffness is achieved. The process is repeated for each floor, until the roof is installed. Once the exterior is completed, engineers lay out wiring, plumbing and air conditioning ducts along walls, ceiling and floor. Mechanical equipment is then installed, typically at the lowest level and all pipes, wires and ducts are connected to this equipment and deployed throughout the structure. The deployed ducts, wiring and piping is then permanently covered with drop ceilings, raised floors and drywall. Windows, glass and doors are then installed, typically one at a time.

When drywall is installed, openings are reserved for installation of fixtures and outlets. Other accents, such as moldings, wallpaper and paint are applied in one of the last steps. Flooring is then brought in and installed. At some point during construction, stairs are planned and installed, generally using prefabricated sections that were custom made for the particular project.

The process described above takes from several months to several years to complete and requires thousands of hours of labor to plan, coordinate and implement. Every component is manufactured separately without regard to any other component, and without regard to the ultimate result. These separate components are then cobbled together to form a structure that must contain all required and requested functionality and amenities.

The disclosed invention simplifies and streamlines construction of structures and makes it a predictable and consistent process. All components are manufactured or assembled at a factory and delivered to the project site in a fully assembled state. These components are then connected together on site using predetermined and prepared couplers and connectors. The three main engineering systems, mainly plumbing, electrical/automation and interior temperature control, are integrated and held within floor panels. These floor panels are mounted directly on load bearing axis columns that are embedded within foundation. The same axis columns provide support for upper floors, that utilize the same floor panels. The floor panels present connectors to easily couple to engineering systems of adjacent, overhead or lower floor panels ensuring seamless continuity. Ducts, pipes and electrical wiring is channeled to upper floors through designated ducts that are easily accessible for repairs and maintenance. The upper floors present couplers to these pipes, wirings and ducts and the assembly process is repeated for each floor, until the roof and façade are installed using the same process.

Infrastructure systems, such as the rain collection, solar panels, air conditioning cooling coils are traditionally situated beside the structure or on the roof of the structure. Exterior installation is ascetically unappealing, prone to degradation due to elements and is difficult to integrate with internal systems.

Conventional mechanical rooms are the nerve centers of any small or large-scale construction. Typical mechanical rooms include equipment for heating, air conditioning plumbing and electricity. Each of these are independently produced and installed systems, often by different professional installers. Assembling a mechanical room requires considerable planning and careful coordination. Automation across these systems is usually impractical or impossible as devices are incompatible and professional installers lack the required skill to tie all systems together. The quality of each final installation is heavily dependent on labor and materials used and is never guaranteed.

In the disclosed invention, the nerve center is assembled at a factory as a complete mechanical block having all requisite systems preinstalled. These include, water tanks, water purifiers, blowers for the air conditioning, electrical consoles, heating and cooling units, ducts and tubes, etc. The fully assembled mechanical block is shipped to the construction site in a standard sized crate and is ready to be lifted off of a ship or a truck and placed directly unto connectors within a floor panel. Pipes and wiring hidden within each floor panel have connectors already in place to couple together with their counterparts in the mechanical block. The disclosed mechanical block is configured to be brought online within hours or days of delivery, versus months or years using conventional methods. Best of all, quality is consistent, and maintenance is predictable and readily accomplished.

The floor panels are shipped to readily couple with structural components, such as stairs, doors, and plumbing shafts (identified below as the bathroom shaft). Structural elements holding these structures, such as the frame in a door and beams in the bathroom shaft also function as ventilation shafts for the HVAC system.

The base floor system and the interfloor floor system are comprised of completed and interconnected floor panels. Presently, flooring, especially in high rise construction, is artificially raised above the concrete floor partition. This is done to conceal pipes, wires and ducts running beneath the floor, and to level any deformities introduced during construction. The disclosed floor system provides support members for finished flooring. These support members are able to control leveling for each floor member. Furthermore, each floor panel can be easily lifted to access infrastructure concealed within the floor panel. Each floor panel may also contain integrated heating or cooling coils.

Presently to build a structure, a designer and contractor assembles products from a myriad of manufacturers and designers. Once the structure is built, it is filled with technological adaptations and systems that are again designed by different disconnected and independent providers. The result is that a structure will contain devices that function within disparate or incompatible ecosystems, with designs that do not match and are difficult to set up and integrate.

Furthermore, basic implementation of interior décor has not changed since the widespread introduction of electricity at the turn of the twentieth century. Yet today all current and new structures are still being built with the same basic switches, outlets, lamps, wiring and plugs that produce clatter, represent danger to children and pets and which collect dust. These technologically antiquated solutions are also environmentally unfriendly due their emphasis on plastic implementation, thus adding to the plastic pollution threatening the global environment.

Rather than tying together disparate and incompatible solutions, the disclosed invention incorporates all required technologies into a single, ascetically clean embodiment, which creates a network of compatible solutions. The disclosed door system supports ventilation and automation systems and integrates all smart home devices into one ecosystem. This minimalist technology has built-in outlets and switches that are retractable and hidden from view to provide a safer and visually cleaner presentation. The automation ecosystem, enabled through the door system, integrates, mobile device chargers, electronically enabled locking systems, wireless network repeaters, universal serial bus connections as well as traditional electrical outlets.

One of the basic blocks of interior décor is lighting. Presently, each interior space will require its own custom-made lighting implementation. Which will necessarily require some form of ceiling or wall fixtures, that need to be wired and connected to individual switches. Elimination of dark spots requires floor and wall lighting solutions that are also individually wired and connected to individual switches. These solutions are highly inflexible and dictate human behavior and use of each interior space. Furthermore, repair, removal or addition of any new fixtures requires demolition and reconstruction of surrounding environments.

The disclosed invention obviates the need to make holes in ceiling, flooring and walls to deploy lighting. Instead the disclosed sky ceiling provides a seamless and uniform source of light for all interior spaces which turns the entire ceiling into a source of light that is infinitely adjustable, responsive and configurable. There will no longer be a need to change a lightbulb or purchase a lamp as all. The disclosed lighting system is responsive to the particular use of an interior space with a switch of a button or a remote command.

As in the case of lighting, the traditional methodologies used for implementing heating, ventilation and air conditioning systems (HVAC), require a custom HVAC implementation for each new structure. The traditional HVAC implementation places, ventilation ducts, coils, diffusers and ducts in areas that sometimes, but not always, maximize effectiveness sand efficiency of implementation. The existing HVAC implementation are inherently inconsistent and are often unseemly and obtrusive, requiring loss of space in the ceiling, walls and flooring to accommodate ductwork and other components.

Existing methodologies require the placement of convectors and fan coils by borrowing from space that would normally function as ceiling or flooring. Such placement results in loss of ceiling space. Furthermore, placing anything in the ceiling is impractical as it is difficult to access to perform repairs and routine maintenance. Furthermore, all existing HVAC installations are slow to erect and almost always carry quality concerns. There are all consequences of onsite where oversight and quality control are limited and inconsistent.

On the contrary, the disclosed invention discloses a system where the ceiling and wall space is liberated from ducts, vents and holes for lighting. All electrical, plumbing and HVAC components are hidden within a floor panel. All components are readily accessible for repair and maintenance. All systems are interrelated and provide a uniform, factory installed consistency in quality and construction. No system requires a piece meal construction, but rather comes redeployed with installation of each floor panel. A complete plug-and-use configuration.

Existing high-rise construction methodologies result in long construction timelines. Each project requires erection of concrete columns that support curtain wall support structure. These are followed by glazing and façade cladding. These are not repeatable processes, rather each project requires a separate implementation of these methodologies.

On the contrary, the disclosed construction methodology is equally effective in low rise residential structures, as well as high rise, commercial buildings. The disclosed load bearing column system provides a four in one solution by a) functioning as curtain wall system, b) providing support for each fully integrated floor panel; c) securing each floor panel within a consistent and repeatable process and providing a mounting point for energy efficient and hermetically sealed windows; and which form a strong, virtually ageless façade hat uses only environmentally responsible materials. The load bearing columns as well as base and interfloor floor system function as a stackable assembly kit for any construction and thus reduce construction time and labor costs, while also improving quality and consistency of the finished structures.

Conventionally, interior spaces are built using a lattice of intersecting support members which are crisscrossed by a network of plumbing pipes and electrical conduits. These networks are then closed by affixing drywall sheets to the intersecting support members. This method is impractical, and difficult and expensive to maintain as any repair or modification requires a demolition of a section of drywall, followed by reconstruction and repaint and refinish. Drywall is also ecologically ruinous since it cannot be reused or recycled. It has also been shown that decomposing drywall leeches sulfate, hydrogen sulfide gas and other unhealthy chemicals.

The solution as disclosed in the present invention is to utilize repeatable and preconfigured wall panels, that are assembled from blocks, and which interact with other structural elements, such as columns and shafts. The wall panels are tied together using an internal structural stem. Such walls are solid and do not need demolition as they do not contain any wiring or plumbing components. Instead wiring and plumbing components are deployed using designated channels that are easily accessible through especially devised openings, channels and panels that are configured to be replaced or closed after maintenance or rework has been accomplished.

Since the present invention is a comprehensive solution covering the entire structure, attention must be given to its improvement of the existing bathroom and bath construction methodologies. Presently all bathroom construction occurs onsite and utilizes labor and materials available at hand or as procured by the specific contractor tasked with the work. Therefore, construction is non-uniform and highly inconsistent. Furthermore, traditional building materials include wood, metals and drywall. Due to the constant heat and moisture of the bathroom environment, these materials degrade, rot and grow mold, which leads to frequent repairs. Furthermore, both drywall and grout used in constructing bathroom spaces are porous materials, that are susceptible to bacterial infestation that is difficult or impossible to irradicate.

The solution is to remove all pipes from ceiling and floor and concentrate all required plumbing into a central shaft. The shaft is then enclosed into a polished steel tower that serves as a mount point for plumbing fixtures, faucets and drainage. Polished steel does not rust and is inherently antibacterial. All equipment is off the floor. The floor is formed from single slab of stone, presenting an easily accessible surface that is resistant to bacterial infestation. All equipment with the shaft is easily accessible through a concealed utility opening.

It is well known that low voltage lighting and fixtures require transformers to reduce conventional electric current to the required lower voltage. In the present state of the art, transformers are installed in a haphazard fashion on or close to the current consumer device that it services. Therefore, each installation of such low voltage device becomes a non-standard, one of deployment. Consequently, any repair or maintenance requires a professional to locate the elusive transformer, dismount the device itself, break through drywall or drop ceiling, or rummage through tight and low visibility spaces.

A better solution is to concentrate all critical connections in one location that is configured to provide lean and easy access to required equipment. In the disclosed device, the majority of lighting and fixtures are low voltage consumers. However, rather than mounting transforms on the devices or in close proximity to them, transformers are mounted on a console. Each transformer connection is identified and clearly labeled. In the event of an outage, or if a fixture needs to be disabled, one need only find the appropriate transformer on an easily accessible rack and service it appropriately. In the interest of safety, it is preferably to place such console within the mechanical block, isolated from the rest of the internal living space.

The roof of current structures offers an additional opportunity for clutter. Antennae, solar panels and air conditioning cooling units all find home on the roof. This convention causes leaks, lack of access, or access that is poor or dangerous, and usually creates an unsightly appearance. The solution would be to present a roof surface that is completely sealed against the elements. At the same time solar panels are laid out in an overlapping fashion as shingles. Moisture collected on the roof is then channeled into a drainage fold that conceals a series of discrete water rain collectors. A rainwater collector, while a well-known feature, is generally a bulky structure placed on the grounds of the property. On the contrary, in the present invention, the only visible portion is the collector opening. The pipes carrying water are concealed within one of the internal walls that double as section partitions for an internal shelving solution. The water is then stored and processed as drinking water within infrastructure mounted withing the floor panels.

Finally, each floor panel can be easily customized with a verity of options. Today, installation of a bathtub, or replacement of a bathtub with a shower stall is a significant construction project. With the disclosed floor panels, it doesn't need to be. Each floor panel already connects the connectivity necessary to support this equipment. Installation is therefore limited to replacing a section of the flooring with the desired equipment or swapping one equipment for another.

SUMMARY OF THE INVENTION

It is an object of the present invention to present a system and method of modular home manufacturing and assembly that greatly reduces complexity and length of time require for onsite construction through delivery of completed sections that only require assembly to each other to complete the structure.

It is another object of the present invention to provide a modular structure that utilizes environmentally clean and responsible materials in construction, such as stone, glass and steel, and limits or eliminates pollutants, such as plastics, paint and calcium sulfate dihydrate or gypsum.

It is another object of the present invention to produce an aesthetically clean solution for modular construction.

It is another object of the present invention to provide uniform and consistent user experience in terms of lighting, heating and ventilation throughout the interior of the structure.

It is still another object of the present invention to provide a structure that offers antibacterial and hygienically clean surfaces.

It is still another object of the present invention where critical system components, namely, electrical supply, plumbing and ventilation, are all hidden from view and yet where all conduits and mechanical components thereof are easily accessible, for repairs and maintenance.

Now therefore, disclosed is a modular structure that is built using a floor panel that mounts on top of inground foundation. The foundation contains a series of anchor plates and anchor locks. Each an anchor lock is mounted on an anchor plate. The anchor locks are embedded within the foundation with anchor bolts, or other means of securing such items to the foundation. The placement of the anchor locks on the foundation is dictated by the position of the connectors on a floor panel, which is mounted directly on top of the foundation.

Each floor panel contains a series of connectors, preferably, but not absolutely along its perimeter. Each connector being a hollow channel running at an angle, preferably a right angle, to the axis of the floor panel. Each connector having a first end and a second end. The first end of each connector permanently coupling with one such anchor lock. It is further desired that the wall of the anchor contains a protruding lug that fits within a catch on the connector or visa versa, to accomplish a lock and key configuration. The second end of each such connector is facing upward, presenting an opening along the top surface of the floor panel. This second opening of the connector is used to retain the first end of a load bearing column.

The load bearing column is disclosed. Such load bearing column contains two ends, each of which contains a linkage on its two ends. The first linkage couples with the second end of the connector on the lower floor panel. The second or top linkage connects with the first or bottom end of a connector of the upper floor panel. The two linkages snap into the respective connectors on the lower and upper floor panel or on the lower floor panel and a roof panel. A series of load bearing columns are placed along the perimeter of such floor panel to support the floor panel above and to connect one lower floor panel with another.

A double load bearing column supports an upper floor or roof panel and joins two adjacent floor panels. A quad load bearing column joins four adjacent base floor panels and supports upper floor or roof panel or panels. The upper floor panel, or interfloor floor panel, is similar to the lower floor panel in nearly every aspect, including having connectors that are on the same vertical axis as the connectors of the lower panel. The lower or first opening of such connector accepts linkage with the lead bearing column separating the lower floor panel and the next or interfloor floor panel. The second or upper opening of the connector on the interfloor floor panel functions similarly by accepting a linkage from another lead bearing column. This column supporting a floor panel or roof panel above this interfloor panel. This load bearing column separating the interfloor panel with a panel above it may also be a double, to join two adjacent underfloor panels, or a quad, to joint together three or four adjacent interfloor floor panels. The load bearing columns fulfill multiple roles hey b) bear the load of upper floor panels and the roof, b) form a façade curtain for the structure, c) fuse together adjacent floor panels, and d) provide anchoring for and load bearing to the glass exterior façade.

The disclosed invention describes a heating and air conditioning system (HVAC) that, like all other components of the disclosed structure is prefabricated and shipped to the construction site in a fully assembled or in a finished, but pre-assembled state. Most of the critical or noise producing components of the HVAC system, such as motors and air processing systems are located within the mechanical block, or externally. Hot treatment of air can be done through a heat pump from any source of low potential heat, such as earth, water, or air; it can be a heat generator using any fuel: liquid, solid or gas. Cooling of air may be achieved with a heat pump with active cooling, or a water chiller.

The mechanical block is delivered to the construction site with all engineering systems, HVAC included, fully installed and configured. The mechanical block is then attached to a floor panel at designated linkage locations. The ducts, pipes and conduits used by the engineering systems within the mechanical block are then coupled with prepared connectors of the floor panel.

The required ducts for the HVAC system are integrated into each floor panel. The duct, pipes and conduits of each floor panel are coupled through connectors to ducts, pipes and conduits of adjacent floor panels. Similarly, and as will be demonstrated in detail below, conduits and ducts carry treated air to floor panels above, and are then distributed, within human spaces through the floor panels of those spaces, assuming that those floor panels do not have an active mechanical block of their own.

Once air enters the structure and is processed within the mechanical block is then dispersed through ducts in the floor panels to one of a plurality of airplex units deployed within floor panels and to the door systems. The AK Airplex is mounted within a floor panel. There may be more than one airplex in each floor panel. The idea behind the airplex is to maintain the interior temperature without involving costly, noisy and often inefficient component, and minimize the need to spend additional energy to cool or heat air, depending on circumstances.

Each airplex unit is comprised of four walls and a bottom wall. An air release opening represents the top wall, and this is covered with a grille. Below the air release opening is an internal chamber that divides the internal space formed by the four walls of the Airplex into a top space and a bottom space. Like the airplex, the internal internal chamber is open to the air release opening. There is a gap between one of the walls of the internal chamber and one of the walls of the Airplex that ensures that the bottom space of the airplex is communicating with the air release opening. This slot delvers to the exterior spaces the air mass that was cooled or heated within or passed through the mechanical block. In the meantime, the internal chamber is used to process air that is already inside the interior space.

The internal chamber contains the beating cooling unit having at least one tangential blower placed adjacently in compartments near a set of heating and cooling coils. Air is cooled or heated when the tangential blowers force it over these coils and then back out through air release opening. The air airplex also provides a source of floor lighting and an audio acoustics device. All electric power consumption in the airplex is low voltage and does not present a danger of electric shock to children or pets.

Besides for conditioning and circulating air, the ak airplex represents an internal source of drinking water for the structure. This is accomplished by collecting condensation in the internal chamber. Condensation is then channeled through a water expulsion valve to a pipe in the floor panel to a condensation collection tank and through an ultraviolet purification tank. After treatment, the water can be returned back to internal spaces as drinking water.

As mentioned above, air in the disclosed HVAC system is circulated using the door system and a bathroom shaft. Each door utilized to access internal spaces contains a frame. The frame contains home automation tools and carries electrical wiring between floors of the structure. The door frame is built around a U-duct, which also forms as a strength member for each door. The U-duct, depending on where the door is situated, contains air exhaust vents or air intake vents, preferably across the span of the frame. Door frames that are within air communication with an airplex unit contain air intake vents. Door frames that are situated near or which service the bathroom facilities contain air release vents. The air released from an air release vent of the door flows through the interior space until it is sucked back into the HVAC network of ducts at the air duct within a bathroom shaft.

Both the U-duct of the door and the bathroom shaft are mounted onto the floor panel into their designated slots. The floor panel contains exposed connectors of its HVAC, electrical and plumbing systems for coupling with extensions of these systems in the door frame and the bathroom shaft. Both the door frame and the bathroom shaft are shipped to the construction site fully assembled with all hardware that will run on these infrastructure members, and upon installation of the door frame and bathroom shaft, standard coupling quickly and reliably ties each infrastructure unit to the three major engineering systems of the structure.

One other location of air intake is the intake vent located on the kitchen island. The suction blower for the kitchen exhaust vent is located in the mechanical block. It is connected to the kitchen island through the duct work inside the floor panel. Like all other structural members disclosed in the invention, the kitchen island drops onto the floor panel into standard mounting slots for this equipment. Couplers for drainage, water supply and air exhaust connect the air, water and electric conduits within the kitchen island to their counterparts within the floor panel. Unlike other structural units containing connection to electricity, the kitchen island needs to have access to high voltage line. However, as with other connectors, a standard coupler connects the high voltage line within the kitchen island to the high voltage line within the floor panel. In turn, the high voltage line within the floor panel, connects to the high voltage within the mechanical block and electric power supply source. Electricity may be supplied from solar cells, a windmill, a generator device running on solid or gas fuels, a water wheel or an external power grid.

One of the three engineering systems disclosed in this invention is the plumbing system. The plumbing system comprises a plurality of water pipes preinstalled within the floor panel to carry water from a plurality of sources to a plurality of consumers. Some water pipes, both water supply and drainage, need to run across several floor panels. As in the case of air ducts and electrical conduits traversing floor panels, these are standard pipe runs and are coupled together at the seam between adjacent floor panels.

The plurality of pipes in the system of floor panels is connected to the plurality of pipes within the mechanical block. The plurality of pipes within the mechanical block connect to plurality of water sources. These water sources may be a natural water source, a rainwater collector, a condensation collector, a water supply inlet from an external water supply network, a supplier of greywater from interior wastewater recycling facilities, or a combination thereof.

The natural water source contains an inlet port protruding externally from the floor system. Within the system of floor panels, the inlet port is connected by one of the plurality of water pipes writhing the floor system to a plurality of pipes in the mechanical block. Once in the mechanical block, the water is filtered and otherwise purified. The water is then channeled to a storage tank, a cold-water distributer or to a water heater, where it is either stored or distributed to hot water consumers. The water is channeled out of the mechanical block to a plurality of consumers through a plurality of water pipes in the system of floor panels.

The supply of fresh water may be obtained from a rainwater collector. The rainwater collector is preferably located on the roof of the disclosed structure. The inlet port of the rainwater collector is connected to at least one pipe that run through one of the interior walls and form a vertical partition for shelving. Or the rainwater collector pipe or pipes are passed through the bathroom shaft to a pipe or pipes within the floor system. Once inside the floor system, the rainwater is collected into a rainwater storage tank. The rainwater may then be purified or pumped directly to consumers in form of irrigation.

Another source of water supply is an inlet connecting to an external water supply grid. One example of internal supply is municipal water supply. The inlet may be protruding from the floor system or as an inlet port within the mechanical block. As in other water sources, the inlet is connected through a plurality of water pipes within the mechanical block (or a plurality of pipes within the floor system connecting to a plurality of pipes within the mechanical bock) to a water treatment group. The water treatment group configured to channel water to a plurality of consumers through the system of floor panels.

The disclosed door system is attached to a U-shaped air duct. The air duct further comprising two parallel upright ducts adjacently connecting to a wall system. The first ends of the two parallel upright ducts connecting to one of the plurality of air ducts within an floor panel comprising the lower floor panel, or any of the interfloor flooring panels. The second ends, or top ends, of the two parallel upright ducts being capped or connecting to a first end of a duct leading to an interfloor flooring system above the present floor panel. The U-shaped air duct further comprises a horizontal span jointing the two parallel ducts and connecting obliquely to each of the two parallel ducts below their second ends. The horizontal beam having vents that are in air communication with air outside the air duct. These ducts configured to either expel air into the interior space or to draw air into the duct, depending on the location of the door system. It should be noted that the U-shaped air duct or ventilation shaft does not always function as one duct moving air in one direction. Some of the disclosed ducts commandeer just a portion of the air duct to intake air from or expel air into a surrounding room, while another portion of the U-shaped duct may be independently used as a ventilation shaft to channel air to or from an upper or lower floor panel.

The U-shaped air duct forms the structural component to support a door frame. The door frame functioning as an important automation system structural component, by providing facilities to accommodate a wireless repeater, a wireless magnetic device charger, a usb connector, a magnetic tablet holder. The door frame also having at least one retractable electrical outlet; at least one switch for the interior lighting system, a switch to an electrically triggered bolt locking, a combination of magnetic latching components where the first portion of the magnetic latch corresponding to a second portion on the door.

The wiring for the door frame, as well as all of the aforementioned electrical components installed on the door frame are preinstalled at a factory and are shipped as a complete automation door system to the construction site. During installation, the first ends of the two parallel ducts are plugged into one of the plurality of ducts in the floor panel, the electrical systems are plugged into a socket connector on the floor system, while the second ends of the parallel ducts connect one of the plurality of ducts in the interfloor floor panel, with a second plug connecting to a socket in the interfloor floor panel. Thus the door frame forming a conduit for electrical power and treated air between the lower floor system and an interfloor floor system.

The door for the door system may be formed from layered sheets of material. The center layer being a honeycomb sheet formed out of a lightweight steel alloy or aluminum. The honeycomb central core then supports at least one additional later on each side of the door. Possible layers may be steel, wood, stone or fabric. The two sides of the door need not have the same layers.

One of the consumers of electric current supplied through the door frame is the sky lighting system. The sky lighting is comprised, from a low profile and low voltage lighting, such as LED lighting, that is installed as the bottom most level on an interfloor floor panel. A thin sheet of opaque material is then stretched over lighting. The opaque material forms the ceiling for the floor panel below, and the lighting system it covers forming a full ceiling lighting fixture that is able to light up the entire ceiling or a single section. The transformer connections for the sky lighting system are located within the mechanical block and may be automated to produce a desired lighting effect, which may be a certain color, brightness, mood whether or in reaction to exterior light.

The system console located in the mechanical block provides a transformer rack comprising a plurality of slidable shelving, where each shelf supports one to several transformers. A regular grid voltage is connected to a panel on the rack and then distributed among all of the transfers. Each transformer is assigned to its own low voltage device or outlet and converts the electrical current to the desired voltage level for that device. The wiring from the system console is then sent directed from the mechanical block through conduits in the floor system, and up to the upper from through a door frame, as applicable. While the system console is located within a subspace located adjacent to the main interior space, the subspace is preferably only accessible from outside. The system rack may further comprise self-monitoring capabilities.

The disclosed structure further contains walls that are delivered in blocks. Each block having a first platform connector. The second platform connector linking with a bottom side of a roof system or an interfloor floor system. The first platform connector affixing to a central core, where the free end of the central core connecting to an adjustable second platform connector that is attached to the lower floor. The central core, running vertically between the first platform connector and an adjustable second platform forms the central core for a wall system. Each wall is completed by stacking blocks between the first platform and the adjustable platform and fusing them together with the central core. The wall may also be constructed in layers around the central core, similar to the door construction.

A plurality of upper panels form a roofing system for the disclosed invention. Each roof block is made from a structural core, just like the floor system and the interfloor system. The roofing panel has at least three vertical connectors. Each of the vertical connectors linking with a second end of an axis column, where the axis column is installed between the roofing panel and the top most interfloor floor panel. It is preferred that the surface of the roof block is sloping toward one or several channels. Each channel containing at least one rainwater inlet, as disclosed above.

The floor to ceiling windows of a structure also form the façade. Which is mounted on the load bearing columns. Each load bearing column forming the exterior perimeter further have two outwardly protruding rims. Each outwardly protruding rim having a barb, the two barbs facing each other in parallel, spaced apart configuration. At least two parallel walls extending forward between two the protruding rims, such that each barb coupling with a groove of a rubber block. A flexible diaphragm spanning each rubber block and spanning the two parallel walls. The outer surface of each rubber block is snugly adjacent to a first layer of glass. Where the first layer of glass is interrupted in to separate panes by the two parallel walls. A spacer separating each pane of the first lass layer a second glass layer. The said second layer is also interrupted into separate glass panes by a foam rod. The spacers between first and second glass having a channel, The channel receiving and being in a snug configuration with an axial spoke protruding jutting from the side of the foam rod. An expansion rib protruding out of said foam rod toward the load bearing column is then wedged into the space between the two parallel walls, thus affixing the entire window installation into place on the load bearing column. The same process is repeated on each side where the windowpane is attached to a load bearing column. Horizontal attachment to the floor panels located along the lower and upper edges of the window pane is performed in a substantially similar fashion.

It is therefore an additional benefit of the present invention to create an entirely recyclable, non-polluting, and self-sufficient structure to benefit the environment and promote healthy, aesthetically pleasing and safe living environments. All materials utilized in the construction of the disclosed structure are plentiful in the environment, do not degrade and are fully recyclable. For example, the foundation is preferably made of concrete, which does not degrade and may be recycled. The floor panels and the roof panels are a self-supporting framework of rafters, beams, girders and joists, supporting water storage tanks, filtration facilities, ventilation ducts, water piping, communication and electrical conduits. All these components are preferably made from stainless steel, aluminum, copper and other fully recyclable environmentally clean materials. The glass façade maximizes the usage of sunlight for both energy and as a source of light. Glass is derived from sand, one of the most plentiful substances on the planet. Glass is also considered one of the longest lasting materials, capable of withstanding constant buffeting by elements and time without any visible signs of decline or degradation.

Walls, doors, floors and shelving may all be manufactured from stone or wood veneer. Veneer is used to limit usage of an otherwise plentiful material, and to lighten the object for both transportation and usage. Bamboo is the preferred wood source of manufacturing wood veneer, or beams for the assembled walls. Bamboo while durable and sufficiently strong to be used in construction is also an ecologically clean material because it grows around the world in abundance. It can be cultivated and easily recycled.

Since little or no combustible materials are used, the resulting construction is nearly fireproof. It is also ageless, with little or no need for periodic refurbishment of structural elements. In theory the disclosed structure can last forever, or at least beyond measure of a standard life cycle of a conventional structure.

The structure provides several key facilities that recycle water, harness rainwater and even filter wastewater for further usage. As is described in detail below, energy required for heating and cooling functionality is recycled from user usage. For example, the heat exchange wheel which preserves heat for reheating water for bathing. Other sources of clean energy include roof shingles and windowpanes that double as solar panels, thermal energy pump, water wheels, and windmills.

Furthermore, the disclosed structure is manufactured within a controlled environment of a factory, not at a construction site. A controlled environment is ideal to fine-tune precise production needs so that waste is minimized or eliminated altogether. Shipping of the final assembled component from factory to construction site eliminates the need to make countless deliveries of construction materials required by conventional business methodologies.

The disclosed structure is fully compliant with and advances the goals of The Paris Agreement on climate change adopted by 197 countries in 2015. It also advances the goals of limiting CO2 emissions put forth by the UN Climate change initiative. Nearly all innovation in the disclosed structure is geared toward protecting the planet by committing to nearly total carbon neutrality. It uses methodologies, materials and devices that are intended to make the structure self-sufficient while utilizing little or no carbon emissions. Just to illustrate the scope of disclosed novelty and innovation that benefits the planet, one need only appreciate that the disclosed invention describes system and method for zero emissions production of electricity. The methodologies discussed are twenty years ahead of their time. To illustrate the scope of innovation, one need only look at proposals put forth by government authorities considered to be on the forefront of promoting environmentally friendly policies. One such example is The New York State Energy Research and Development Authority (NYSERDA), which has set a goal for 100% of emissions free electric production by 2040, some twenty years from now.

BRIEF DESCRIPTION OF THE DRAWINGS

FIGS. 9A and 9B are detailed exploded diagrams of the removable floor system.

DESCRIPTION OF THE PREFERRED EMBODIMENTS

Figure 1:
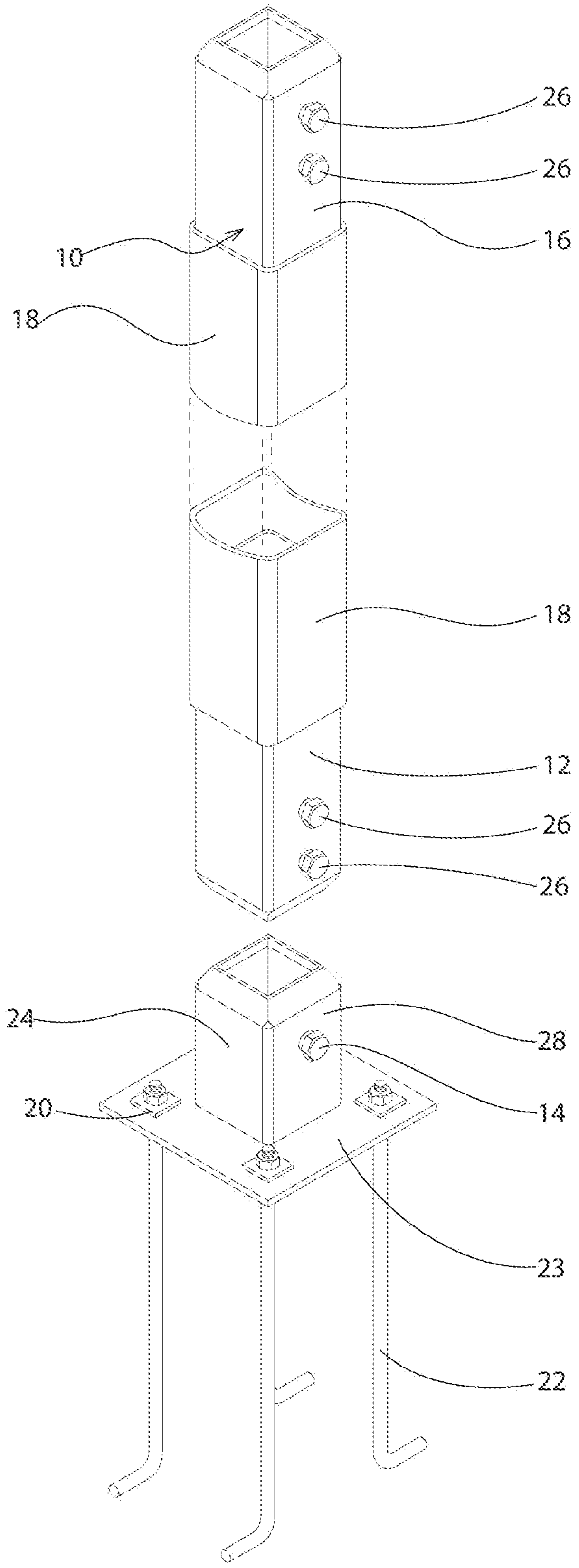
FIG. 1 is an exploded diagram of the load bearing column and anchor.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 7:
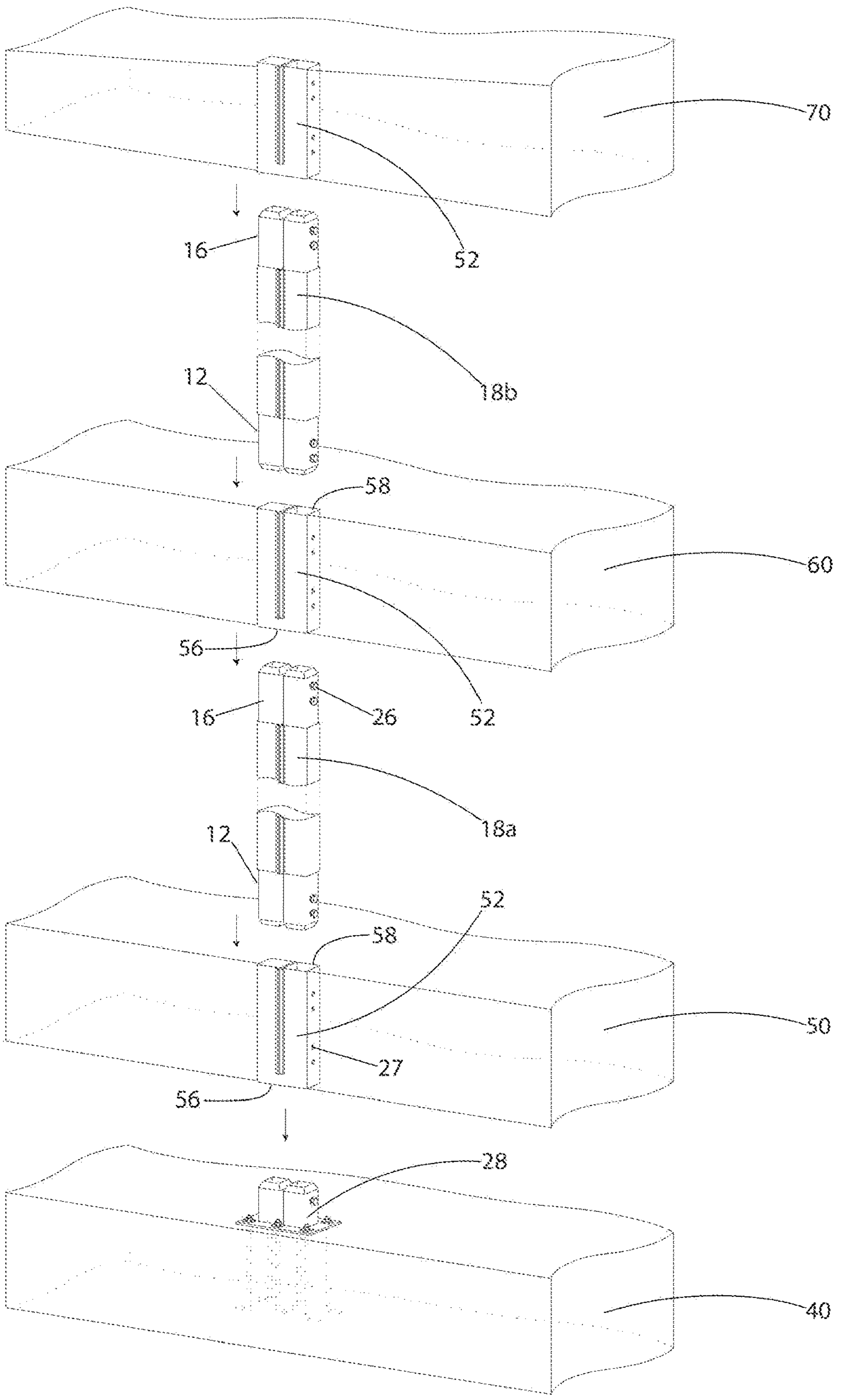
FIG. 7 is an exploded contextual diagram of a dual load bearing column integrated into a structure having a foundation a base floor panel, an interfloor floor panel and a roof panel.

FIG. 1 discloses a loadbearing column 10, having a first end 12, a second end 16 and main body 18. The first end 12 is shown to be fitting over the anchor 28. The anchor 28 is bolted on top of a foundation footing (not shown) with anchor bolds 22. The anchor 28 is shown as a protruding stem 24 that is configured to fit within the first end 12. Alternatively, the stem 24 may fit over around the first end 12 as sleeve. Furthermore, the anchor 28 may be presented as socket (not shown) into which the first end 12 will be inserted and locked therein. The anchor's stem 24, or a socket as the case may be, and the mounting plate 23 are preferably members of a single unit that are cast or welded together to form an anchor 28. The finished unit 28 presents a reinforced anchoring member that bolts the upper structure to the foundation 40 (FIG. 7). The disclosed structure will have a plurality of anchors 28, with each anchoring member 28 attached to the foundation 40 with a plurality of attachment points 20, which are preferably the threaded section of the anchor bolts 22.

Figure 4:
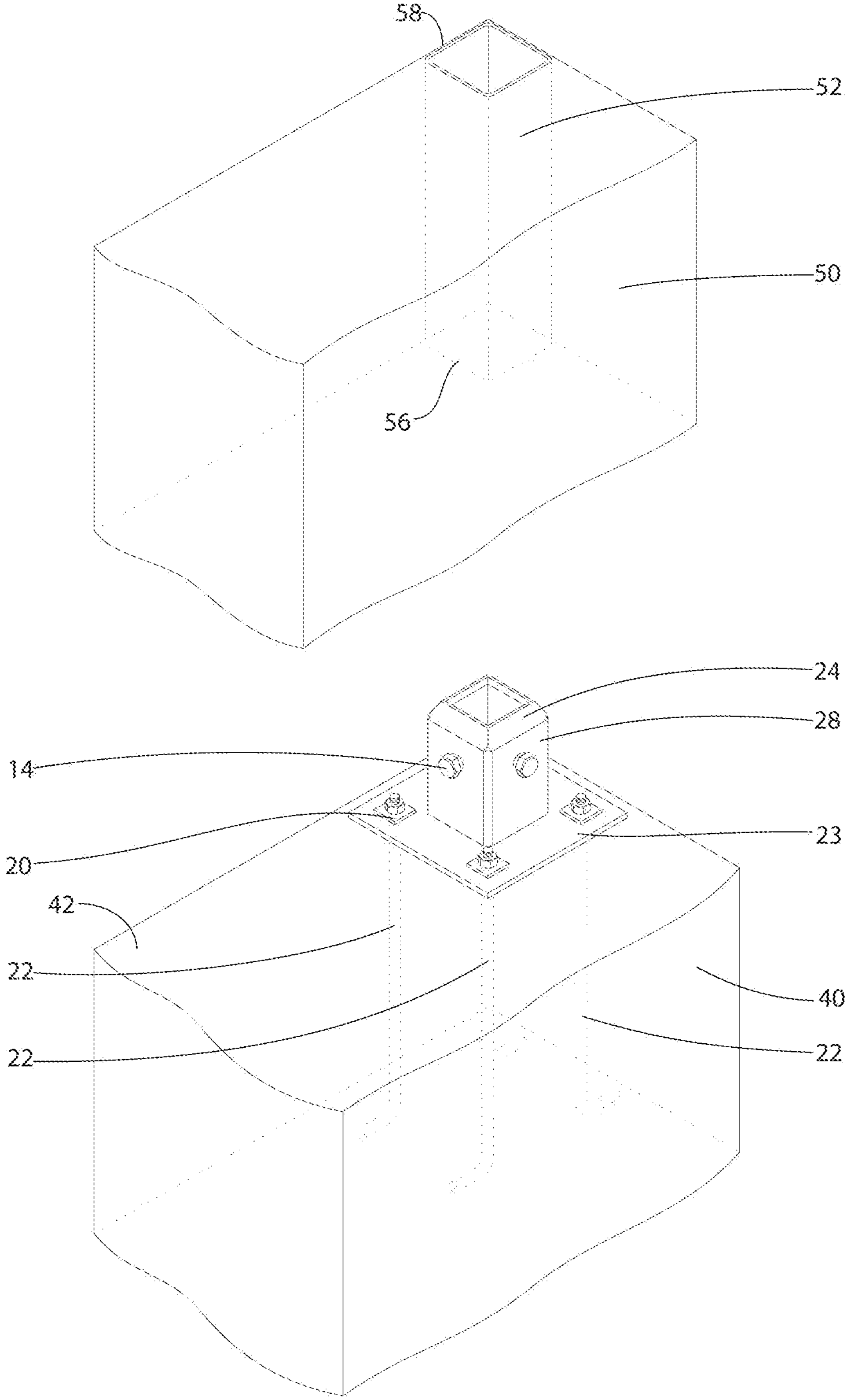
FIG. 4 is an exploded diagram of a load bearing column and anchor integrated into a foundation and floor panel.

The anchor 16 and load bearing column 10 are shown as parallelogrammical. Other possible embodiments may be presented as tubular or cuboid. The anchor fasteners 14 securely connect the first end 12 to the anchor 16. The first end 12 may have additional column fasteners 26 that link the column 18 to the stem 24 or a connector 52 (FIG. 4). Similarly, column fasteners 26 of the second end 16 are secured within a connector 52 of a floor panel 60 or roof panel 70 as demonstrated in FIG. 6.

Figure 2:
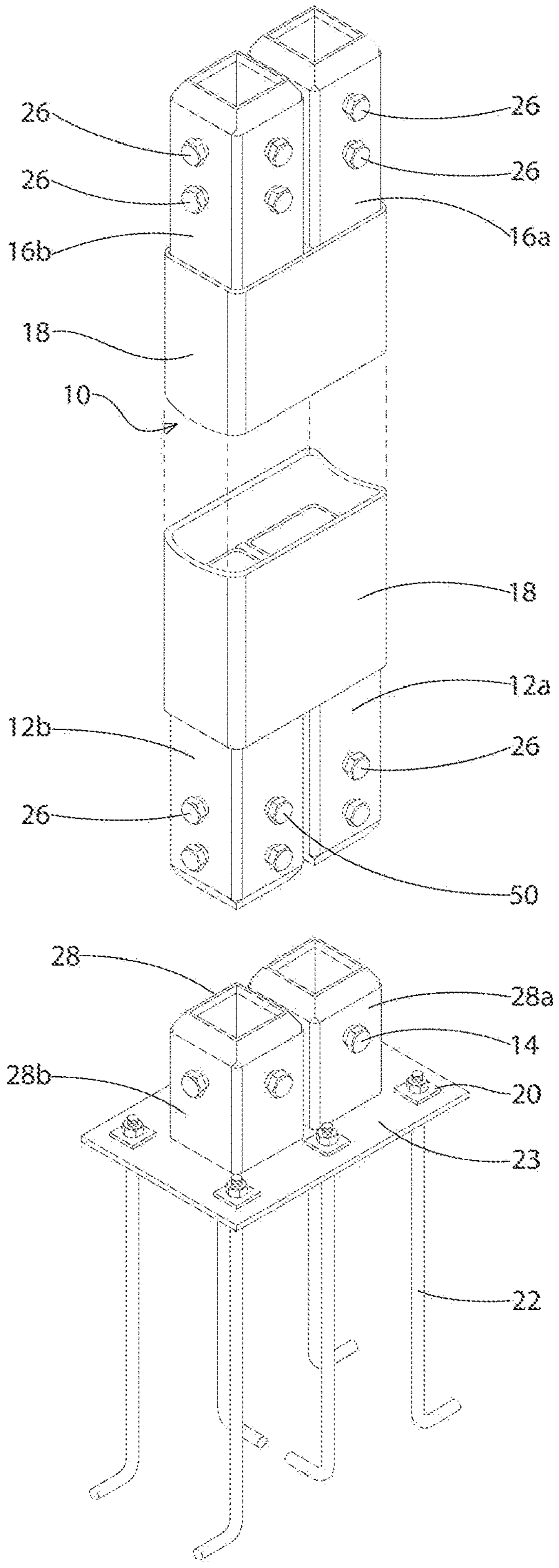
FIG. 2 is an exploded diagram of a dual load bearing column and anchor.
Figure 3:
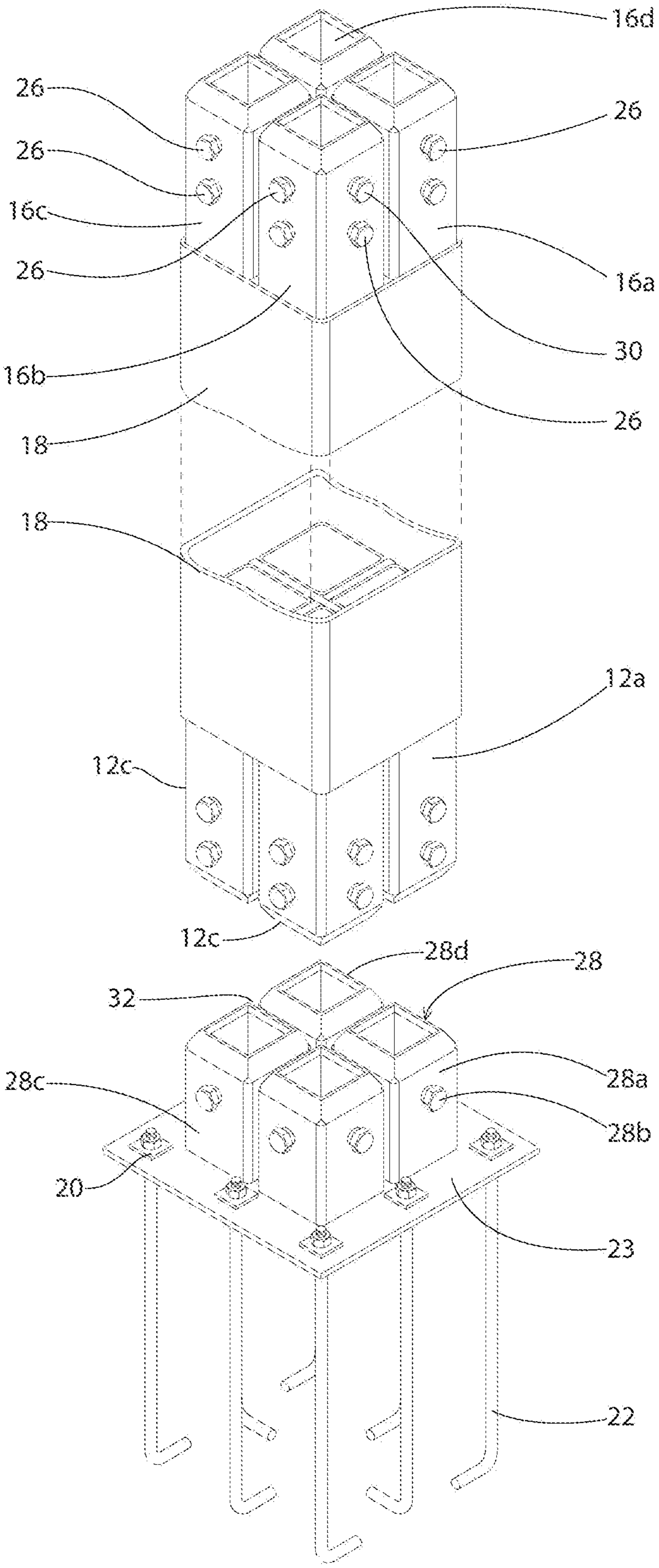
FIG. 3 is an exploded diagram of a quad load bearing column and anchor.

FIGS. 2 and 3 demonstrate how a load bearing column 18 is able to connect together two or more anchor members 28. In FIG. 2, the load bearing column 18 binds together the first ends 12*a* and 12*b*. First end 12*a* mounts on the first anchor 28*a*, while the first end 12*b* mounts on the anchor 28*b*. Dual anchors 28*a* and 28*b* are linked with the dual first ends 12*a* and 12*b*. Similarly, dual second connectors 16*a* and 16*b* connect dual connectors 52*a* and 52*b* (FIG. 7). A dual load bearing column 18 combines the dual first connectors 12*a* and 12*b*, the dual second connectors 16*a* and 16*b* and the dual anchors 28*a* and 28*b* into a single structural strength element, with individual components reinforcing each other both vertically and laterally.

A wider lead bearing column 18 is able to accommodate 4 adjacent anchors 28. This arrangement is demonstrated in FIG. 3. Shown are four first ends 12*a*, 12*b*, 12*c* and 12*d*, all contained within a single load bearing column 18. The loan bearing column 18 further contains four second ends 16*a*, 16*b*, 16*c* and 16*d*. A gap 30 separates the four send ends 16*a-d* that are arranged in a square. A gap 32 separates the four first ends 12*a-d* that are likewise arranged in a square. One skilled in the art will appreciate that while FIGS. 1-3 demonstrate a load bearing column 18 having single, double and quadruple first and second end instances, 12 and 16 respectively, a column may support a mixed number of connectors, for example four first ends 12*a-d*, but only two second ends 16*a* and 16*b*. This is applicable when a particular column is mounted on four adjacent floor panels 50, with an additional floor 60 mounted only above two of those floor panels 50 (FIG. 7).

Figure 5:
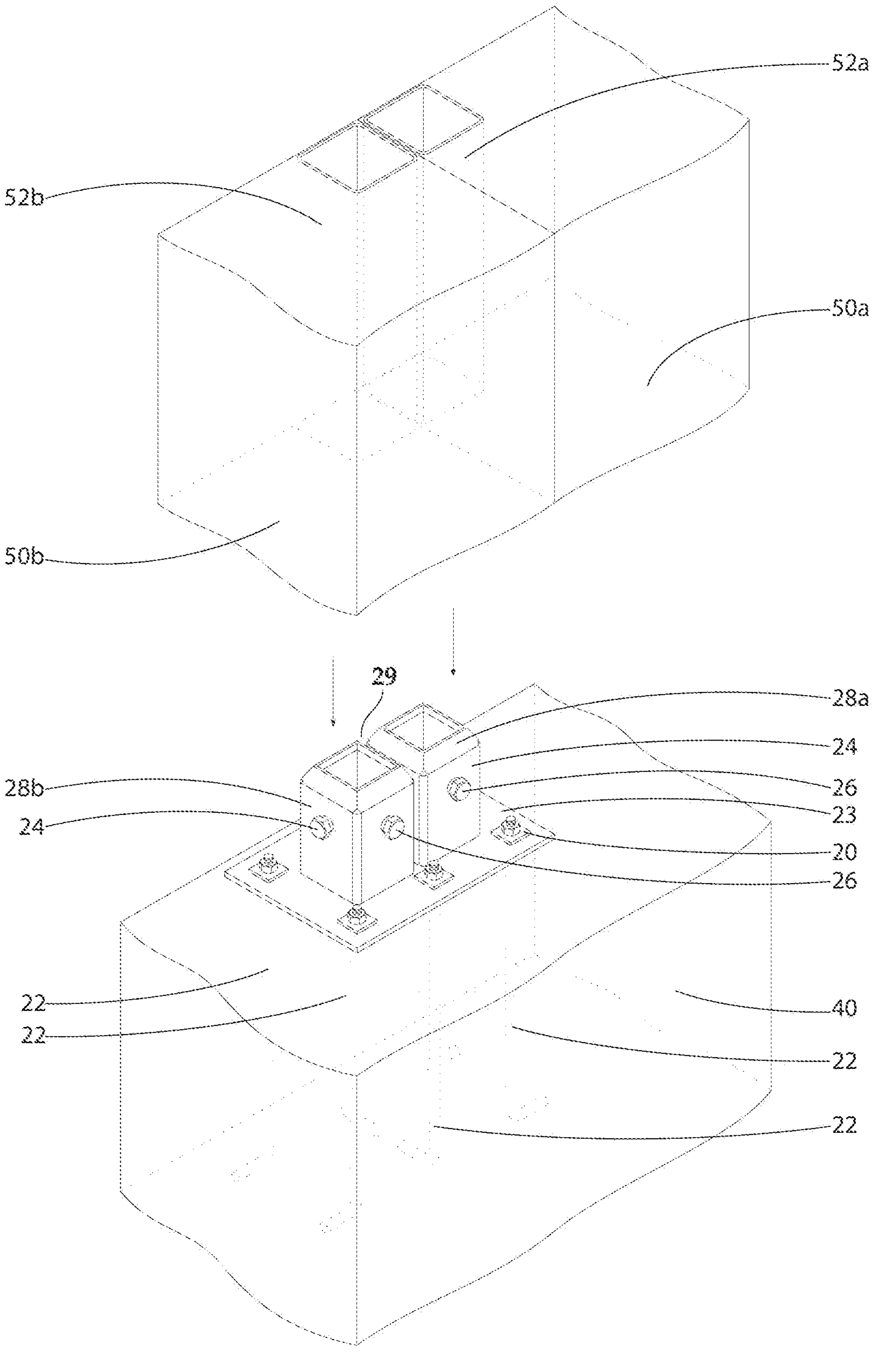
FIG. 5 is an exploded diagram of a dual load bearing column and anchor integrated into a foundation and floor panel.
Figure 6:
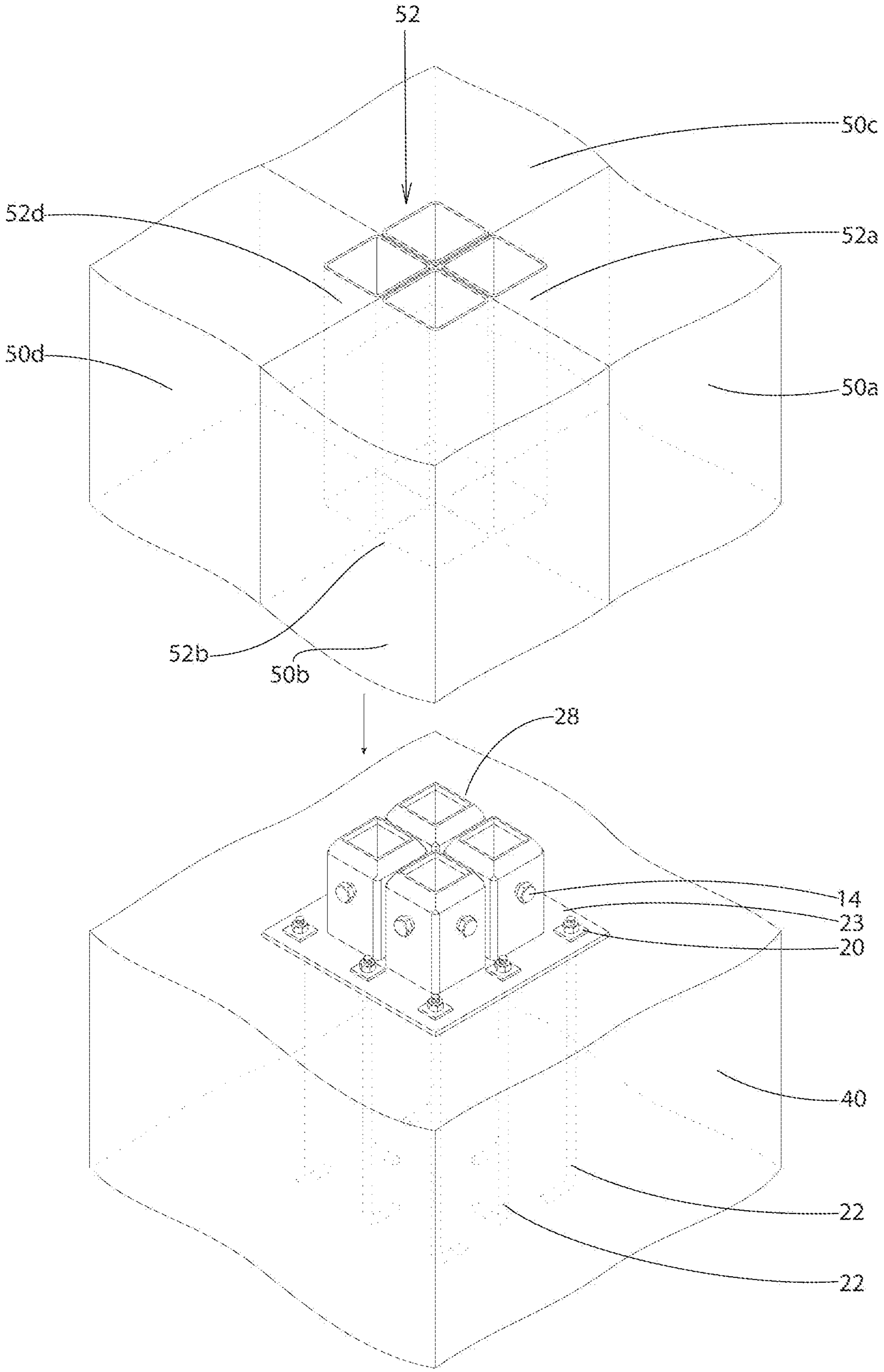
FIG. 6 is an exploded diagram of a quad load bearing column and anchor integrated into a foundation and floor panel.

The structural elements shown in FIGS. 1-3 are shown in context in FIGS. 4-6. In FIG. 4 a first end 56 of the connector 52 is mounting onto an anchor 28. The connector 52 is an integral component of the structural base that represents the base floor system panel 50. The anchor 28 further comprises a stem 24 mounted on the mounting plate 23. The mounting plate 23 is bolted to the top 42 of the foundation 40 with anchor bolts 22 at attachment points 20. The anchor bolts 22 are presented as standard L-shaped bolts that are embedded in concrete. Anchor bolts 22 may also be a straight rod, a J-shape, a lighting bolt, or in any other shape. The medium forming the foundation 40 is preferably a concrete footing or a cinder block filled with concrete.

In FIG. 5, two base floor system panels 50*a* and 50*b* are placed adjacently to each other. The base floor system panel 50*a* contains a connector 52*a*, while the base floor system 50*b* contains the connector 52*b*. The connectors 52*a* and 52*b* are adjacent to each other. A slight gap 55 corresponds to the gap 29 between each anchor 28*a* and 28*b*. The anchors 28*a* and 28*b* are mounted as a single unit onto a mounting plate 23. Thus, the adjacent construction bases forming the base floor systems 50*a* and 50*b* are held together with the dual anchors 28*a* and 28*b* as shown.

FIG. 6 demonstrates four adjacent structural bases forming base floor systems 50*a-d*. Connectors 50 are mounted onto anchors 28*a*-28*d* arranged in a square corresponding to the connectors 50. The connectors 52*a*-52*d* are mounted onto the anchors 28*a-d*. Thus the four adjacent base floor systems 50*a-d* are held together by the anchor member 28, that is formed from stems 24 of separate anchors 28*a-d* that are in a permanent attached with a mounting plate 23, which in turn is bolted to the foundation 40 with anchor bolts 22.

FIG. 7 demonstrates how the basic structure of the disclosed building stacks up. The lowest level is the footing or foundation 40, which is a concrete slab or a poured concrete footing. Anchoring members (anchor) 28 are bolted onto, or otherwise embedded into the foundation 40. A base floor panel 50 representing the basic unit of the base floor system is then mounted unto the foundation. The linkage between the base floor panel 50 the foundation occurs when the connectors 52 embedded with the base floor panel 50 are mounted unto anchors 28. The anchors 28 are inserted into the socket formed by the first end 56 of the connector(s) 56. The first connectors 12 of a plurality of load bearing columns 18 is then inserted into the second end 58 of the connector(s) 52. The rest of the plurality of load bearing columns 18 are then mounted at strongest points, strategic places along the surface of the base floor panel 50 (preferably attached to joist or along the perimeter).

As shown in FIG. 7, the connectors 52 of the base floor panel 50, the interfloor floor panel 60 and the roof panel 70 are vertically aligned. This alignment of connectors 52 is preferred as they are spanned and supported by the load bearing columns 18. As shown in FIG. 7, the first end 12 of the load bearing column 18*a* is locked inside the socket formed by the second end 58 of the connector 52 of the base floor panel 50. The second end 16 of the load bearing column 18*a* is coupled within the socket formed by the first end 56 of the connector 52 of the interfloor floor panel 60. The first end 12 of the load bearing column 18*b* then couples with the second end 52 of the connector 52 of the interfloor floor panel 60, with the second end 16 of the load bearing column 18*b* coupling to the connector 52 of the roof panel 70. The connectors 52 may not necessarily be linearly aligned, and if this is the case the load bearing columns would be laterally offset to span non-aligning connectors between stacked floor panels (50 and 60). It should be further appreciated from the drawings, that while one base floor panel 50 supports one interfloor panel 60, thereby forming two floors below the roof panel 70 there may no interfloor floor panels 60 or a plurality of interfloor floor panels 60 between the base floor panel 50 and the roof panel 70. Furthermore, it is noted that FIG. 7 demonstrates an embodiment of dual anchor 28, dual connectors 52 of base, interfloor and roof panels, 50, 60 and 70, respectively, supported by a dual load bearing columns 18*a* and 18*b*. The dual configuration may be used for any single floor panels (50, 60 or 70) or two adjacent panels. Furthermore, load bearing columns 18*a* and 18*b* need not be dual to hold adjacently situated panels together, since the anchor 28 and any of the connectors in the stack shown, are in dual configuration and will provide lateral fusion for any adjacent floor panels in the stack of floor panels.

It is further shown in FIG. 7 that load bearing columns 18*a* and 18*b* are attached within sockets formed by first and second ends 56 and 58, respectively, of the connectors 52 using bolts 26 that are threaded through openings 27 within the connectors 52. Alternatively, coupling may be achieved using barb and groove combination, threaded attachment between connecting ends, press screws, bayonet fasteners, magnetic attachments, adhesive or spot welding. When considered in context of base floor panel, interfloor floor panel and the roof panel, the disclosures demonstrates in FIGS. 1-3 are intended to be viewed with connectors 52 being interposed between gaps between vertical components, with all linked load bearing column incorporating the strength of each individual connector is creating superior vertical and tangential stability.

Figure 8:
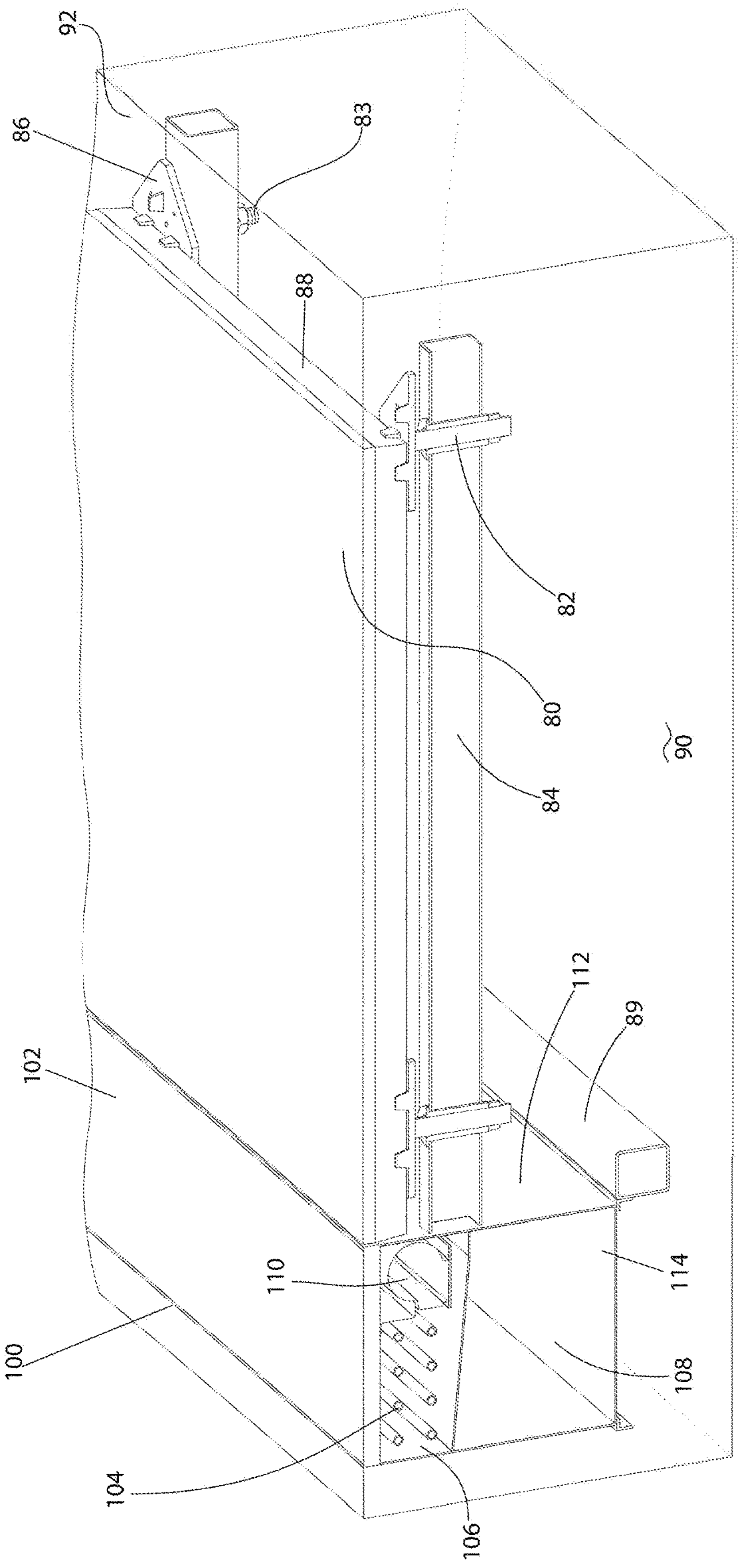
FIG. 8 is a cross sectional diagram of a floor panel, illustrating an airplex unit and floor panel systems.

FIG. 8 demonstrates the upper portion of the structural base of each floor panel 90. The floor panel 90 shown in FIG. 8 may be a base floor panel 50 or and interfloor floor panel 60. The upper portion of a floor panel 90 preferably contains structural members 84. These are tubes or girders 84 support components that are mounted unto the surface 92 of a floor panel 90. Two such components shown in FIG. 8 are one of a plurality of floor tiles 80 and an AK airplex 100. The floor tile 80 represents the finished surface referred to by occupants generically as floor upon which one walks and a surface to support furnishings and other items found on the interior of a structure. The floor tile 80 may be made of porcelain, glass, wood, stone or a synthetic material. It is preferred that the floor tile 80 is also comprised of a lower surface 88 for strength, greater insulation and noise reduction. The floor tiles 80 may contain integrated coils or tubing for heating and cooling purposes. Each stem 82 is secured by a lug nut 83 that also provides an opportunity for level adjustment of the entire floor tile 80.

The AK airplex 100 plays an integral role in heating, cooling, ventilation, lighting and acoustics. Shown is the top surface 102, which is preferably a grated surface which covers the interior chamber 106. The interior chamber 106 contains heating cooling tubes 104 that are adjacently placed near at least one tangential blower 110. Also shown is the shower chamber 108, sidewalls 112 and a bottom wall 114. The AK Airplex 100 may be mounted onto a structural member 89. It should be noted that structural members 84 and 89 may additionally function as air ducts.

Each floor panel 90, whether this is a base floor panel 50 or an interfloor floor panel 60, consists at a minimum of a plurality of floor tiles 80. As demonstrated in FIGS. 9A and 9B, each floor tile 80 of the plurality of floor tiles configured to be supported by at least one pedestal base 86 and be easily removed therefrom. Each at least one pedestal base 86 further having platform 86*b* supported by a threaded stem 86*a*, which is configured to be inserted into an opening 85 in a structural member 84 of a floor panel 90. The threaded stem 86*a* configured to adjust elevation of the pedestal base 86 above said structural member 84, thereby also varying elevation of the floor tile 80. Each pedestal base 86 is configured to support one or multiple floor tiles 80. The floor tiles 80 further comprise depressions or grooves 86*d* that interlock with the protrusions 86*c* of the platform 86*b*. It is preferred that each threaded stem 86*a* is first installed into a sleeve 84 before being inserted into the opening 85. The stem 86*a* is then tightened within the opening 85, the sleeve 84 or with a lug 83.

Figure 10:
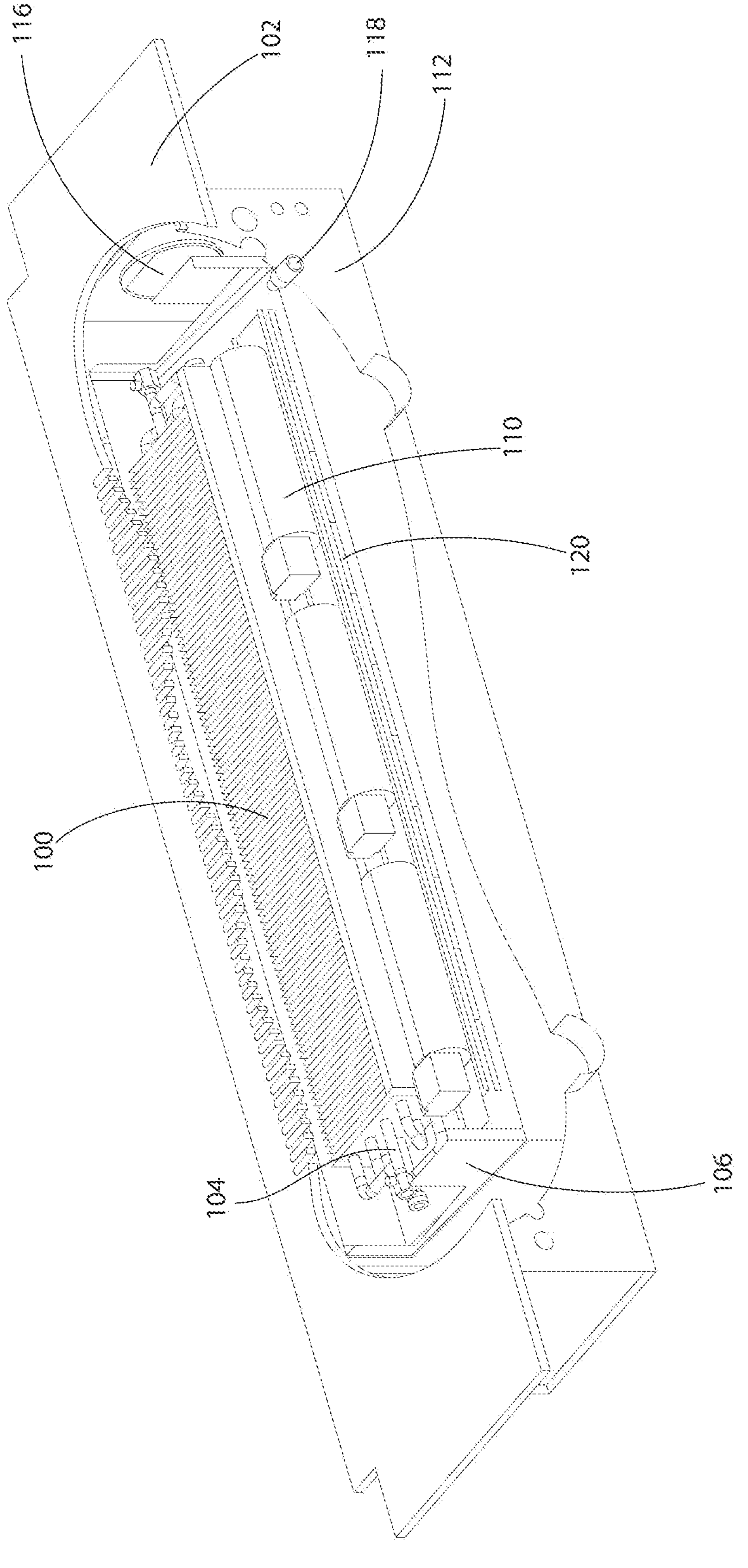
FIG. 10 is a cutaway diagram of an ak airplex unit.
Figure 11:
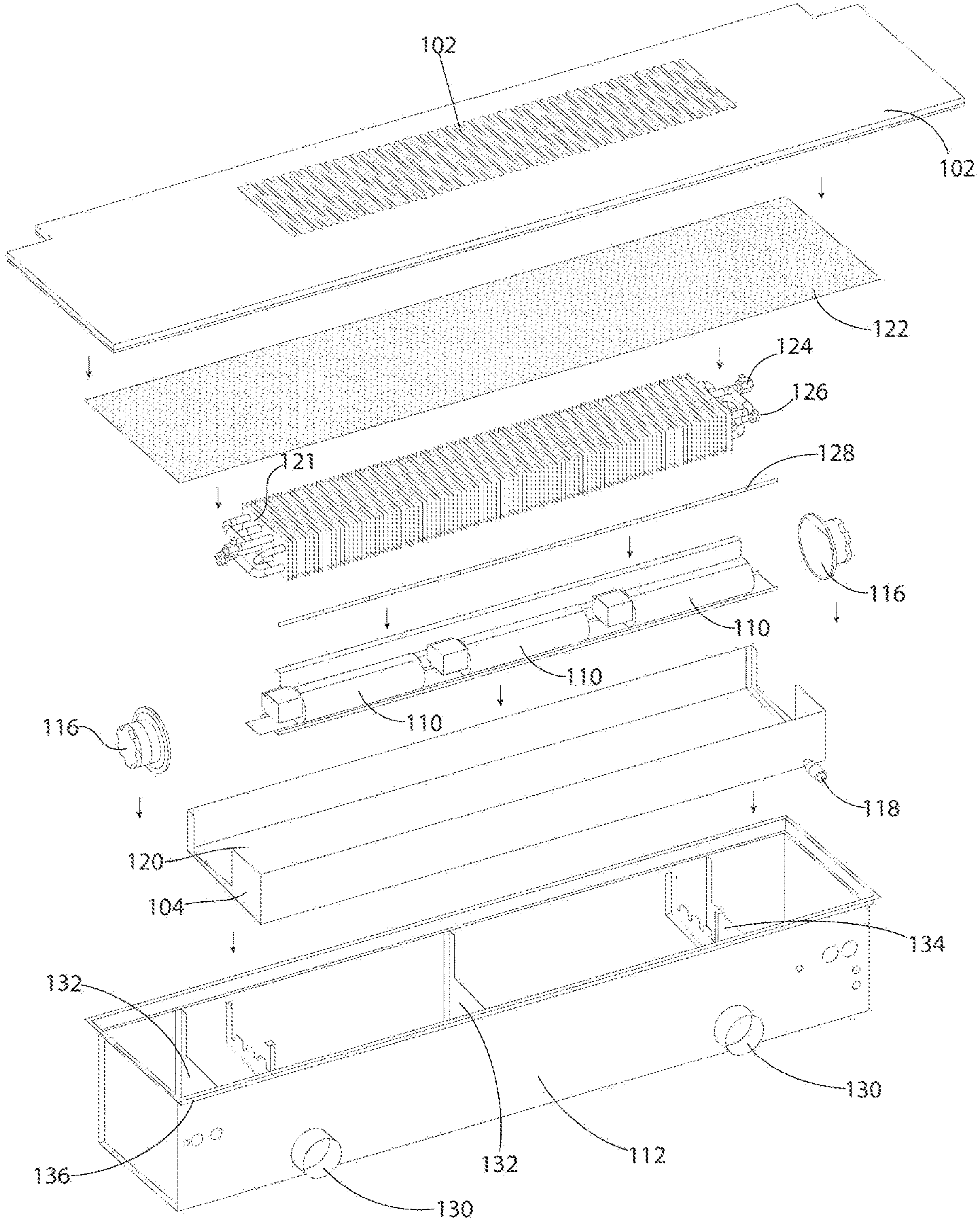
FIG. 11 is an exploded diagram of an ak airplex unit.

FIGS. 10 and 11 offer additional detail into the AK Airplex 100. Preferred components of an AK Airplex 100 are a top wall 102, which rests on the top lip 136 and which is a removable cover that is substantially comprised of a grated surface 103. The top cover 102 is intended to blend in and be an indistinguishable part of the overall floor surface of the disclosed structure. Therefore, the top cover 102 is preferably made of the same material as is used as covering for the rest of the floor area, or the floor area in that location. Therefore, it is preferred that the grated surface 103 is machined directly into such material of top cover 102. The grated surface can encompass all or some portion or portions of the top cover 102. Directly below a top wall 102 is a mesh surface 122 that is intended to capture items falling unto and through the grated surface 103. The mesh surface 122 may additional comprise of filtration capabilities, and chambers containing the heating cooling unit 121 and at least one tangential blower 110. Both the heating cooling unit 121 and the tangential blower(s) are placed within the internal chamber 106. The heating coiling unit 121 is further comprised of fins 124 surrounding a set of tubes 126 that are filled a gas or liquid medium. The gas or liquid medium is preferably passed through an active pump system where the medium is heated or cooled. The heating cooling unit 121 is placed adjacently to a chamber with at least one tangential blower 110, which forces a stream of air through the heating cooling unit 121.

Also shown are audio speakers 116 mounted into sidewalls 112. At least one light strip lighting unit 128 is placed inside the internal chamber 106 or the lower chamber 108. The light strip 128 provides floor and wall illumination. Internal ribs 132 provide a surface for mounting of the internal chamber 106. Air intake openings 130 pull in air passing though a plurality of ducts in the floor panel 90 into the lower space 108.

The AK Airplex 100 serves as one of the water supply systems that are disclosed. Water is collected from the heating cooling unit 121 by way of liquid condensation falling onto condensation pan 120, which forms the bottom wall of the internal chamber 106. Condensation then flows to one of water pipes in a floor panel 90 through an outlet valve 118.

Figure 12:
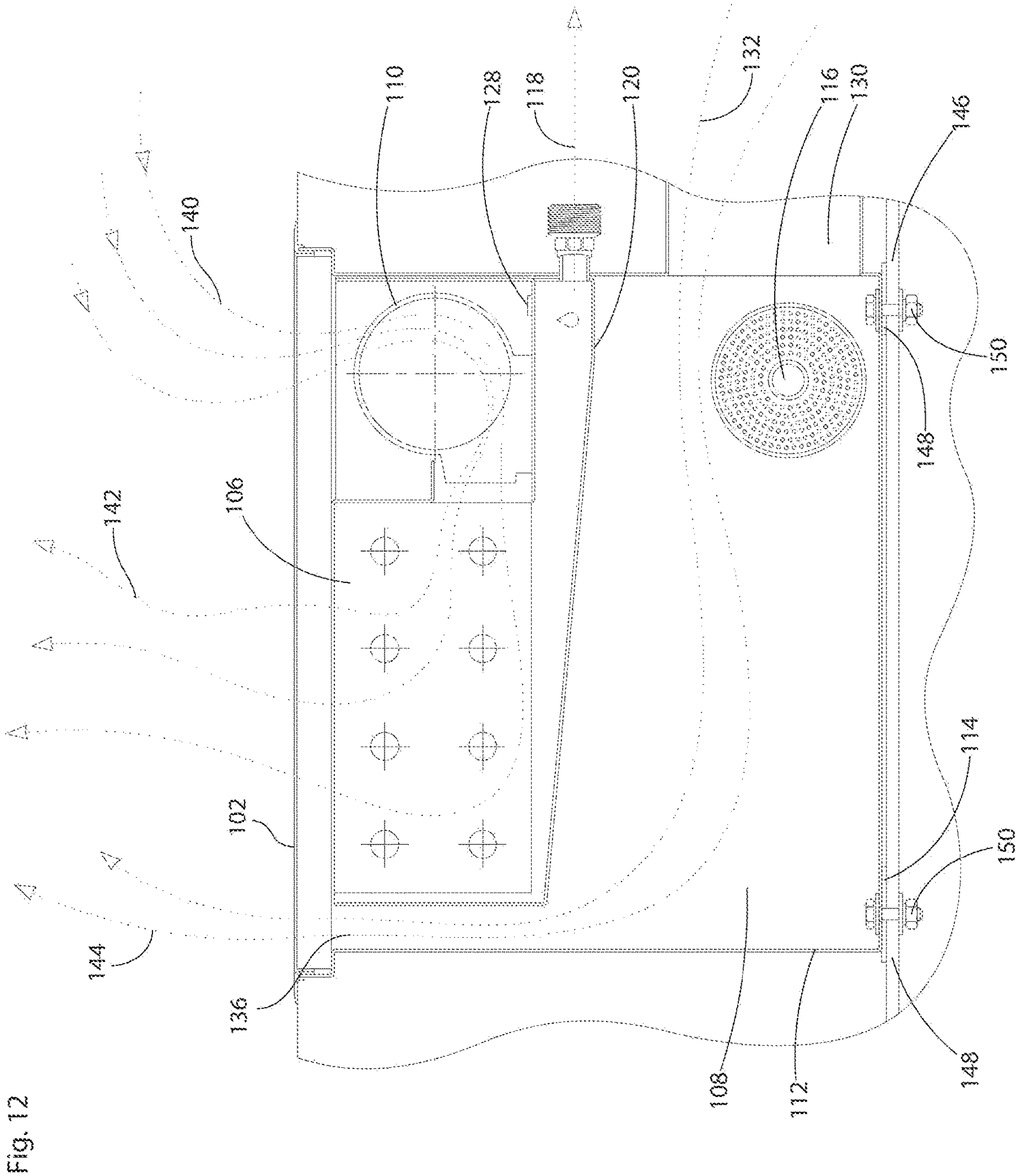
FIG. 12 is a sectional sideview diagram of an ak airplex unit.
Figure 34:
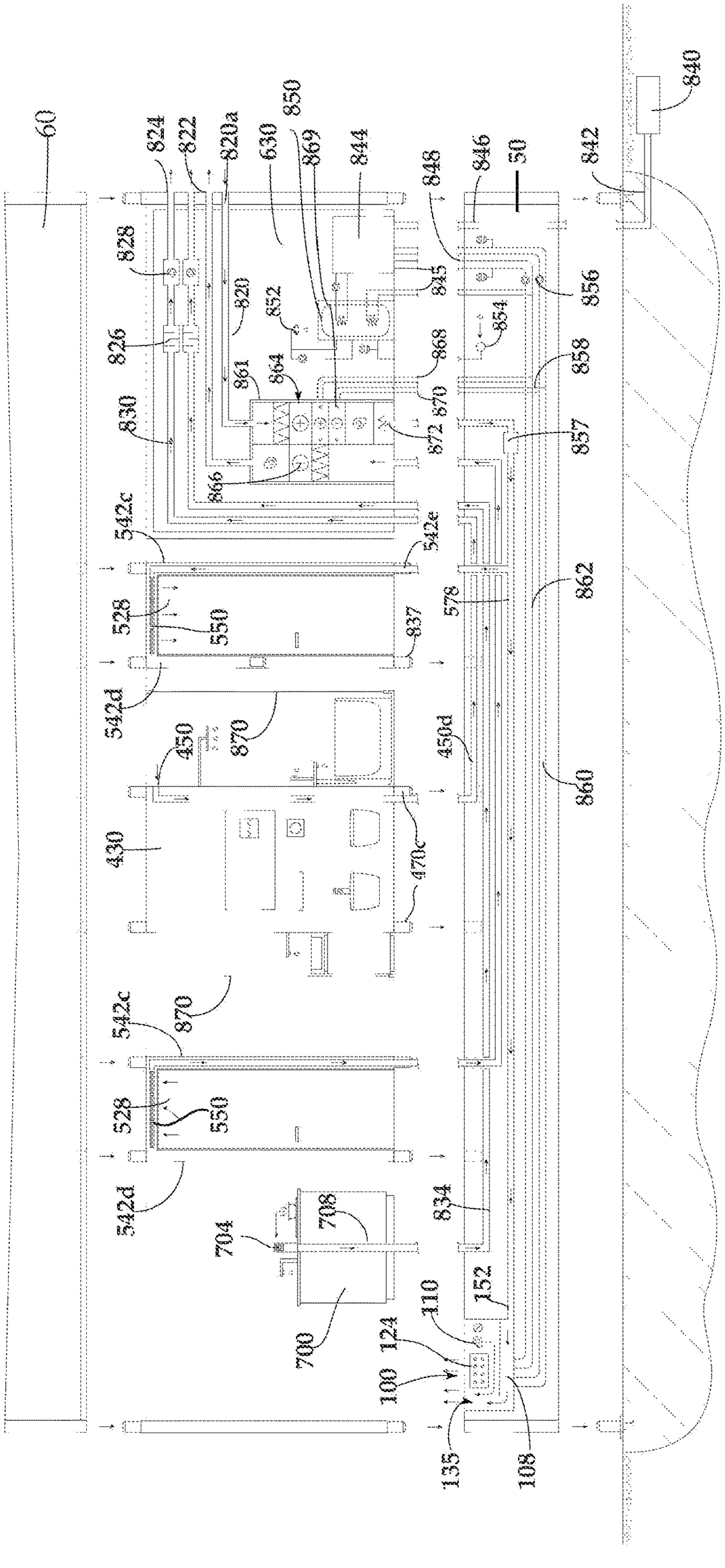
FIG. 34 is a layout diagram of an HVAC engineering system.

FIG. 12 demonstrates airflows within the ak airplex 100. The air flow 144 is a fresh filtered and disinfected an originating from intake openings 822 of the mechanical block 630 (FIG. 34). The air is then passed through air shafts of a floor panel(s) on its way to the intake openings 130 of the lower space 108, up through the gap 135 between internal chamber 106 and one of the sidewalls 112. The fresh air is then expelled into a space representing the interior of the disclosed structure through the top surface 102. While within the interior, the air is recycled through the interior chamber 106 to maintain ambient temperature. The air circulation occurs when the air flow 140 is drawn through the tangential fans 110, which then pass the air flow over the heating cooling unit 12 and expelled through the top surface 102. The bottom wall 114 is bolted into the support member 146 of a floor panel with fasteners 148 and nuts 150, or snapped into place, or attached with self-anchoring fasteners. Shown at the bottom of the interior chamber 106 is a strip of light 128 to provide floor lighting through the top surface 102.

Figure 13:
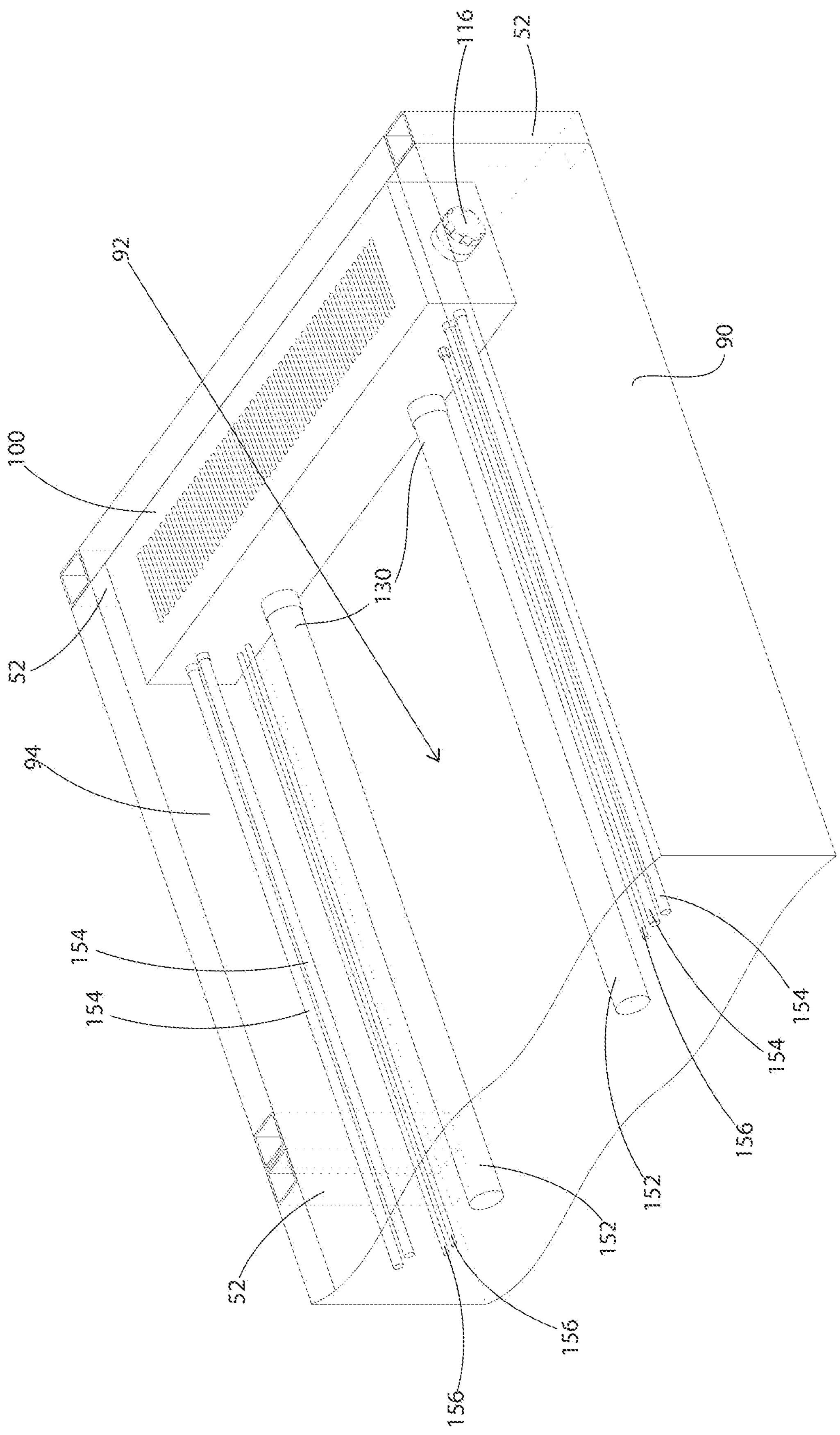
FIG. 13 is a transparency diagram of a section of a floor panel containing an ak airplex unit with wiring and plumbing thereto.

Additional AK Airplex 100 is shown in FIG. 13, which demonstrates the Ak airplex 100 deployed on a floor panel 90. Each floor panel 90 integrated into a structure preferably contains at least one AK Airplex unit 100. The AK Airplex 100 is shown located along the width of a floor panel 90. Additional or other placements of AK Airplex 100 may be along the length of the same floor panel 90. It is highly desired that each interior space within the structure contains at least one AK Airplex 100. The intake openings 130 are shown linked with ducts 152, which run through the interior cavity 94 of the floor panel 90. Air in the ducts 152 is being channeled from exterior intake openings as shown below. Also shown in the figure are a plurality of electrical conduits 154. The conduits 154 are preferably encased in metallic tubing so as to be substantially impervious to weather, moisture and temperature fluctuations. A condensation pipe 156 also hidden within the cavity 94 leads to a condensation tank and/or UV filter as shown below.

Figure 14:
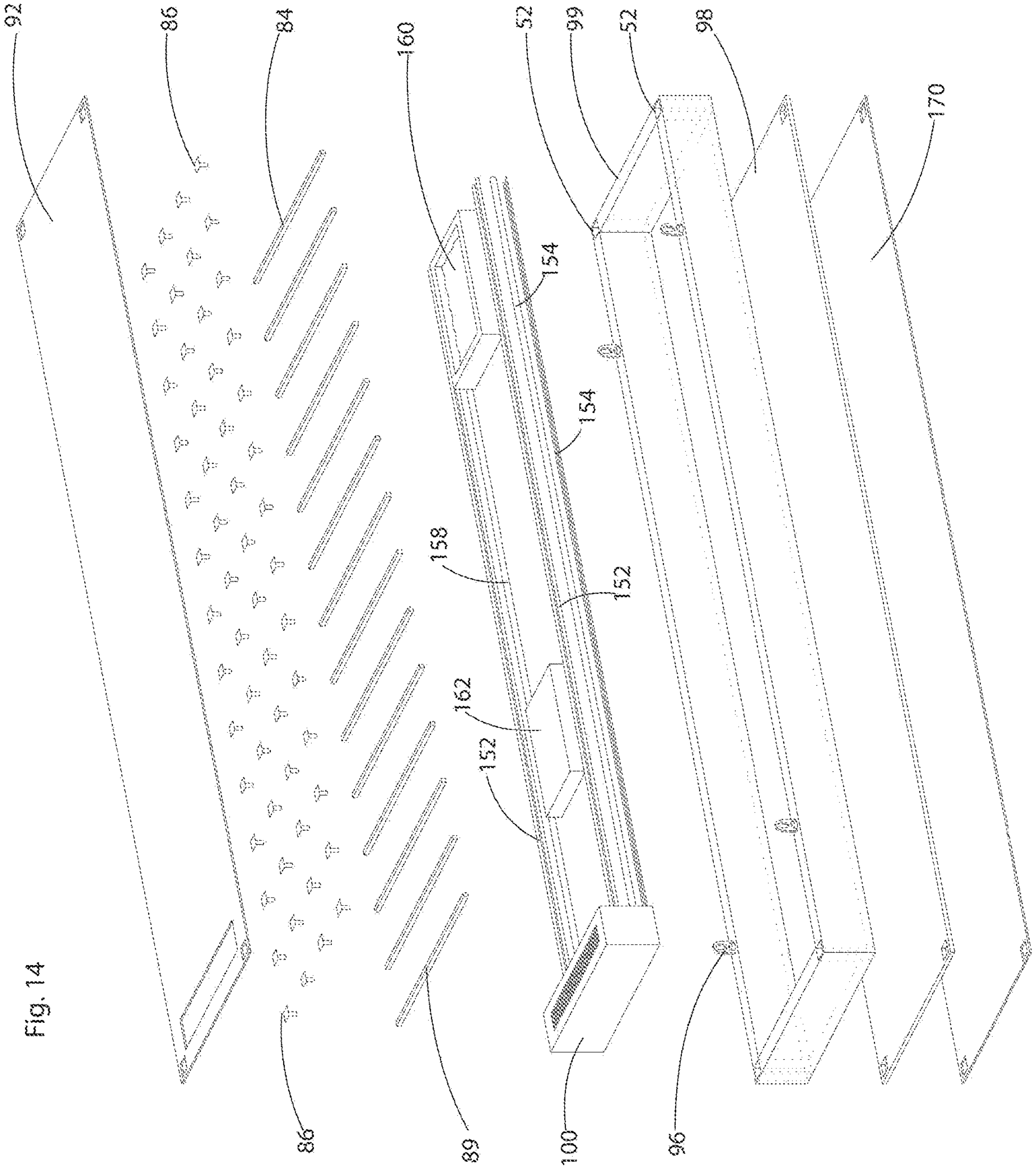
FIG. 14 is an exploded diagram of a base floor panel or an interfloor floor panel.

FIG. 14 demonstrates the exploded diagram of the floor panel 90. The floor panel 90 may be the base floor panel 50 or the interfloor floor system 60. The exploded floor panel 90 shows the top surface 92 that is formed from a plurality of removable tiles 80. The plurality of removable tiles is placed on adjustable pedestal base 86, which are mounted within the structural cross elements 84 or 89. Some of the removable tiles 80 are then removed to accommodate an optional tub 160, or some other form of plumbing equipment. The tub 160 is supplied by a plurality of water pipes 158 that are concealed within side partitions 94.

The ak airplex 100 is deployed across the width of the floor panel 90. Also shown is the condensation tank 162 which receives condensation accumulated from the operation of the airplex 100 of the floor panel shown or of the adjacent floor panels 90. The side partitions 94 may be solid wall sections or a lattice formed by a plurality of structural elements 84 and 89. All partitions 94 will be intersected by exposed connectors to water pipes, air ducts and electrical conduits which connect the plurality of pipes, ducts and conduits of one floor panel 90 with an adjacent floor panel.

Parallel pairs of D-ring anchors 96 are shown deployed along the top lip 99 of the structural base that forms the floor panel 90. The D-ring anchors 96 are removable and are used to deliver a completely assembled floor panel assembly base 90 to the construction site. Similar D-ring anchors are shown throughout this disclosure since all components of the disclosed structure are completed at the factory and are delivered to the construction site to be connected with other components of the structure.

Still referring to FIG. 14, further disclosed is the insulation layer 98. This may include heat, moisture, and sound insulating materials and may be laid along the lower surface of floor panels. Beneath the insulation layer 98 is the sky lighting layer 170. The sky lighting layer 170 is only present with the interfloor floor panels 60 and is comprised with a plurality of strip lighting deployed beneath the insulation layer 98. A layer of synthetic opaque sheeting is then stretched below the lighting fixtures to cover the lighting fixtures from the interior spaces below. Occupants of interior spaces beneath such lighting configuration are then able to experience a smooth uninterrupted ceiling surface that is able to partially or completely light up as desired.

Figure 15:
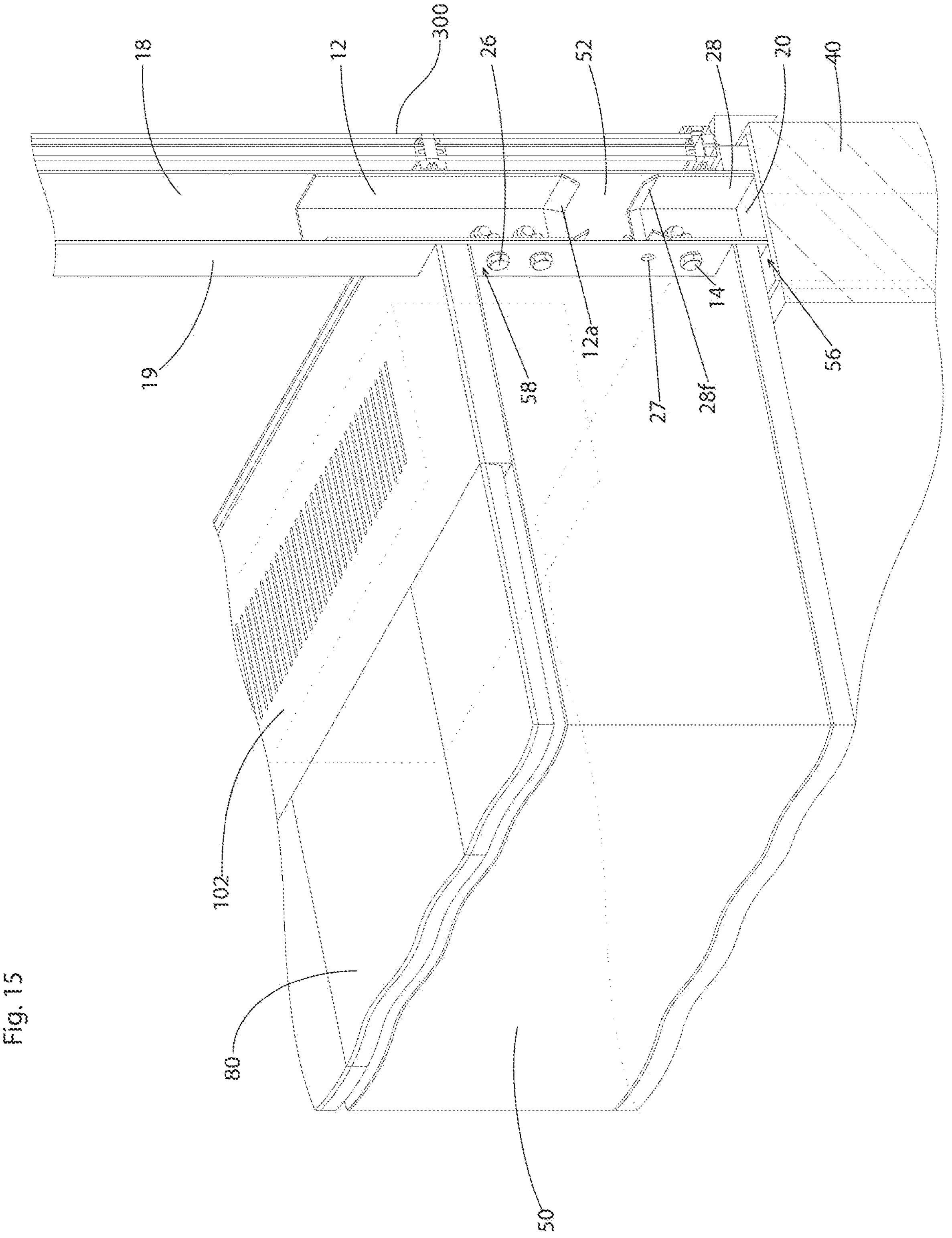
FIG. 15 is a cross sectional diagram of a floor panel with a deployed load bearing column, illustrating an airplex unit and floor panel systems.
Figure 16:
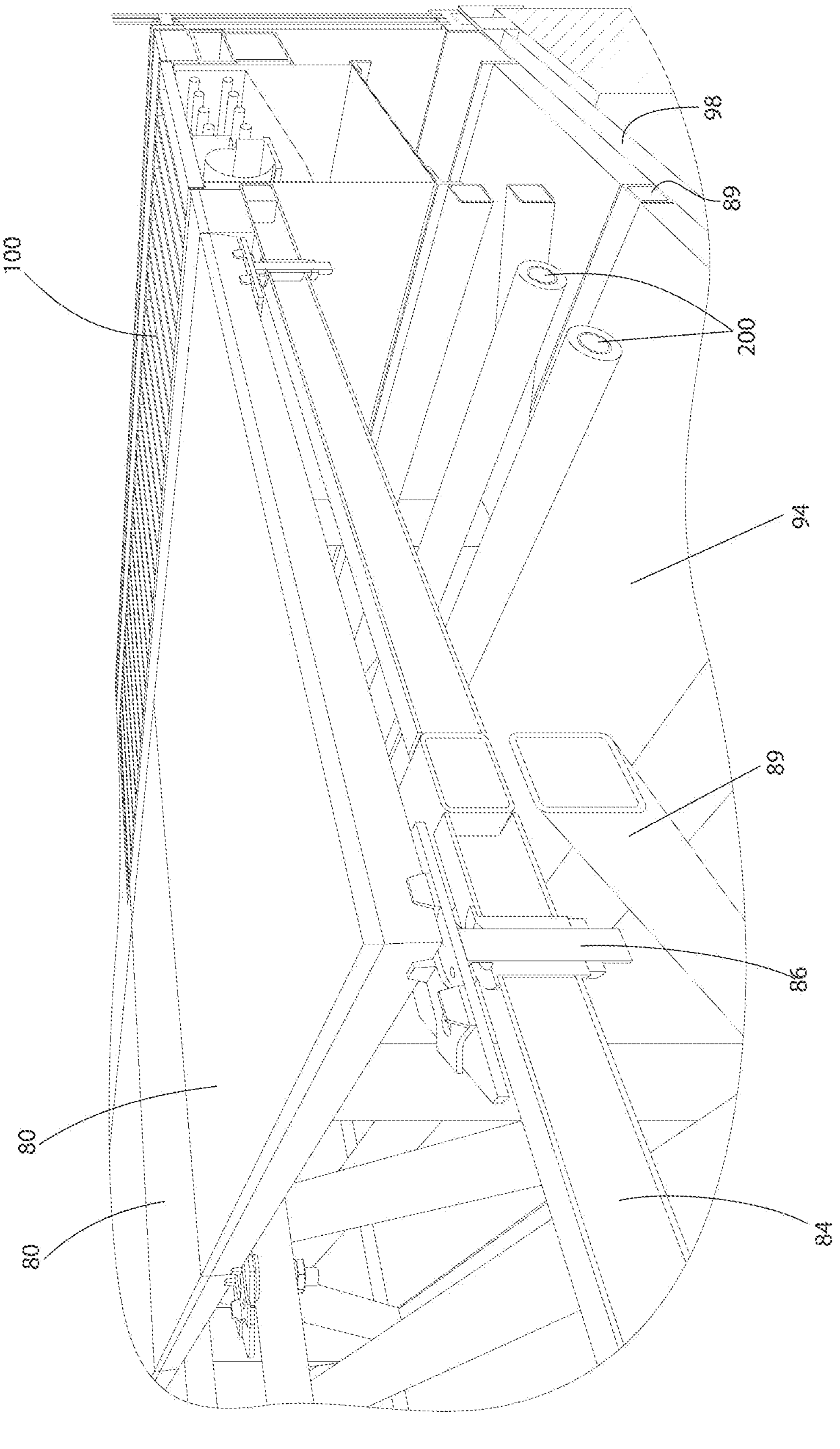
FIG. 16 is a cross sectional diagram of the floor panel demonstrating an ak airplex and self-leveling floor system.

FIGS. 15 and 16 disclose a detailed view of the load bearing column 18, as it is integrated with the floor tiles 80 and alp airplex 100. FIG. 15 demonstrates a single connector 52 that is a part of the base floor panel 50. The first end 12 is shown embedded within the connector 52 from the second end 58, While the anchor 28 is embedded within the connector from the first end 56. Noticeable in FIG. 15 is that both the first end 12 and the anchor 20 contain tapered ends 12*a* and 28*f* respectively, which assist with assembly of these components.

Fastening bolts 26 inserted through openings 27 in the connector 52 couple the first end 12 with the connector 52. Likewise, fastening bolts 14 of the anchor are inserted through the opening 27 of the connector 52. Together, the anchor 28 and connector 52 form an anchor lock. The cover 102 and the floor tiles 80 form the top surface 92 of the floor panel shown.

FIG. 16 then demonstrates a single tile 80 of a plurality of tiles where the pedestal base 86 is disposed on each corner of the tile 80. The pedestal base 86 is shown supporting between one and four adjacent tiles 80. Each pedestal, base 86 is mounted on a structural element 84. The structural element, along with the structural element 89 are shown to be a lattice of interconnected girders. Alternatively, the structural base formed by structural elements 84 and 89 may be replaced by a single piece basin formed from metal wood or stone sheeting carved out of a single piece or artificially bonded together. Each individual structural element 84 or 89 may be formed in a plurality of parallelogrammical or tubular shapes. The pipes 200 shown within the floor panel cavity 94 may be two of a plurality of water pipes or a water pipe and an air duct or a water pipe and an electrical conduit. Visible below the structural element 89 is the thermal, sound and moisture insulation layer 98.

FIGS. 8, 9A and B, and FIG. 16 demonstrate the novel floor leveling feature of the present invention. In the current art, the stem 82 would be free standing on top of a base plate, which would be supported by a concrete or wooden floor. Each such stem would have to be linked by rods that provide the structural stability for the stems and support the raised floor tiles. On the contrary, the disclosed flooring does not need the interesting rods. Each tile or several tiles are supported by a self-leveling, independent pedestal base.

Figure 17:
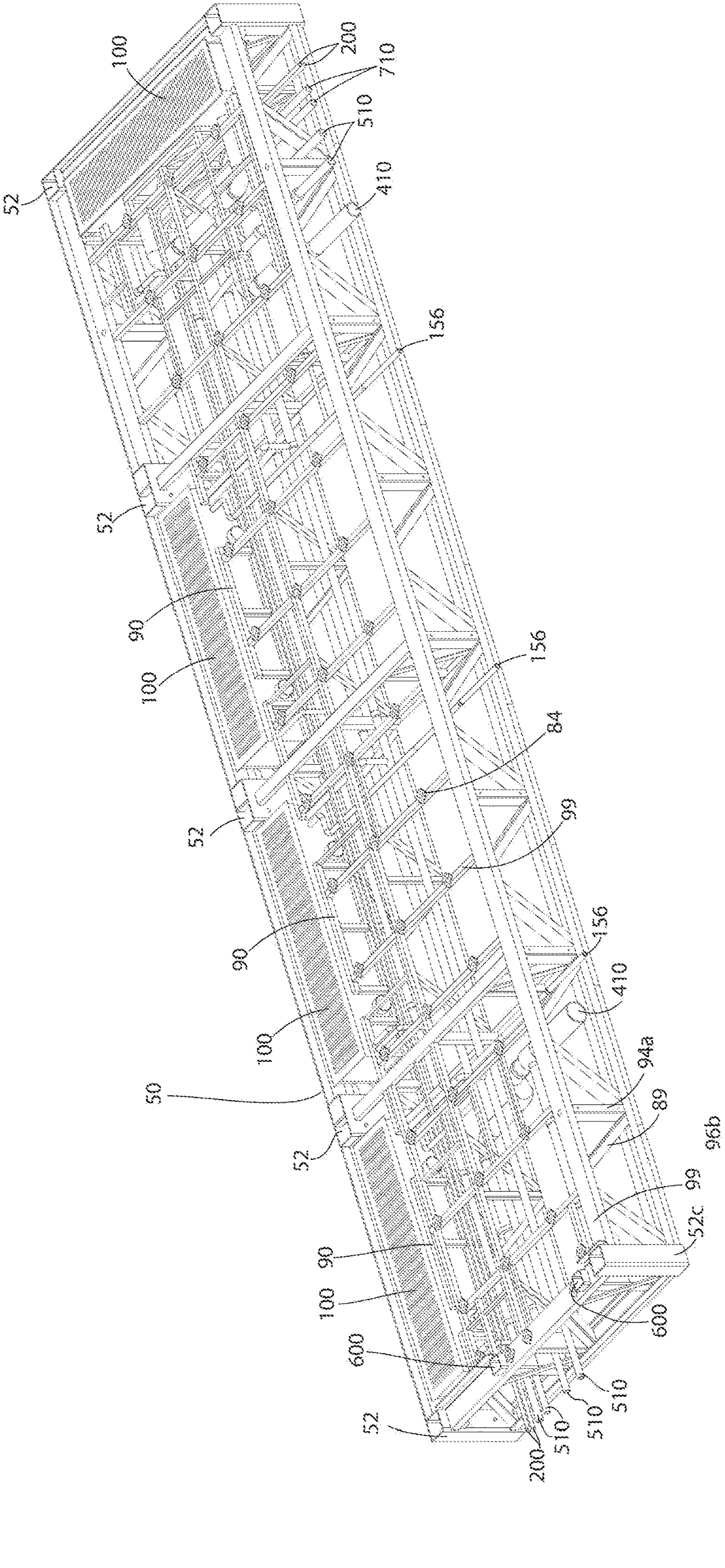
FIG. 17 is a full profile view of a fully assembled base floor panel or an interfloor floor panel.

FIG. 17 is a full production embodiment of the structural base 90 of the floor panel 50. The figure demonstrates that each floor panel 50 is part of a larger floor system, where a plurality of water pipes 200, electrical conduits 510 and air ducts 410 are connect to adjacent floor panels 50 to bring required facilities and infrastructure to the various ports of the structure. The floor panel 50 (which may be the interfloor floor panel 60) is shipped in this fashion, as a fully assembled panel to a construction site, to be assembled with adjacent, lower or upper floor panels in an order prepared at the factory.

A frame comprised of the upper lip 99, the lower girder 94*a* and vertical and diagonal upright joists 89 that are joined on four corners by the connector tubes 52*c* form the side partitions 94 and the basic structural base 90 of each floor panel 50. The particular assembly of beams and girders can vary widely. Furthermore, a floor panel 50 need not be rectangular, but may be square, triangular, circular or elliptical. Also shown are four condensation pipes 156, having exposed connectors 158. Also visible in FIG. 17 is a top lip 99 of the structural base 90 showing the opening 96*b* for the O-ring 96. Note that sockets 600 are connectors for the integrated door system and function as ducts openings connecting to the frame 610.

Figure 17A:
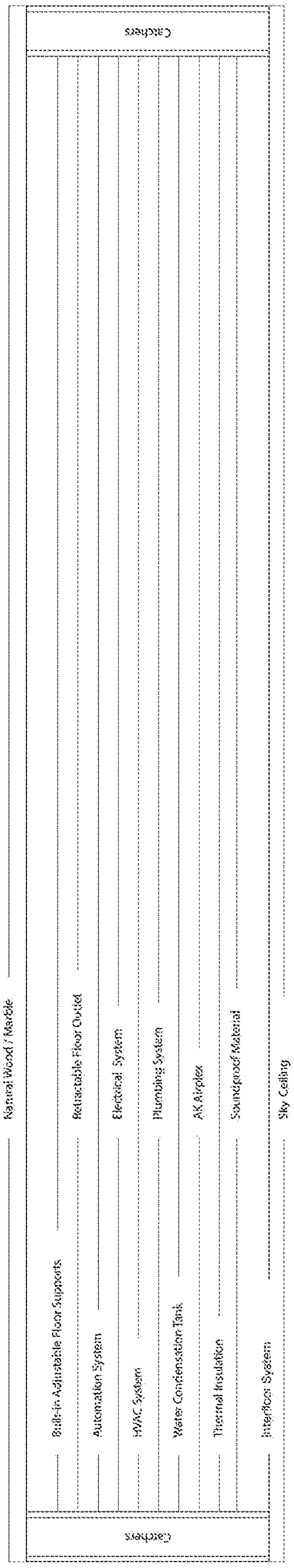
FIG. 17*a* is a high-level diagram of a integrated floor system formed from a plurality of individual floor panels joined adjacently; the systems described may be across such panels or contained within a single floor panel.

FIG. 17*a* is a high-level review of a typical floor panel described in the present invention and all systems that are integrated within. The top surface of a floor panel is a floor covering, such as marble or wood veneer. The veneer level is millimeters in thickness to improve fireproof characteristics of the disclosed invention. A wood veneer that is several millimeters thick will disintegrate when exposed to flames leaving nothing for flames to take hold of Obviously stone or marble veneer does not burn. The wood or marble veneer sits on top of built-in adjustable floor supports. Each panel features a plurality or retractable or recessed floor outlets that are securely covered. An automation system is connected to electronic, communication, audio/video and lighting systems. The automation system is integrated with the electrical systems and runs in parallel thereto via metal conduits. Each panel contains an HVAC system, a plumbing system and supporting equipment thereof, such as the ak airplex and the water condensation tank. The lowest layers of each floor panel comprise a thermal insulation layer and a soundproof layer. The only destinction between the floor panels making up the interfloor floor system and the base floor system is that the floor panels of the interfloor floor system will have the sky-ceiling as their lowest layer, with the sky-ceiling illuminating the interior space beneath a articular floor panel.

Figure 18B:
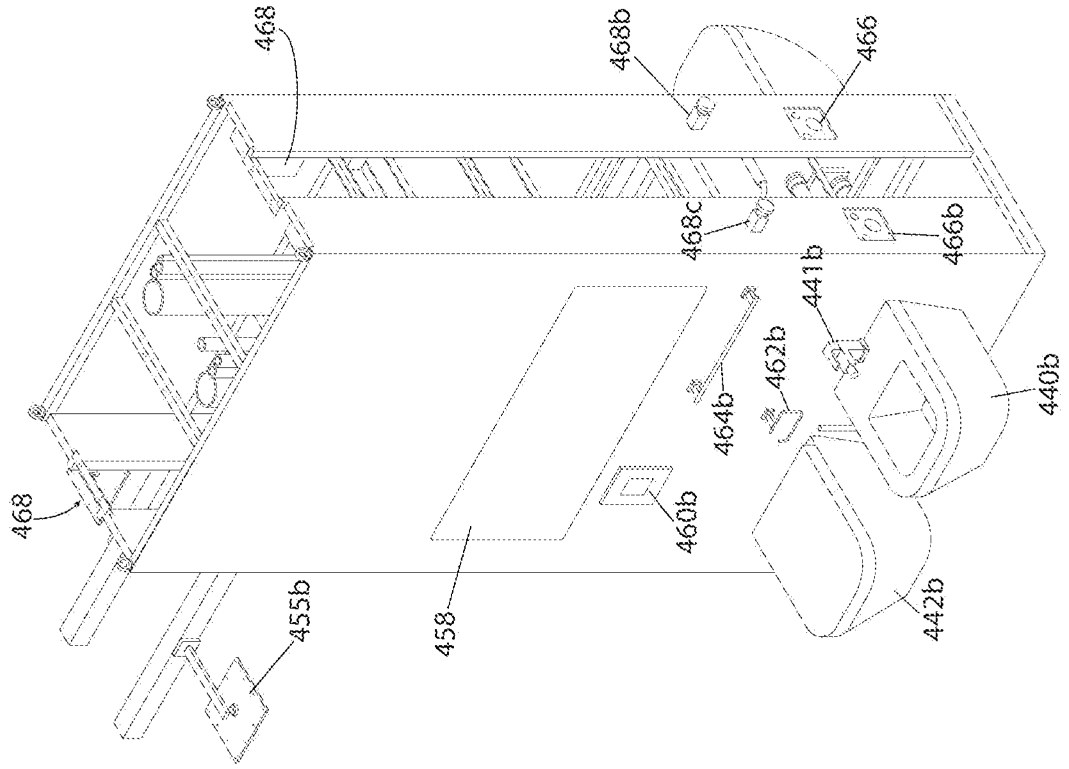
FIGS. 18*a* and 18*b*, are profile views of a fully assembled bathroom shaft.
Figure 18A:
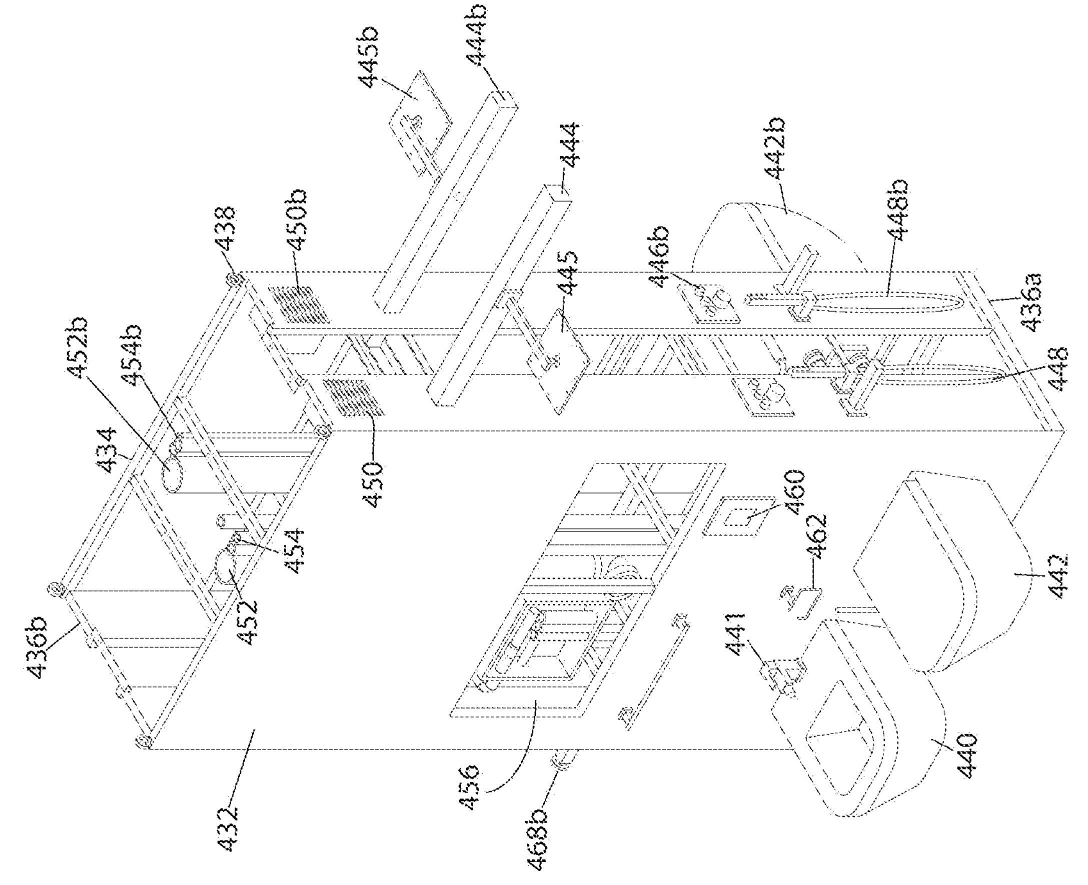

The bathroom shaft 430 represents an integral portion of a plumbing and HVAC systems described in the disclosed invention. Shown in FIGS. 18*a* and 18*b*, is the exterior shell 432, the framework 434, lower attachment brace 434*a* and an upper attachment brace 434*b*. It is preferred that a single bathroom shaft is able to support two bathrooms within the same floor panel. The bathroom shaft 430 is delivered fully assembled and ready for use and is unloaded and installed using the D-anchors 438.

The infrastructure provided by a single bathroom shaft is multiplied at least by two, in support of the two back to back bathroom facilities on either side of a given shaft 430. The internal plurality of water pipes 454 and 454*b* and the internal drainpipes 452 and 452*b* may contain connectors to pipes of a floor panel above to supply water and facilitate drainage from upper floors. Furthermore, one of the drainpipes 452 or 452*b* may also serve as rainwater drainpipe. Also shown are the transport D-anchors 438, the sinks 440 and 440*b*, faucets 441 and 441*b*, toilets 442 and 442*b*, shower supplies 444 and 444*b*, shower heads 445 and 445*b*, bathtub water supplies 448 and 448*b*, shower water controls 446 and 446*b*, flushers 460 and 460*b*, toilet paper dispensers 462 and 462*b*, bathtub drainages 466 and 466*b* and bathtub water controls 468*a* and 468*b*. The shower water controls 446 and 446*b*, as well as bathtub controls are designed to maintain a preset temperature within the pipes supplying shower heads or bathtub water supply. This may be accomplished by heating water within the pipe or by having a direct feed from the water warming means within the mechanical block 630. The precise temperature measurement is part of emphasis on water conservation, so that a user need not to waste water on useless spillage while waiting for water to cool down or warm up to reach desired temperatures.

The interior plumbing pipes and drainage of 452 and 454, as well as engineering behind the flusher 460 and water controls 446 and 440 may all be accessed through the utility openings 456. When everything is functioning normally, the utility openings are closed with a utility panel 458 which is flush with the rest of the exterior shell surface 432 for concealment. The utility panel 458 is closed using latches or magnetic attachments.

It should be noted that no equipment is connecting to the floor of the bathroom. All drainage and water supply passes exclusively through the framework 434 of the bathroom shaft 430. Drains and water supply from the sinks 440, bidets 442, showers 448 and 445 and bathtubs 466 and 468*a* and 168*b* are all mounted into the shell 432 of the bathroom shaft 430. This configuration eliminates the need to have any water supply or drainpipes passing the floor of a bathroom. Therefore, the manufacturing plants producing the structural base 90 of the disclosed floor panels may install a single uninterrupted section of stone or marble slab to cover the entire floor of a bathroom. This is not only aesthetically superior to the typical tile and grout combination but is also hygienically correct since there are no grout seams where bacteria can settle and multiply. In similar vein the panels of the exterior shell 432 are flush and seamless, save for the utility openings 456 and openings for various controls and attachments. It is preferred that the exterior shell is made from polished steel, which is both aesthetically appealing and hygienically correct.

The bathroom shaft 430 is preferably deployed along the length of a floor panel 50, and preferably at a seam between two adjacent floor panels 50, thus providing an additional stabilizing and, binding force to for the floor panels 50. The bathroom shaft 430 is installed by bolting lower attachment brace 436*a* to the structural members of a floor panel 50 and then connecting the plurality of water pipes 454 and 454*b* and the plurality of drainage pipes 452 and 452*b* to the plurality of drainage pipes and water pipes within a floor panel 50. Similarly, the upper attachment brace 436*b* is bolted to a structural member of a floor panel 60, or roof panel 70, directly overhead with water pipes and drainage pipes connecting to the plurality of water pipes and drainage pipes of the overhead floor panel if required.

It should be noted that for all discussions regarding engineering systems disclosed in this invention, the term floor panel 50 is interchangeable with the term base floor panel 50 or interfloor floor panel 60, and mean all of the variations of floor panels, unless the discussion is regarding the roof panel 70 or if otherwise described in the description. The gaps 468 in the exterior shall of the bathroom shaft 430 are intended to accommodate a wall installation.

Still referring to FIG. 18*a*, shown are air intake vents 450 and 450*b* that lead to a duct within the interior frame 434. The exhaust ducts in the bathroom shaft then connected to one of the plurality of ducts in the floor panel 50, and if required, the duct above the intake vent 450*a* dn 450*b* are connected to a floor panel 60 directly overhead.

Figure 19:
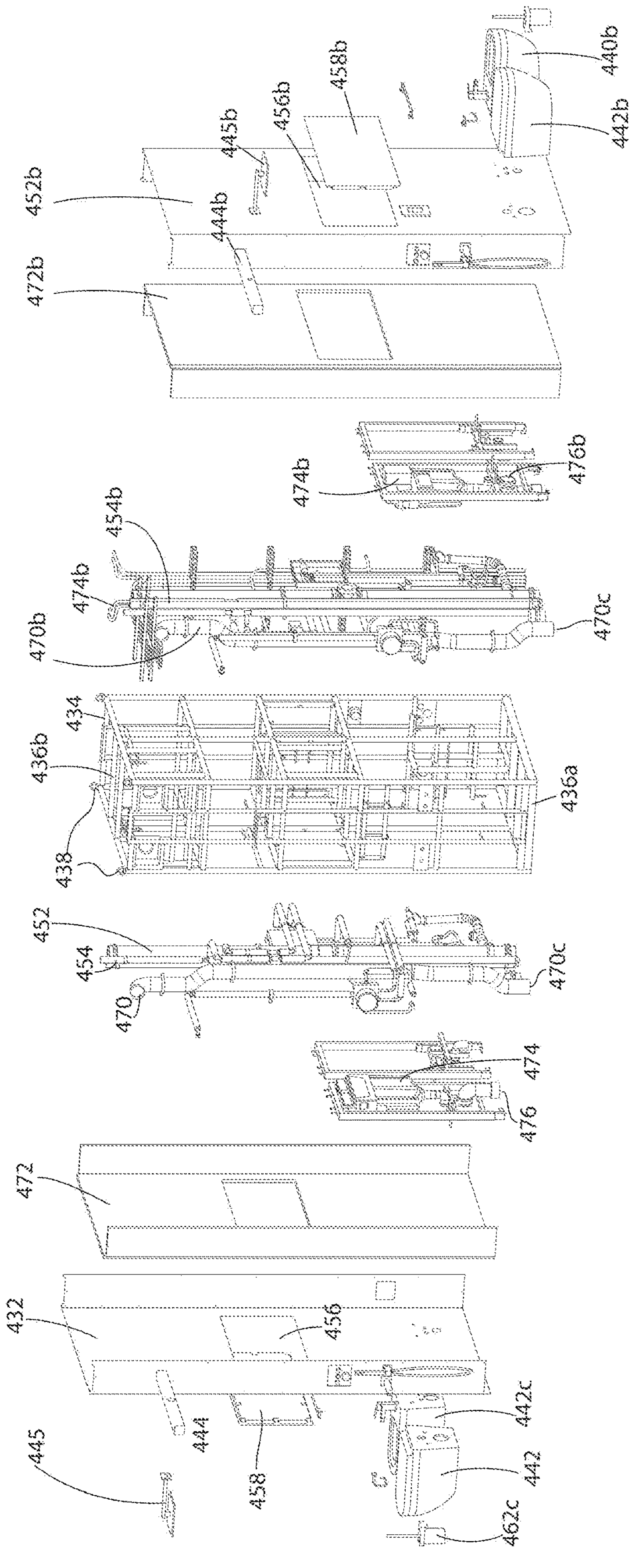
FIG. 19 is an exploded diagram of a bathroom shaft.

FIG. 19 is an exploded diagram of a bathroom shaft 430 demonstrated external and internal components thereof. Shown is the shower heads 445 and 445*b* and shower attachments 444 and 444*b*, exterior shells 432 and 432*b*, interior insulation panels 472 and 472*b*, plunger attachment 462*c*, bidets 442 and 442*b*, also visible is the bidet drainage 442*c*, the intake vents 470 and 470*b*, plurality of water pipes 454*a* and *b*, drainpipes 452*a* and *b*, a toilet drain 476*b* and *b*, a power flushing tank 474*a* and *b*, utility opening 456*a* and *b* and utility covers 458*a* and *b*. It should be noted that there may be a conduit for electric wiring 474*b* that may pass through the framework 434. The lower attachment brace 436*a* bolts onto a lower floor panel, which may be a base floor panel 50 or an interfloor floor panel 60, while the upper attachment brace 436*b* bolts unto the upper or interfloor floor panel 60 or roof panel 70.

Figure 20:
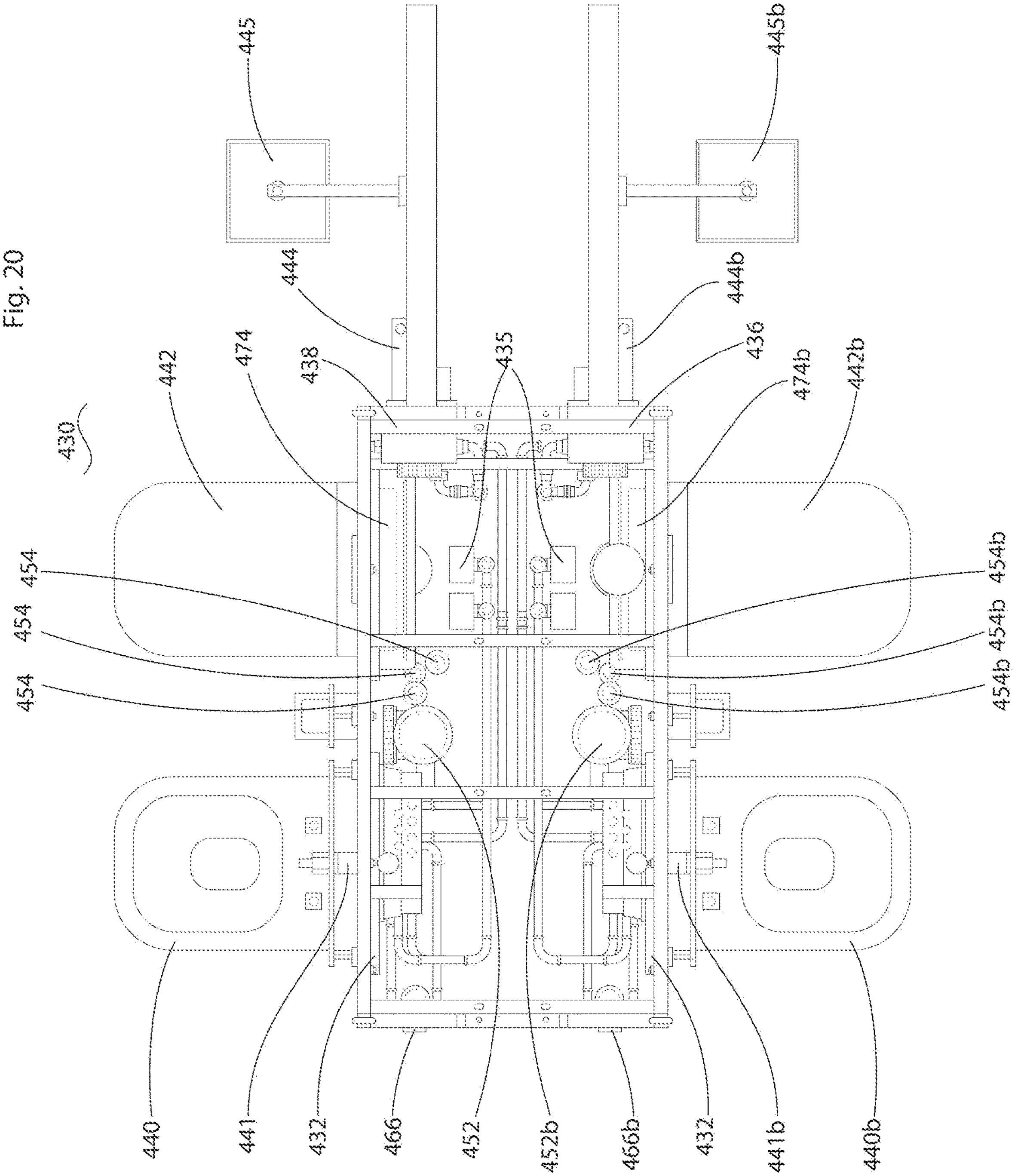
FIG. 20 is an overhead diagram of a bathroom shaft.

FIG. 20 is an overhead view of the bathroom shaft 430, shown are the transport D-anchors 438, upper attachment joist 436*b*, internal framework 432, the sinks 440 and 440*b*, faucets 441 and 441*b*, bidets 442 and 442*b*, shower supplies 444 and 444*b*, shower heads 445 and 445*b*, shower water controls 446 and 446*b*, bathtub drainages 466 and 466*b*, a plurality of drainage pipes 452 and 452*b*, plurality of water pipes 454 and 454*b*, flushers 474 and 474*b*. It should be appreciated that while the bathroom shaft 430 is shown to be substantially rectangular to present a flat wall 474, the walls 474, one or both of the walls 474 may be curved, L-shaped, J-shaped, concave or convex. At least one flood detection monitor 435 is deployed within the internal framework 432 and is configured to determine a leakage or flooding within the bathroom shaft 430 or in the bathroom area outside the shaft. The detection sensitivity may be preferably configurable as part of the automation system disclosed with the application. The flood detection monitory 425 is able to remotely or electronically trigger a signal to water valves to cut off water supply upstream from the location of the flood to minimize the actual leakage or flooding and any resulting damage, as well as to minimize water waste.

The door and frame combination disclosed in the present invention represent another seminal system that enables an organized, minimalistic and safe environment disclosed in the present invention, where nothing needs to be hanging off walls or ceilings, and high voltage current is safely out of reach of children and pets.

Figure 21:
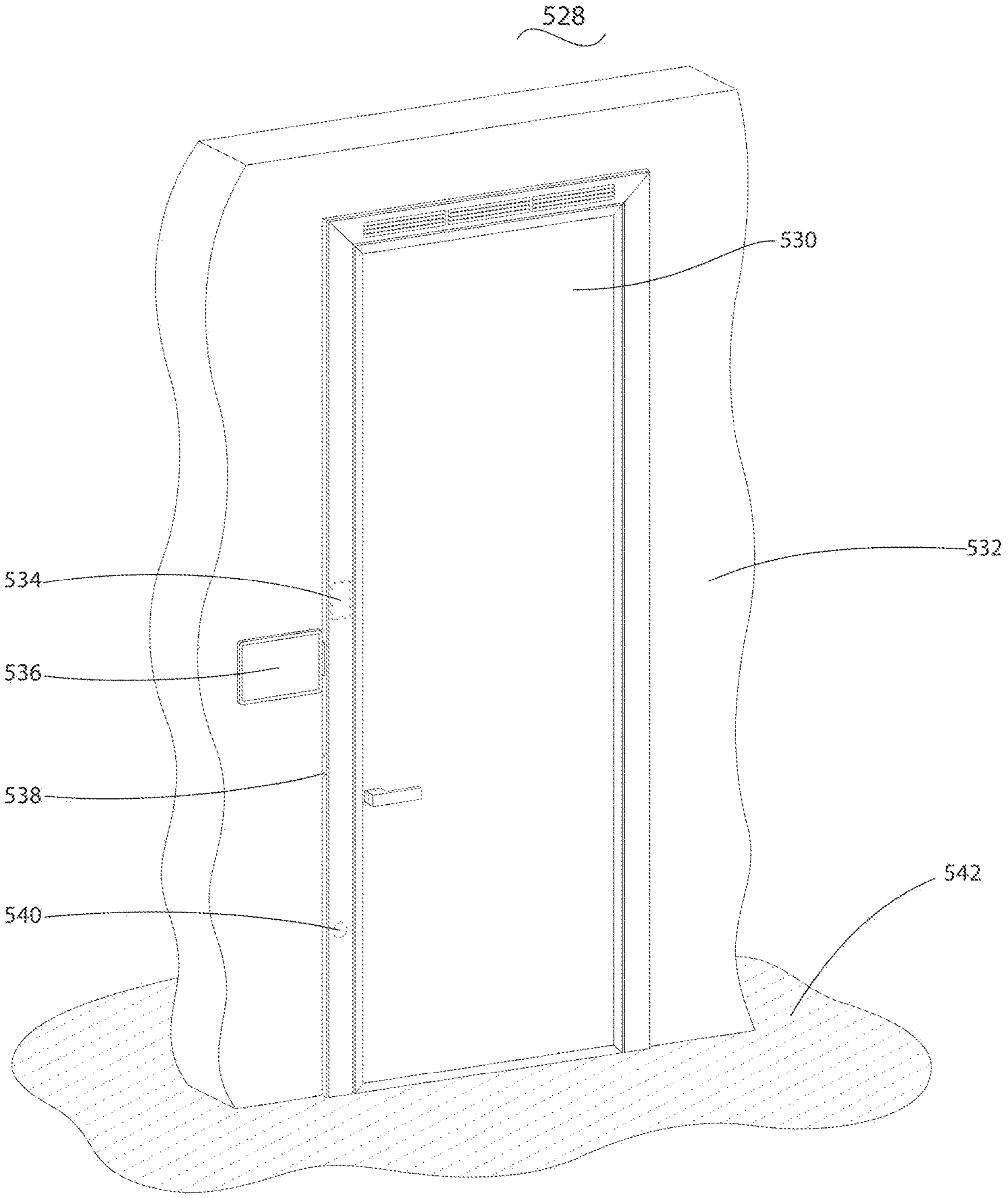
FIG. 21 is a contextual diagram of a door system.

Disclosed in FIG. 21 is a door system 528, showing the door 530, wall adjacent to the door 532, floor 542, retractable outlet 540, manual light and lock actuators 538, tablet computer charger 536 and mobile device charger 534. The mobile device chargers 534 and 536 are preferably magnetic and utilize proximity magnetic field to charge devices disposed thereon. The mobile device charger 534 is preferably completely wireless and invisible to user, such that the aesthetic clean appearance of the first portion 552 is preserved. The table computer charger 536 preferably contains a universal serial bus connector for charging and to be integrated with the automation cloud disclosed in the present invention. The mobile device pad 534 besides serving as a charger for mobile devices, is also a remote key that enables a user accessing the door 530 to lock and unlock the door 530, turn lights to a predetermined setting, turn temperature inside to a predetermined setting or enable or disable other electronic functions, all based on saved settings identified by home automation system based on the identification of mobile device used. For additional security, doors may contain motion sensors, retinal, fingerprint or biometric scanners to limit the threat of unauthorized use of a mobile device.

Figure 22:
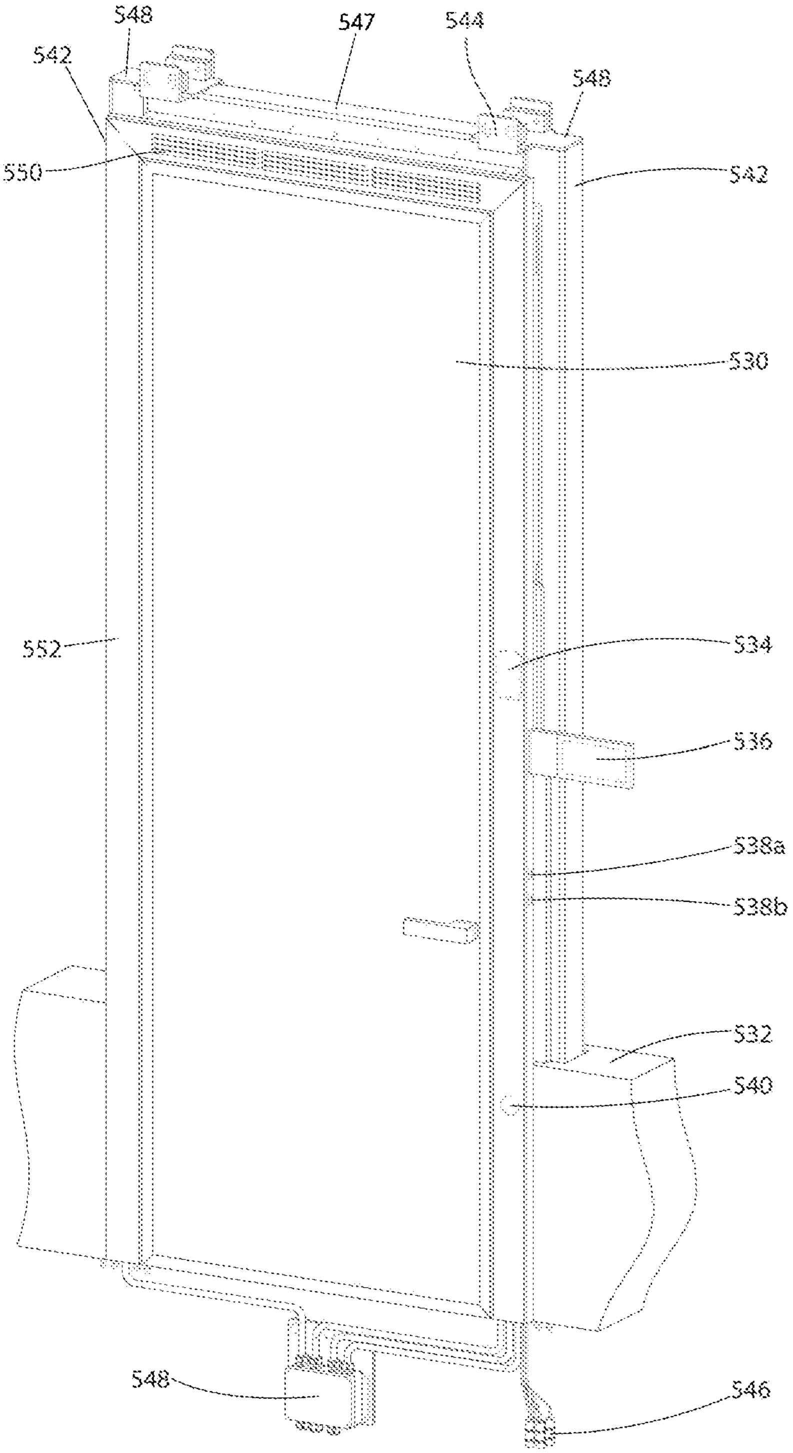
FIG. 22 is a cutaway diagram of a door system.

FIG. 22 demonstrates additional detail of a door system 528. Disclosed is a door 530, a proximity mobile device charger 534, preferably with embedded electrical coils to induce a charge on a mobile device magnetically adhered thereto, a tablet device holder 536, a manual light override 538*a*, a manual lock override 538*b*, a section of the wall 532, a retractable electrical outlet 540, an electrical plug 546, a junction box 548, a door frame 552, at least one vent 550, mounting brackets 544, a parallel duct member 542 (or ventilation shaft), an horizontal beam 547. The electrical outlet 540 preferably carries a standard household voltage expected for the geographic locale and is intended to power standard electronic devices available to a user. Once retracted, the location of the electrical outlet 540 along the door system 528 is almost entirely imperceptible. Safety features, such as detection of use by a small child, built into the retractable outlet or the wireless device charger 534. The wireless device charger 534 preferably comprises facial recognition ability, to a) enable or disable various systems on a door, or to b) remotely open the door 530 as the user approaches. For this purpose, wireless device charger 534 may conceal a camera, including additional features such as retinal scanner.

The structural strength for the door frame is provided by the parallel upright members 542 that are linked together by horizontal beam 547. The parallel upright members 542 and the horizontal beam 547 are linked together to form an air duct. The air duct contains a communication portal with environment outside the air duct through at least one vent opening 550. Depending on the location of the particular door system 528, the vent opening may be a discharging vent or an intake vent. Whether the vent 550 is a discharging or intake vent depends on where the door system 528 is situated in terms of the overall air floor in the immediate interior area the door serves. For example, if the door 528 is located near an ak airplex device 100, which is emitting a flow of air, then the vent 528 will be an intake vent. This way an airflow will be created through the interior space from an ak airplex 100 to the vent 550. On the other hand, if the door is positioned in bathroom space where the bathroom shaft contains an intake vent 450, then the vent 550 of the door system 528 will be a discharging vent. It is important to note that both the ak airplex 100, the door system 528 and the bathroom shaft 430 are all connected to the same plurality of air ducts that exist within a floor panel 50. Furthermore, the fan propulsion behind the door system 528 is not located within the door system itself, therefore, the same door system 528 that functioned as an outlet, may be reconfigured to function as an inlet and visa versa.

The door system 528, is shipped to a construction site as a completed assembly and is mounted at the site to a set of parallel upright vents 542, joined by a horizontal beam 547. However, all other components of the door system 528 are already installed and just need to be plugged in to work. Activation of these components occurs when the plug members 546 are plugged into an outlet connector located within a floor panel 50. This brings electric power to the door system 528 and all of its internal components. It is important to note that transformers for each device located within the door frame become linked as well. Automation and load control for devices is further established then the junction box 548 is plugged into the appropriate outlet already prepared within the floor panel 50. The junction box may be used to disable individual components of the door system 528 for replacement or for other reasons. It may also provide an override capability to access such components when wireless access is not available or not desired. The top ends 548 are shown as closed. If a door system 528 is being installed between floor systems, the top ends 548 will be preferably open, between floors to channel air flow between floors.

Figure 23:
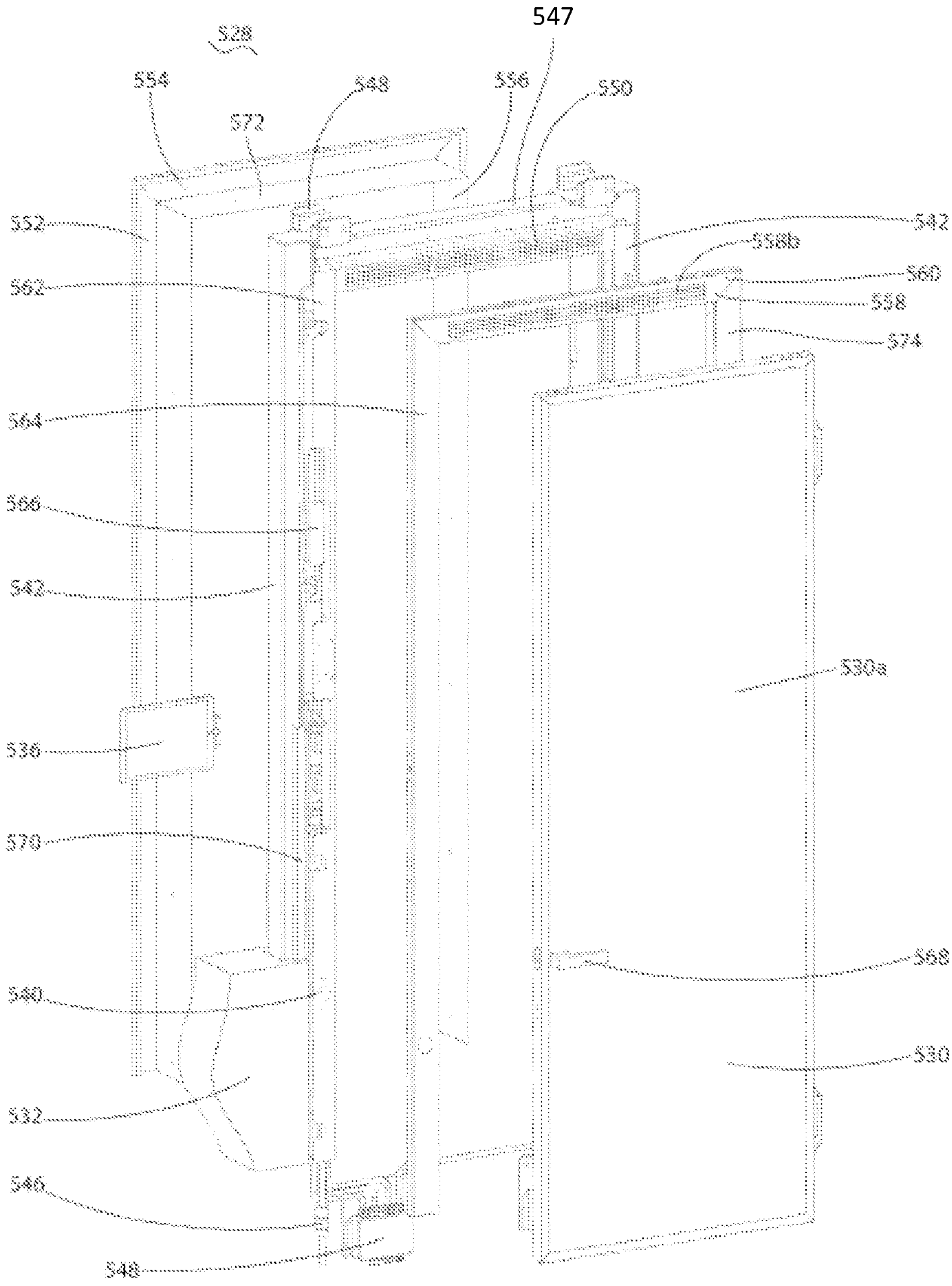
FIG. 23 is an exploded diagram of a door system.

FIG. 23 is an exploded diagram of the door system 528. Shown is the first portion of the frame 552 facing the outside of the door system 528, with the second portion 560 facing inward. The first portion is comprised of two upright door jambs 556 lined by the header 554. A flange 572 all around the first portion 552 extends inward covering the two parallel uprights members 542 and fastens the front portion 552 thereto. The second portion 560 is comprised of two uprights jambs 564 linked by a header 558. The header 558 contains a section of grated surface 558*b* that is opposite the vents 550. A flange all around the second portion 560 extends forwardly to meet the flange of the first portion 572 and covers the two parallel members 542 and the horizontal beam 547 from the inside.

The functional surface 570 may be a separate layer of material that is mounted onto one or both of the parallel members 542 and presents a surface to which automation and electronic components housed in the door system 528. One of these components may be a wireless fidelity repeater 566. The door 530 mounts on the second portion 560. The door is shown having a door handle 568 activating a manual lock. The door handle may also be connected to a magnetic lock or a lock activated by a solenoid. A door handle may be completely removed in favor of a motion sensor, with the door 530 opening and closing automatically when approached or when certain predetermined motions are performed by a user.

The door frame components are preferably manufactured from polished steel to present a germ resistant, timeless surface. The door frame components may also be manufactured from wood or iron parts. The door 530 is preferably a composite made of layers. Exterior layer 530*a* may be made of stone slab, a sheet of wood, fabric, a composite material or a synthetic material.

The exterior layer 530*a* is substantially thin veneer layer, and is attached to at least one additional layer, such as a noise damping on strengthening layer. A honeycomb metal core represents the main strength bearing layer. Layering make it possible to make relatively light weight door out of stone or steel. Layering also enabled exterior cladding layer 530*a* to be different on either side of the door 530.

Figure 24:
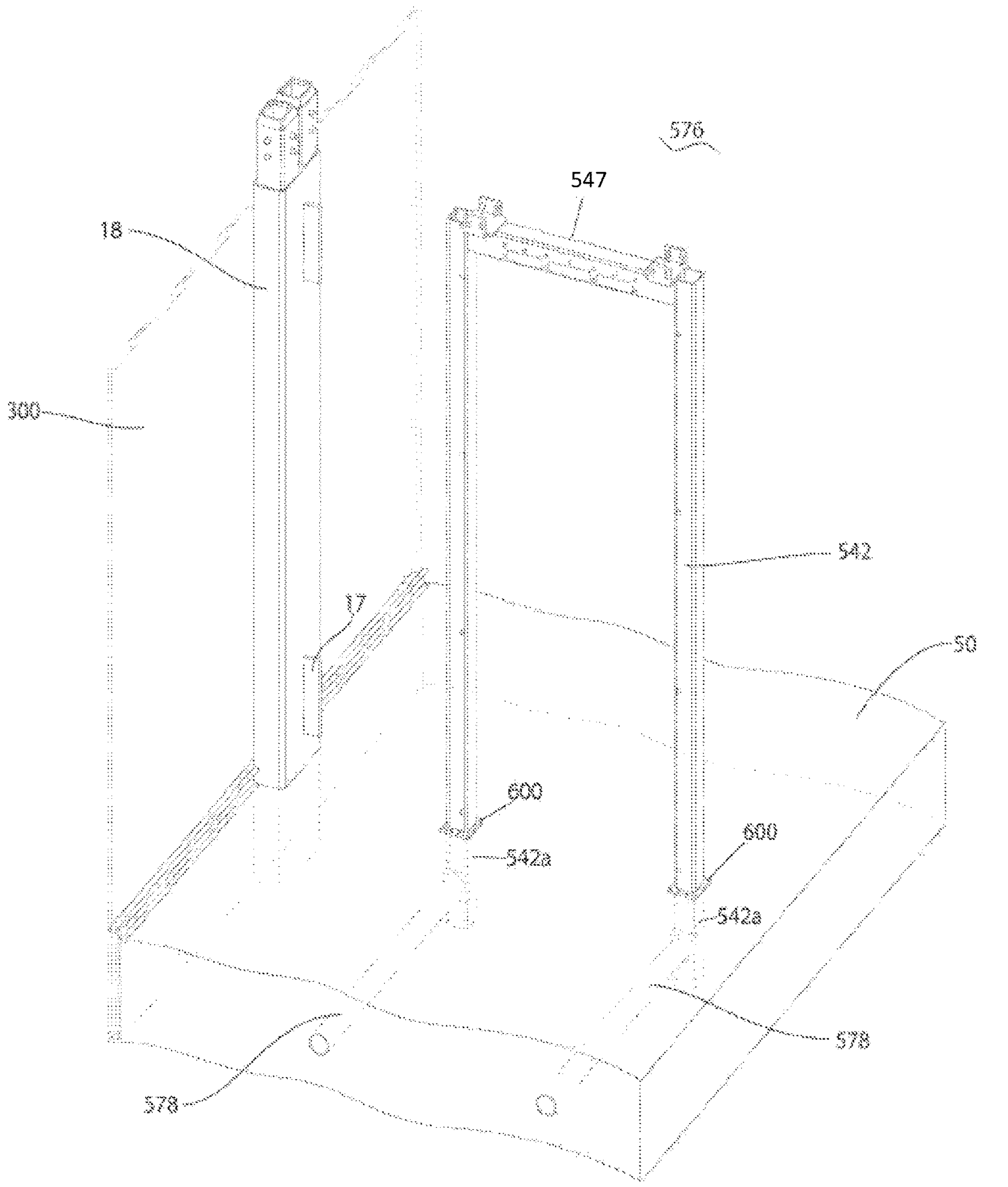
FIG. 24 is a diagram of the door frame ventilation shaft in context of a floor panel and a load bearing column.
Figure 25:
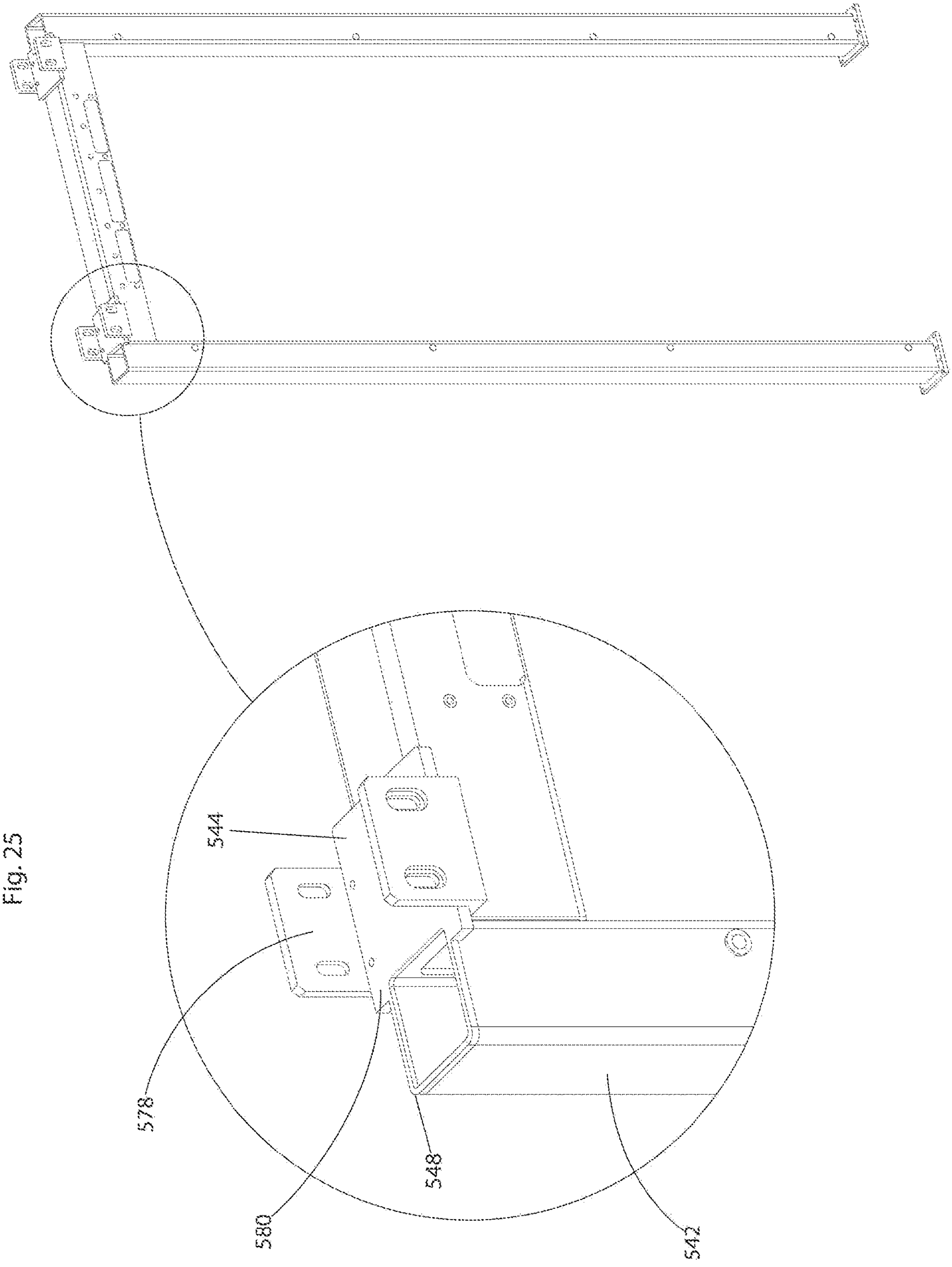
FIG. 25 is a closeup diagram of an upper mounting bracket of a door system.

FIGS. 24 and 25 are detailed diagrams of the door frame 576 that is formed by two parallel upright members 542 spanned by a horizontal beam 547. The door frame 576 inserted through sockets 600 into ducts 542*a*, which connect the door frame 576 with air ducts 578 within the floor panel 50. The ducts 542*a* may continue downward and be part of a door mounted into the floor panel directly below the one shown. Note that the rib protrusions 17 shown on, the load bearing column 18 are intended to link a load bearing column 18 with an end of a section of a wall system 910.

FIG. 25 demonstrates the bracket 544 comprised of parallel uprights 578 that straddle either side of the platform 580. The parallel uprights 578 are fastened to a wall section above the horizontal beam 547. The top ends 548 are shown to be open and link with air ducts such as 542*a* of the floor panel 60 directly above.

Figure 26:
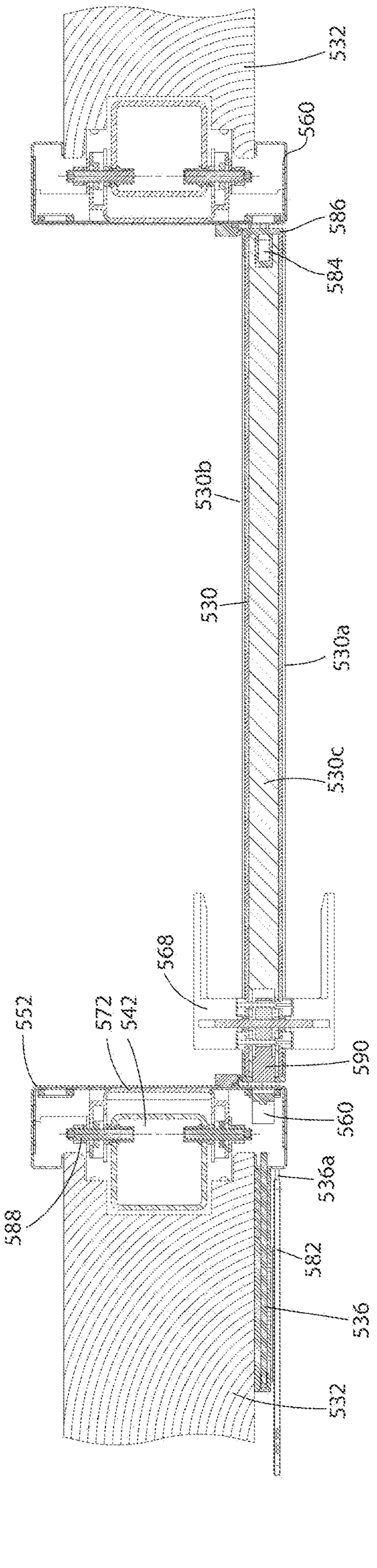
FIG. 26 is an overhead diagram of a door system.

FIG. 26 provides a cutaway view of the door system 528. The door 530 is shown having an exterior decorative layer 530*a*, which may be a marble or wood veneer, an optional additional layer 530*b* and a steel honeycomb core 530*c*. concealed hinges 584 are fully adjustable with respect to depth of the door within the frame 558, the distance of the profile 586 from the frame 558 and upright elevation of the door with respect to the frame 576.

The first portion 552 and the second portion 558 are both mounted unto the ventilation shaft 542 (parallel upright members) using adjustable fasteners 588. The adjustable fasteners are able to shift the frame of the door around the ventilation shaft 542 so as to gain connectivity and adjustment during installation or usage. The shift permitted by adjustable fasteners 588 may be vertical, lateral or right to left. Stated another way, the permitted shift may be accomplished along x, y and z axis. A magnetic latch 590 soundlessly holds the door in place and may be inoperable to anyone other than authorized users of the passageway. The first portion 558 covers of electronic and automation components. A tablet computer pad 536 is shown holding a tablet computer device 582. which is physically connected to the circuitry within the first portion 552 through a universal serial bus connection.

Figure 27:
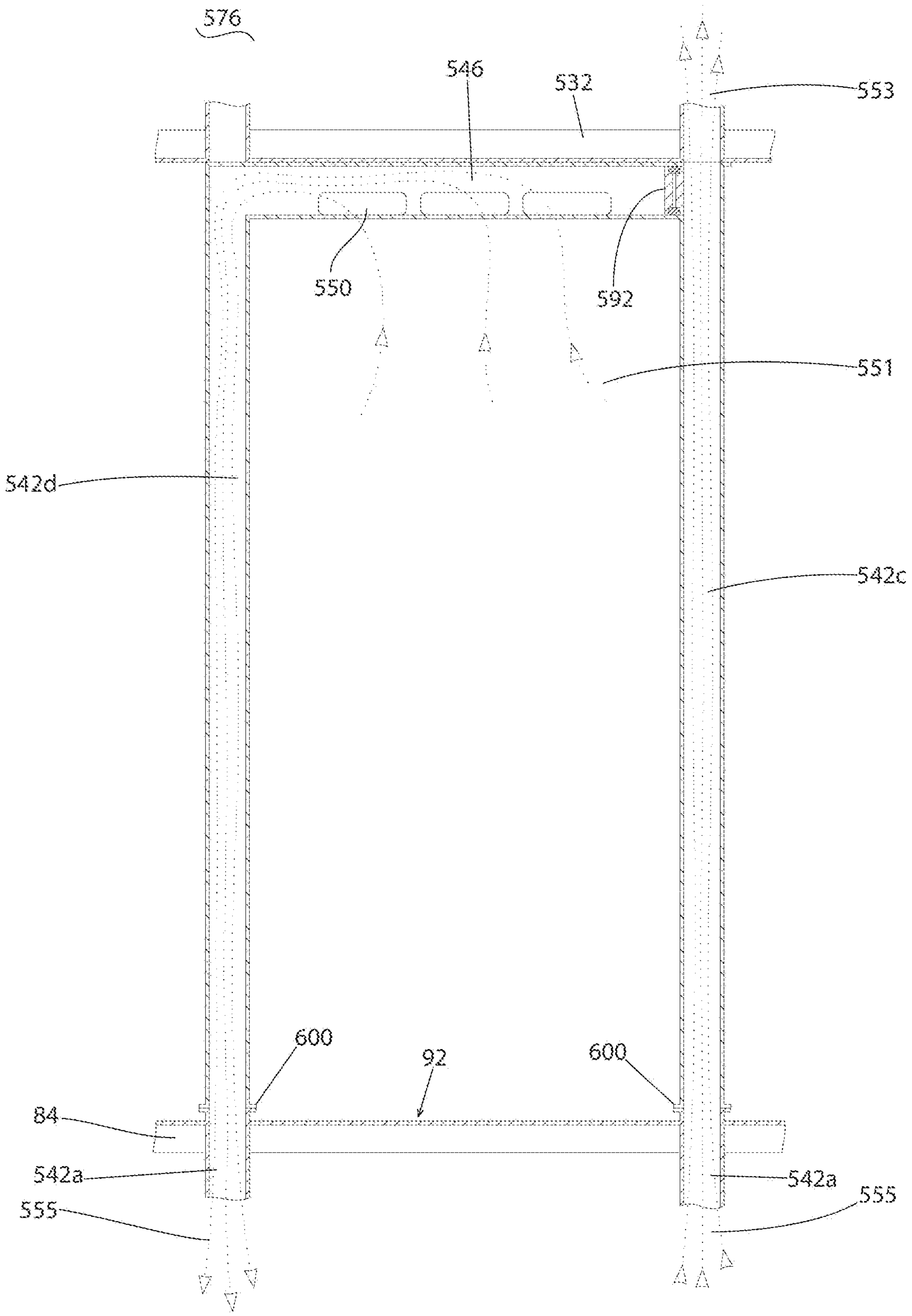
FIG. 27 is an illustration of air flow within the door system.

FIG. 27 demonstrates the floor of air through the ventilation shaft formed by the parallel upright members 542. In FIG. 27, the door frame 576 is as an intake vent and as a ventilation shaft to direct air flow to a floor panel 60 above the door frame 576. In this embodiment the parallel upright member 542*c* functions as a ventilation shaft to channel a flow of air 553 from the duct 542*a* to the floor panel above. The parallel upright member 542*d* and the horizonal beam 546 are sealed from the parallel upright member 542*c* with a wall 592. The parallel upright members 542*c* and 542*d* are both held within sockets 600 on the surface 92 of a floor panel 50. Thus the vent intake openings 550 draw in the air flow 551 and send it down the upright parallel member 542*d* to the floor panel on which the door frame 576 is mounted. Thus a single door frame 576 may serve as a ventilation shaft between floors, as well as an integral input or output vent of the same floor, with air flows being entirely independent.

Figure 28:
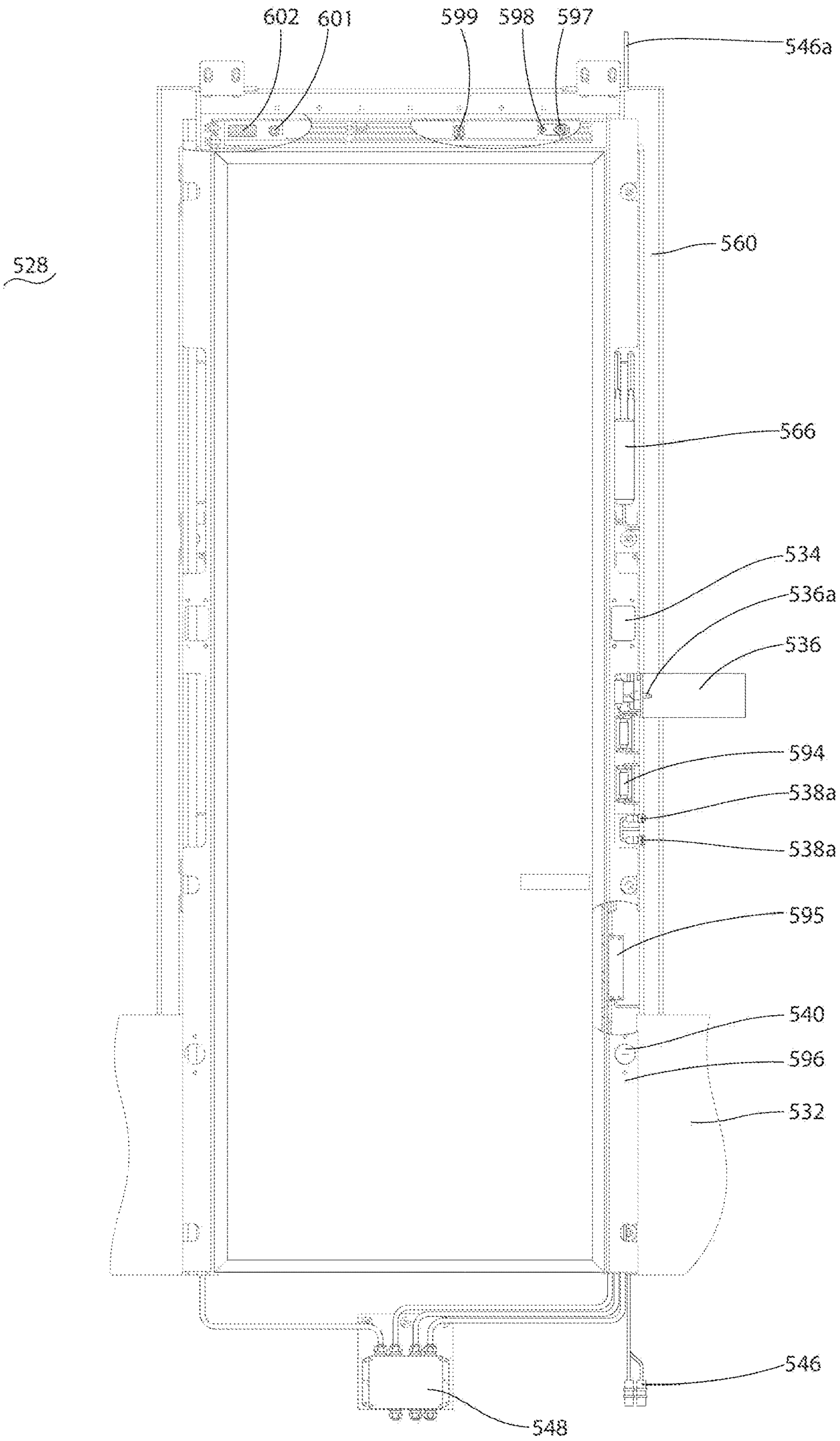
FIG. 28 is a cutaway frontal view of the door system.

As demonstrated earlier. The door system 528 is an important element of the automation system described in the present invention. FIG. 28 demonstrates the various elements, which may be mounted within the door frame 560. Additional or fewer components may be mounted in an alternative embodiment (not shown). Shown is the electrical plug 546, the junction box 548, the magnetic wireless device charger 534, the magnetic tablet holder 536 having a universal serial bus connection 536*a*, a manual sky lights system switch 538*a* a solenoid lock door switch 538*b*, a power supply 594, a solenoid lock 595, a retractable power outlet 540, a motion sensor 596, a surveillance camera 597, a security alert system 598, an air temperature sensor 599, a smoke detector 601 and an audio system 602. The manual switch system 538 may contain additional manual override switches and be triggered with a wave of an arm, proximity of an arm or person, detection of a certain type of sound, such as voice commands.

The retractable outlet 540 is one of the only places on a wall offering standard voltage current. Other outlets with standard voltage are preferably concealed beneath floor tiles 80, or panels designed for this purpose. The power supply 594 may provide override power to the solenoid lock system 596. A connector 546*a* is an outlet offered to a connector 546 of a door frame located on the floor panel directly above. An audio system 602 preferably provides two way communication with any portion of the interior or exterior of the disclosed structure. The audio system is voice operated utilizing code prompts to ensure proper menu commands are utilized.

Figure 29:
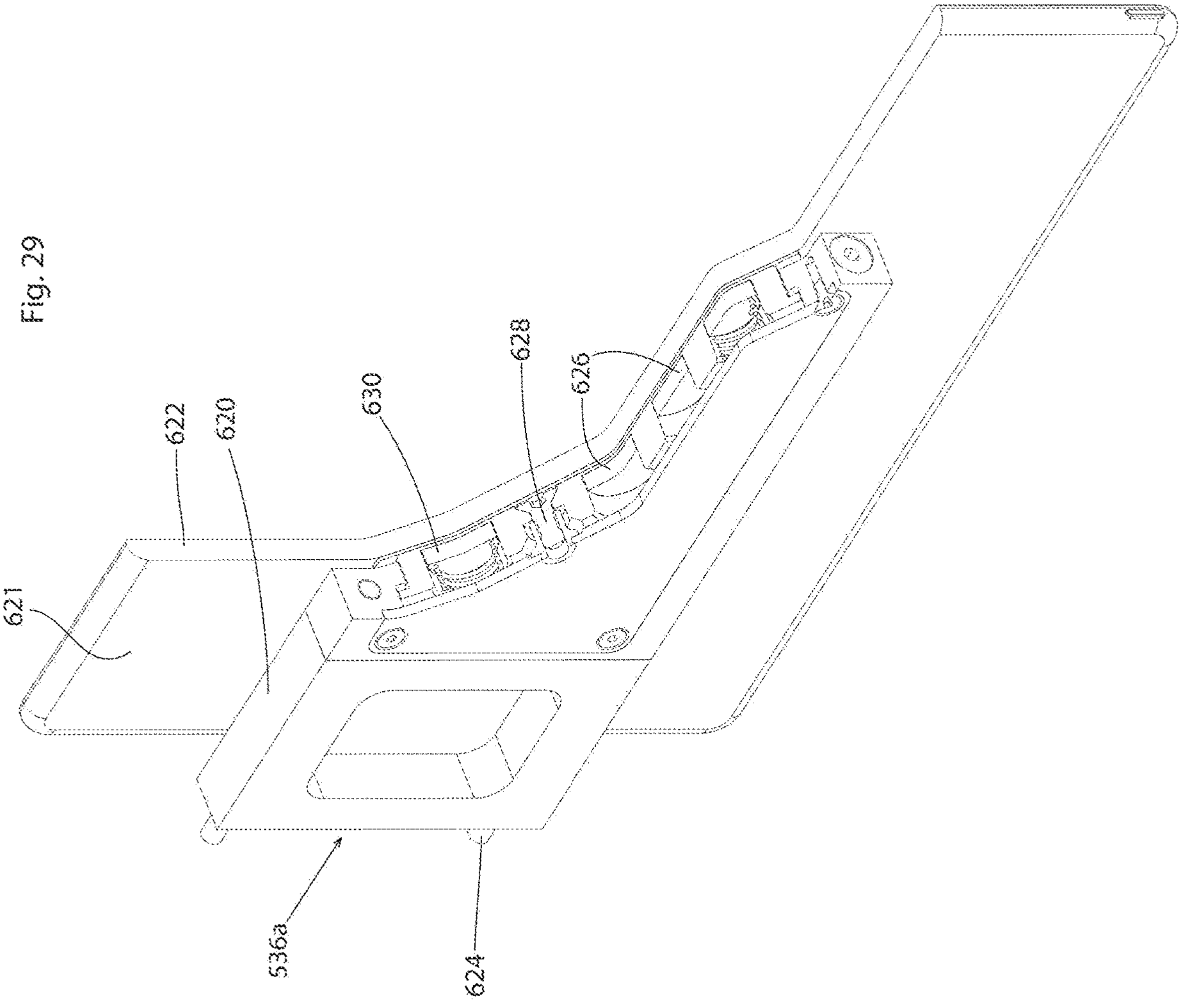
FIG. 29 is a cutaway diagram of the magnetic tablet holder.

FIG. 29 is a detailed diagram of the magnetic tablet holder 536. The tablet holder 536 features a floating platform 621 that is attached to the frame 620. The frame is mounted onto the side of the first portion 560 of the door frame using countersunk screws 624. Two or more magnets 626 hold a table in place on the floating platform. 621. The springs 630 are required to compensate for tables of various thickness to align these with the USB connectors 536*a*. The body of the platform 622 may contain a proximity charging capability by being able to generate a magnetic by having a coil or otherwise.

Figure 30:
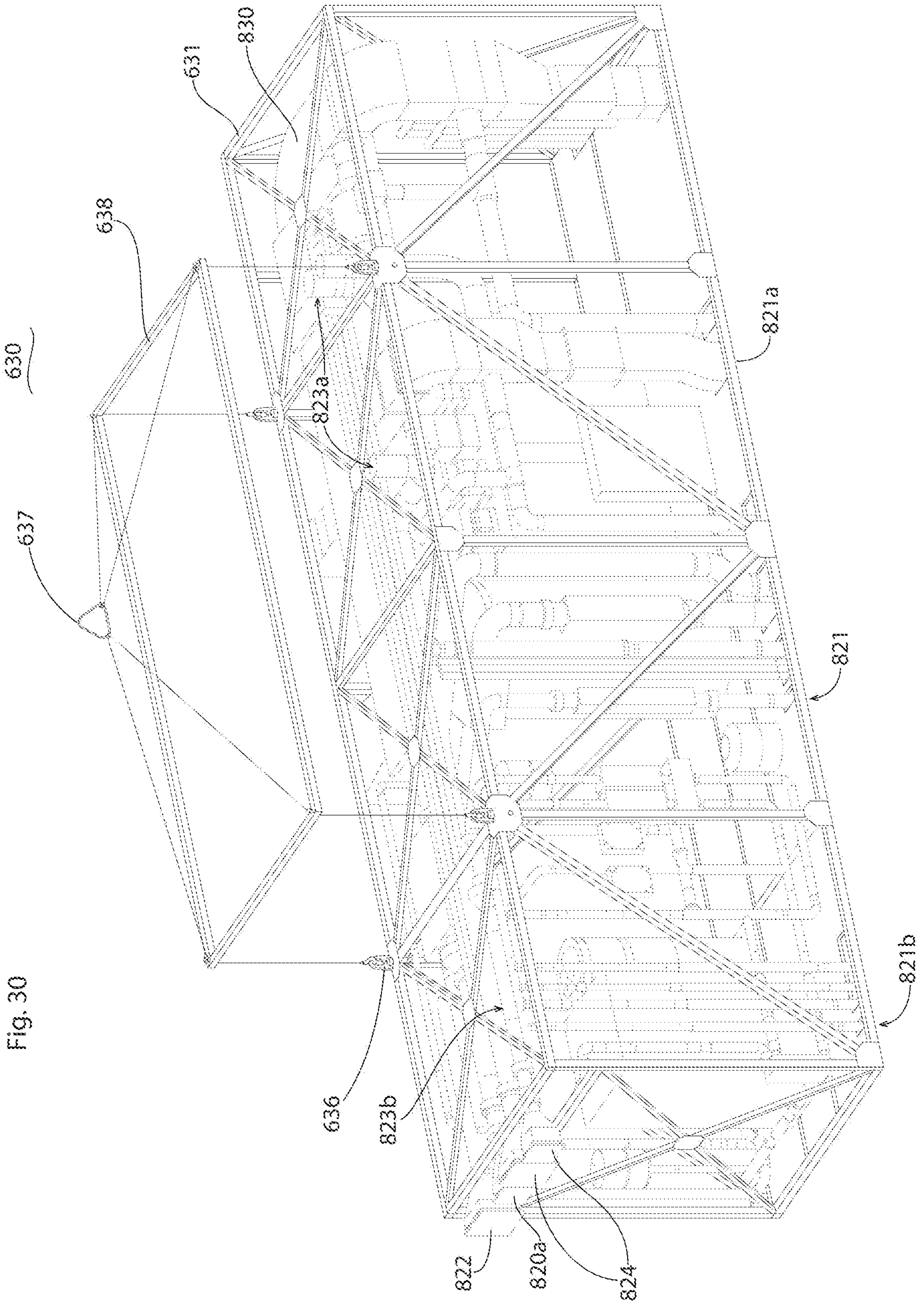
FIG. 30 is a sideview of a complete mechanical block suspended from a crane hoist.
Figure 31:
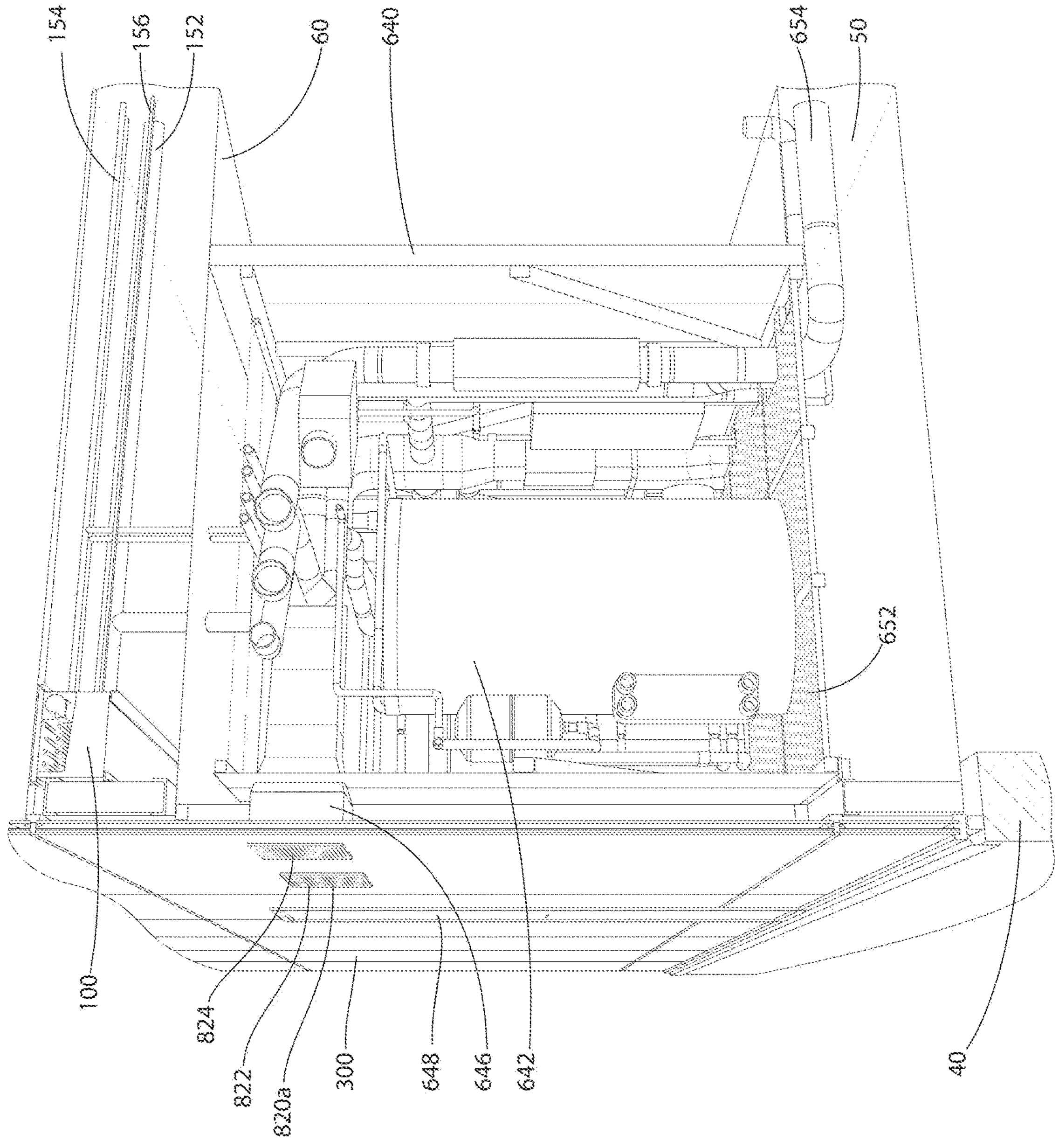
FIG. 31 is a cutaway diagram of a mechanical block.

FIGS. 30 and 31 provide diagrams of the nerve, center of the disclosed invention. Reference is being made to the mechanical block 630. The mechanical block contains all equipment necessary to enable electrical and automation systems, heating cooling and ventilations systems (HVAC), and plumbing system components. The mechanical block 630 is shipped preconfigured with all necessary mechanical components and is able to ship as a standard 12.2-meter container. On delivery, it is hoisted into place using removable swivel D-rings 636 that are connected to a rectangular frame 638. A single hoist 637 may lift the entire mechanical block 630, demonstrating the balance configuration of the internal components.

FIG. 30 is a good illustration that the plurality of pipes, ducts and conduits are exposed and ready to be connected with the plurality ducts, pipes and conduits of the floor panel above using connectors 823*a* and 823*b* as well as to the floor panel below, using connectors 821, 821*a* and 821*b*. The majority of connectors will likely be through the floor 652 since that is the preferred location for water and electricity access, more connectors are in the floor since air, electricity, plumbing and automation is channeled first into the floor panel 50 and then transferred to the floor panels 60 via the door frame 576 and the bathroom shaft 430. However, appreciably, connectors from the mechanical block 630 may lead directly to floor panels above. Furthermore, connectors also lead through the exterior glass paneling 300, such as the intake port 820*a*, exhaust port 822 and exhaust ports 824.

Once installed, the mechanical block is preferably isolated from the rest of the interior space using walls 640. The interior from 642 of the mechanical block 630 is preferably only accessing using a separate entrance and exit door 648 and there are no doors leading into the interior room 642 from within the structure. The internal components of the mechanical room are held on a slated, grille, or honeycomb floor 652, so that leakage is channeled directly toward the foundation and not accumulated within the structure. As demonstrated with the duct 654, the plurality of pipes, ventilation ducts and electrical conduits leading out of the mechanical room 630 may initially pass through the base floor panel 50 and connect with adjunct base floor panels 50 and interfloor floor panels 60, using the ventilation shaft 542 of a door system 528 or plurality of water pipes 454 of a bathroom shaft. The air within the intake shaft 152 of the interfloor floor system 60 shown in FIG. 31 is propelled by fans located within the mechanical room 630 a level below. A single mechanical room 630 may serve multiple floors of a single home, utilizing the interior cavities of floor panels 50 or 60, ventilation shafts of door frames and plurality of pipes within the bathroom shaft to condition air, propel water to faucets, or remove waste. The exhaust intake ports 824, 820*a* or 822 are the only opening in the façade 300 to the environment outside. Unless any windows or doors are opened, the internal and external environments are not, in communication since the glass façade 300 ensures a completely airtight and moisture tight isolation of the two environments.

FIGS. 1-31 have identified the various components of the disclosed invention. The next four figures demonstrate how these components merge to create an integrated ecosystem.

Figure 32:
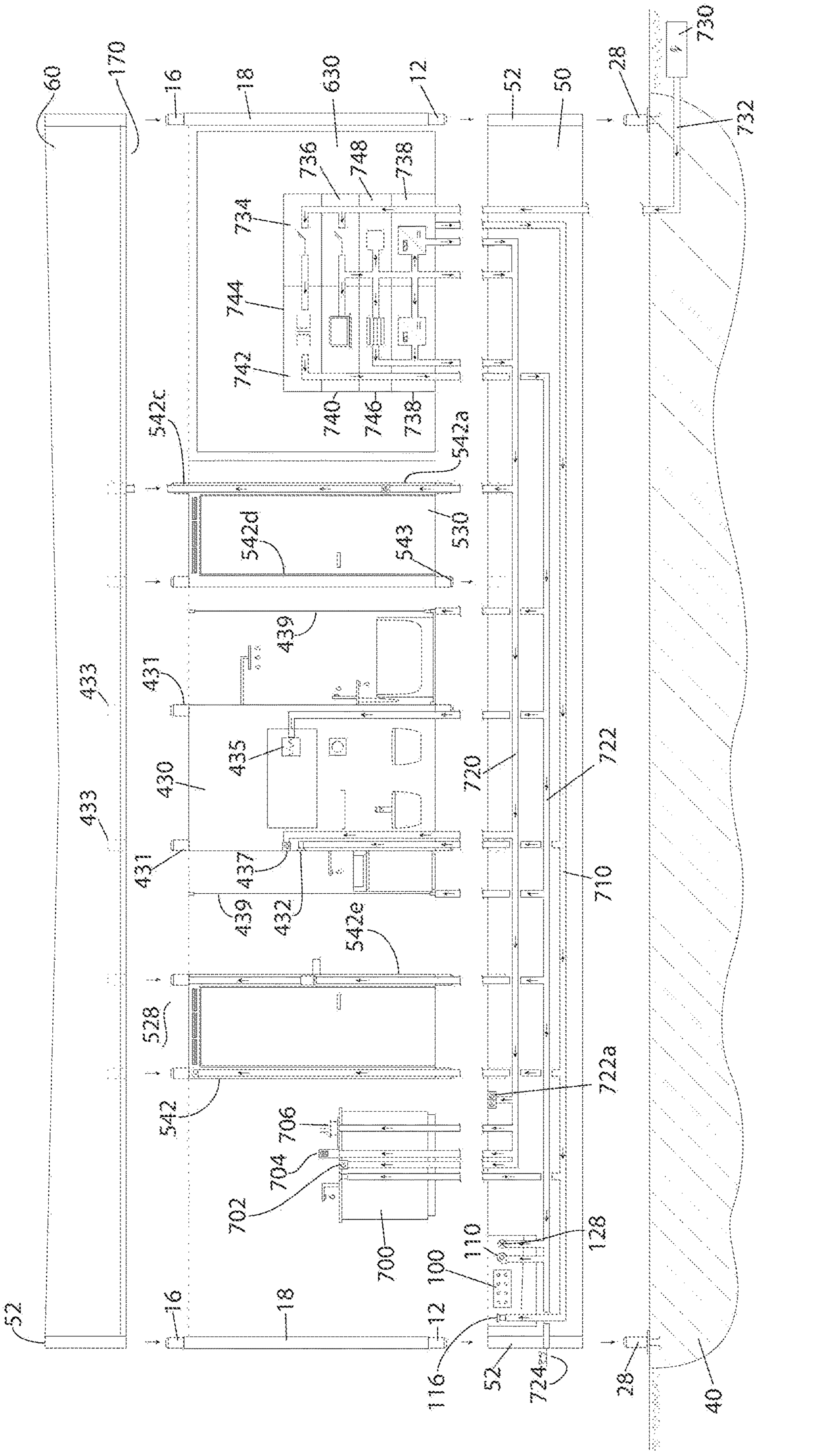
FIG. 32 is a layout diagram of an electrical/automation engineering system.

FIG. 32 demonstrates the electrical and automation system which powers the interior infrastructure and controls how it is used, when and by whom. Power is provided from an external power source 730. Possible sources of power may be a solar battery, or system of batteries, a municipal electrical supply, a watermill, a turbine, a windmill, a generator which works on gas or liquid fuels, or any combination thereof. While the power source 730 is shown as entering the structure through the foundation level 40, one skilled in the art would appreciate that this is purely a designation. It is reasonable to assume that some power producers may be located in other places on the structure. For example, the glass façade 300 of the disclosed structure and/or solar panels on the roof will enter the mechanical block through base floor panel 50, which in turn would receive these connections from another portion of the disclosed structure.

The electrical line 732 carries current from the power source 730, through the base floor panel 50 into the mechanical block 630. The mechanical block 630 may be installed on any number of interfloor floor panels 60, in which case the electrical line 732 will enter the mechanical block 630 will enter through interfloor floor panel 60. In either case, the mechanical block 630 resides in its own enclosure 640 that is isolated from other interior spaces.

Within the mechanical block 630 the electrical line 630 connects to an integrated console 744, which preferably has the following and additional components and variations thereof. The integrated console 744 contains a standby uninterrupted power supply unit 738. The uninterrupted power supply 738 supplies stored energy if the external power source 730 is disrupted or if its power is insufficient.

Current is then channeled to a switch panel 734 and then to a transformer rack 742. The transformer rack 742 is used to adjust voltage for low consumption devices, such as sky ceiling 170, led lighting 128, or electronic and automation devices within a door frame 560. The low voltage current is delivered to low voltage consumers through a low voltage line 722. Several low consumption devices that have not been previously disclosed include privacy glass 439, floor censor 435 and exterior lighting 724. Additional low voltage consumers may be installed at some point after the structure is assembled. Control and power supply to these devices will be as otherwise disclosed herein.

Some current bypasses the transformers to provide standard voltage to certain standard voltage consumers. These include the retractable outlet 540 of the parallel upright beam 542*c*, a plurality of concealed in-floor outlets 722*a*, and devices located on the kitchen island 700.

The kitchen island 700 is bolted onto the floor panel 50 in its completed state. Water, power and ventilation are all connected at that time using exposed connectors of the floor panel 50. High voltage consumers on the kitchen island include the food preparation appliances 706, including stovetop, oven, toasters, microwaves, etc; additionally, power to an exhaust vent 704 and outlets 702 are all likely standard voltage consumers.

Still referring to FIG. 32, the integrated console 744 contains infrastructure containing, secondary patches panel 736, automation interface 740, automated switch hub 748, a switchboard and infrastructure for video, audio and sensor controls 746. All electric consumers are clearly mapped back to their switches in panel 734 or 736 and may therefore be easily automated through the interface 740, which is essentially a software system that controls the switch board 748.

The automation interface 740 interacts with video, audio and sensor equipment wirelessly or through a separate data or power cabling 710. Sensor equipment powered or controlled in this manner includes the audio speakers 116 in the ak airplex 100 and 116*a* within the bathroom shaft 430 and audio equipment on the door 602.

Current is channeled to an interfloor floor system 60 through the upright parallel duct member 542*c*, which connects to duct 542*a* of the interfloor floor panel 60. It is important to note that all electrical connections are within their own conduits and that the ventilation shaft 542*c* is only utilized as a framework with conduits attached thereto externally, but no electricity is or other elements pass through the ventilation shaft other than forced air. The vertical upright duct 542*e* is shown to be connected to the low voltage line 722 and capable of channeling current to the interfloor floor panel 60. It may be presumed based on earlier disclosures that both high voltage 720 and low voltage 722 are passed along using the same shaft 542*c* or *e*.

Figure 32A:
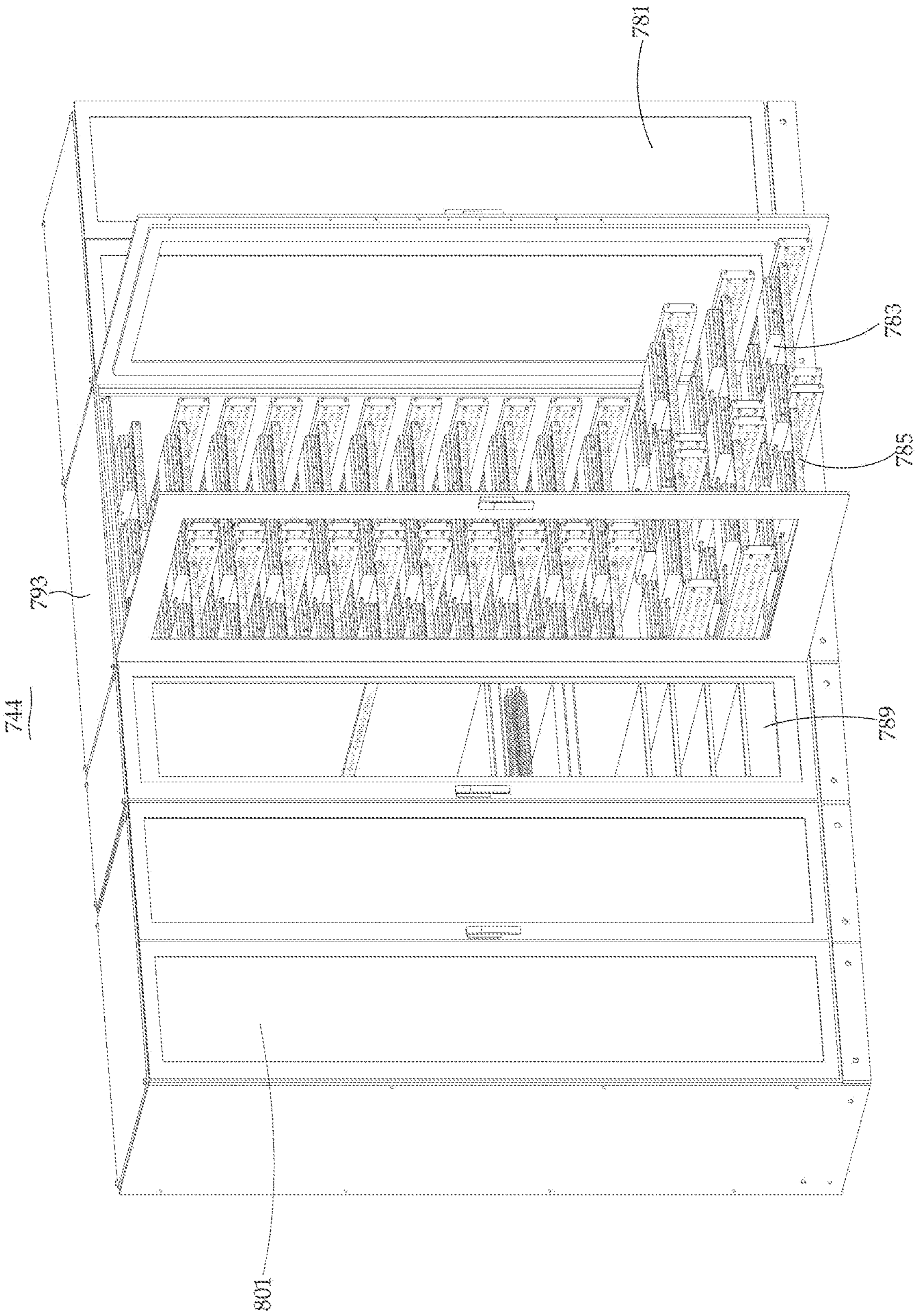
FIG. 32*a* is a frontal diagram of an integrated console.
Figure 32B:
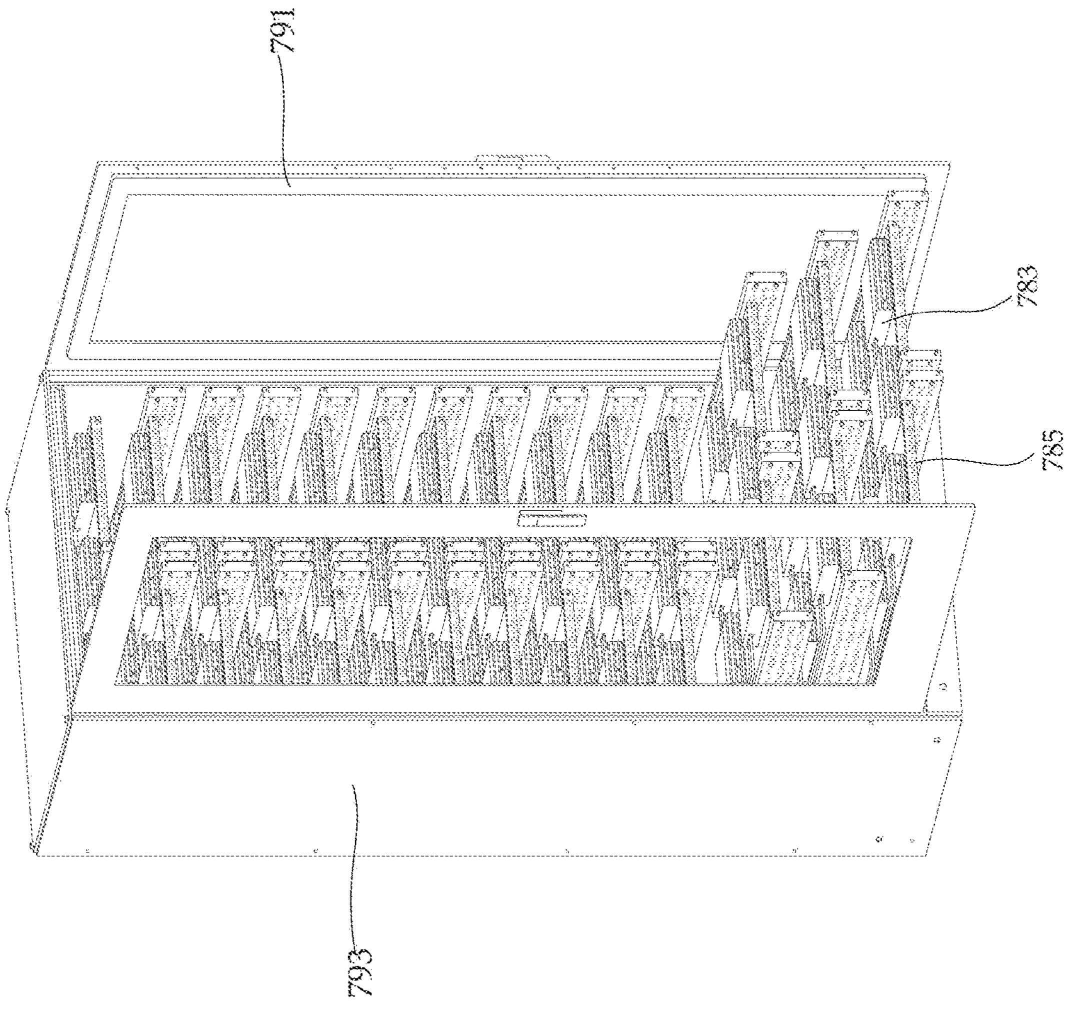
FIG. 32*b* is a frontal diagram of a transformer rack of the integrated console

FIGS. 32*a* and 32*b* are close up diagrams of the integrated console 744 services the electrical and automation system. The integrated console 744 is preferably situated within a mechanical block 630 and enables a user to access all electrical control systems from one place. The integrated console 744 is provided in form of an array of closets. The closets 781 and 801 house the switch panels 734 and 786. A closet 793 contains transformer racks 783, with each rack 783 holding one or multiple transformers 785. Closet doors 791 preventing accumulation of dust and grime on the electrical connections and preferably having security mechanisms, such as a lock, a facial, fingerprint or retinal recognition scanner. Each transformer 785 power a low voltage device, an outlet or a group of devices. The racks 783 or the transfers 785 are labeled to inform a user which device the transformer supplies. Closet 789 contains space for the automation interface 740 and switch hub 748 which connects the automation interface 740 with various devices comprising the automation environment. It should be noted that the automation interface 740 preferably monitors each deice controlled through the integrated console 744, such that if a fault is detected, the automation interface 740 may automatically request a service appointment with an appropriate vendor without the resident or manager of the structure needing to be involved.

Figure 33:
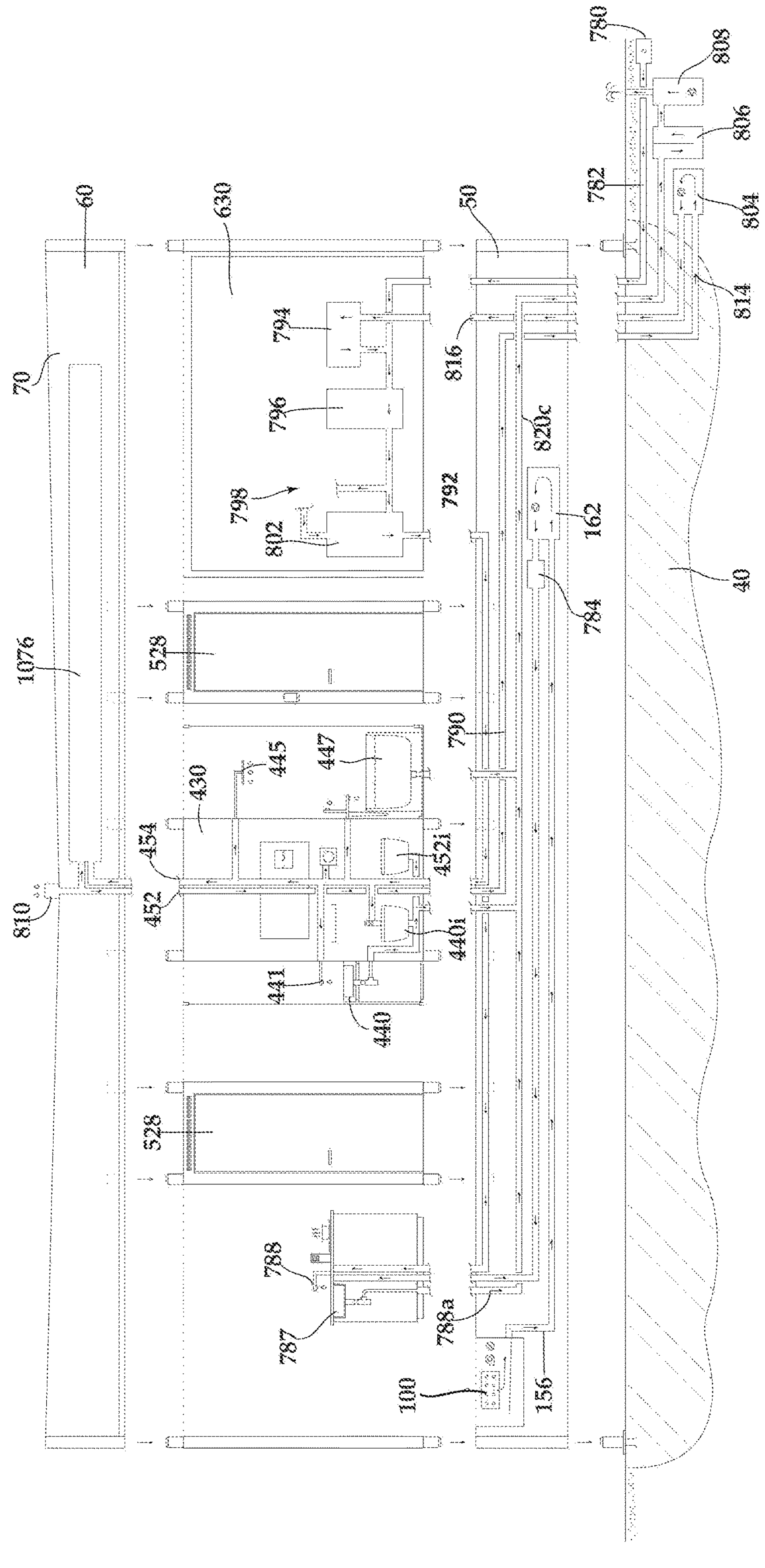
FIG. 33 is a layout diagram of a plumbing engineering system.

FIG. 33 demonstrates the working of a plumbing system. Disclosed is the freshwater intake 780. The intake may derive water from a well, a municipal water supply, a natural body of water or a desalination facility. Water pipe 782 channels the water into the mechanical block 630 where the water may be stored within a storage tank 794. The water is filtered within the unit 796 and then heated (or cooled) using facilities 798. Heating facilities may include coil heating, a heating tank utilizing gaseous or liquid fuels, or an active heat pump. The water is then distributed via the line 792 that passes through the base floor panel 50 to a plurality of consumers that include the kitchen faucet 787, the bathroom faucet 441 or the showerhead 445, or the bathtub 447. Water is supplied to interfloor floor panels 60 via a plurality of pipes 454 enclosed within the bathroom shaft 430. An additional water supply is achieved through the ak airplex 100 which collects condensation and channels it through piping 156 to a condensation storage tank 162. When condensation water is ready to be used it is passed through a filtration unit which may use an ultraviolet decontamination, active chemical filtration such as carbon, simple physical filtration or a combination thereof. The resulting water may be used as drinking water in kitchen water dispenser 788 or similar locations.

An additional supply of water may be achieved through rainwater collector 810 preferably installed on the roof panel 70. Drainage from the water collector 810 is sent through a pipe 814, and then through a floor panel 50 to a rainwater storage tank 804. The rainwater storage tank 804 may be located outside the structure or within the mechanical block 630. As needed or when a predetermined fill level is reached in the rainwater storage tank 804, the water is then channeled via pipes 816 to the mechanical block, where the water is mixed with water arriving from the water inlet 780.

FIG. 33 demonstrates a freshwater backup system, which is not only a significant safety mechanism, but is also an important link in ensuring that the disclosed structure remains self-sufficient even during less than ideal circumstances. Disclosed is the drainage water collector 810. While the drainage water collector 810 supplies the storage tank 804 it preferably also fills at least one reserve tank 1076 within the roof panel 70. The storage tank 1076 may also be actively filled using pumps through a plurality of pipes 454 from another source of water. The reserve storage tank may then be used gravitationally, when the water pressure in the water supply pipes drops. For example, if it had not rained for some time and/or if the days have been overcast and solar batteries did not sufficiently recharge, the structure may not have sufficient energy to operate pumps. A conventional power grid may be malfunctioning due to a general power outage. Under such conditions, the structure can still avoid water starvation by supplying water from reserve tanks 1076. Each of the roof panels 70 may incorporate one or more reserve tanks 1076 which have sufficient capacity to gravitationally dispense water for days, giving the occupants the best chance to survive a supply disruption with few deprivations. While not specifically shown in figures, since the disclosed structure is virtually fireproof, the reserve tank 1076 may participate in the feeding of safety sprinkler system. Discharge nozzles of such system may be exposed through the sky ceiling 170, walls or load bearing columns 18.

Drainage is also received through standard use of the water, or greywater processing. Drainage is produced by the kitchen sink 787, and passed into the drainage pipe 788*a*, the bathroom sink 440, the bidet 440*i*, the toilet 452*i* or the bathtub 447. Greywater is channeled through the pipes 820*c* through the floor panel 50 into a septic tank 806 where it is filtered using filtration and sedimentation technics. It is then pumped through a pump device, or a storage tank and pump combination to be used as irrigation water 812.

FIG. 34 demonstrates the heating cooling and air conditioning system HVAC enabled in the present invention. Shown is an external heat pump 840. A gas or liquid temperature changing medium is carried in tubes 842 through the foundation slab 40 and into a floor panel 50 through tubing 846. The medium is capable of absorbing surrounding temperature, which is then either cooled or heated as the temperature changing medium is passed through a heat pump. A heat pump works by passing refrigerant medium that has absorbed cold (or warm) temperature from an interior space into an environment of any source of low potential heat, such as earth, water, or air; it can be a heat generator using any fuel: liquid, solid or gas. Cooling of air may be achieved with a heat pump with active cooling, such as a compressor device, or a water chiller, such as an aquifer, an artificial pool or a natural body of water.

The heat exchange device 844 manages the transfer of refrigerant gas or liquid within tubes 845 to and from the external heat pump 840. Once the temperature of the medium has been changed, either cooling or heating it, the medium is directed to where it is needed. In one case, heated medium is needed to heat the water within the hot water tank 850. Water enters the hot water tank 850 from a water supply 854. As disclosed in the context of the plumbing system in FIG. 33, water is provided from an external water inlet 780 or from rainwater storage tank 804. This water then enters the hot water tank 850 within the mechanical block 630 to be heated. Once heated, the water is channeled through pipes of the floor panel 50 to faucets coming off the bathroom shaft 430 or the faucet of the sink 787 of the kitchen island 700.

In another instance, a hot or cold medium exchange device 844 feeds the ak airplex 100 through pipes 860. Depending on the proximity of a particular ak airplex with respect to the heat exchange device 844, there may be a need for a pump 856 to boost the inflow or outflow of the refrigerant. There is a plurality of ak airplexes 100 sprinkled throughout the base floor panel system 50 and the interfloor floor panel system 60. Each ak airplex 100 functions both as a consumer of treated refrigerant and as a producer of either cold or hot refrigerant through a plurality of copper tubing 862 and 860. Tubing 862 may be intake towards ak airplex 100 and 862 an outflow from ak airplex, or visa versa. For example on a hot day when cooling of the interior space is required. The coil unit 124 of the airplex 100 channels heated refrigerant absorbed from the interior space to the exchange device 844 through the juncture 858. There, this heated refrigerant is directed to heating the water in the water tank 850 or toward the heat pump to be chilled. Once the refrigerant is chilled, it is then directed back towards the required airplex 100 for cooling of the exterior space. There are a plurality of refrigerant pipes intersecting the floor panels 50 or 60 that form the base floor system or the interfloor floor system, since each airplex unit 100 is able to function at its own temperature setting as dictated by the automation system disclosed in FIG. 32 or set by a user. As disclosed earlier, the ak airplex 100 receives conditioned air through ducts 86

Still referring to FIG. 34 disclosed is an air intake and exhaust unit 861. The unit draws air through the inlet opening 820*a* of the sidewall corresponding to the mechanical block 630. This air is channeled through the shaft 820 to the intake and exhaust unit 861, also located within the mechanical block 630. The air is filtered within unit 864, it then encounters a heat exchange wheel 866. The purpose of the heat exchange wheel is to ensure that the optimal air temperature of air from within the structure is not squandered during the process when exhaust air is being expelled back into the environment. Therefore, in the summer heat from the air drawn through the intake opening 820*a* is expelled through the duct 820, while coolness from the air being expelled form the inside is transferred to the refrigerant within the tubes within the hot cold exchange unit 869. In the winter the heat exchange wheel 866 preserves heat being expelled along with exhaust air from within the structure and assist with keeping cold temperature brought in with air suctioned from outside to a minimum.

The hot cold unit 869 further uses the heat cold transfer tubes to either heat or cool air being drawn from the outside. The hot cold unit 869 functions by either cooling or heating fresh air. One source for treated refrigerant medium to enable a heat pump within the unit 869 are the intake/exhaust tubing 870 and 868, also known as the hot or cold tubing which originate at juncture 858 with tubing 862 and 860 connecting to ak airplex. Therefore, refrigerant removing hot medium from one source (interior space) may use the hot medium to warm another space (hot water or hot air). Likewise cool medium (ak airplex, active heat pump, thermal heatpump) are used to cool other locations (ak airplex, hot cold unit 869) The fan 872 enables the flow of air from the outside and through the supply duct the 152 into an ak airplex unit 100 and out into the interior through the gap 135. Preferably the air is further treated and disinfected through a UV filter, a physical filter or a chemical filter 857. The conditioned fresh air received by the ak airplex 100 initially passes through the lower space 108 and directly into the exterior space through the gap 135. The coil unit 124 is then used to maintain the desired temperature of this air. Eventually however, the air flow expelled from the ak airplex 100 is drawn in through the vents 550 of the door unit 528.

Fresh air is also supplied from the mechanical room 630 through the shaft 578 within the floor panel 50. The shaft 578 is in communication with the connector 542*e* which then passes air to the ventilation shaft 542*c* (upright vertical duct). This air is expelled through vents 550 and then sucked back into the HVAC duct into the bathroom shaft 470 after passing through the interior space. This air is then expelled to the outside through the shafts 830, which also draws air from the exhaust vent 704 of the kitchen island 700. It should be noted that conditioned air within the door system 528 may continue through the upright vertical duct 542*c* to the interfloor floor panel 60, and an intake vent of a door system 528 of an interfloor floor system 60 can pass exhaust air through a different exhaust shaft 542*c* (which works as an intake shaft). This exhaust air flow from upper floors of the disclosed structure is then passed through duct 834 and out through the mechanical room 630. If one upright vent 542*c* functions as a conduit of air to upper floor panels, it's sister parallel upright beam 542*d* will then function as an air transport, either blowout out or drawing in a stream of air.

The interior space heating is also accomplished through electrical adaptations of interior surfaces. For example, glass surfaces 870 of the bathrooms may be heated. Interior glass layers of the glass façade 300 may also be heated. In the bathroom shaft 430, the vent captures air from within the bathroom and channels it out through the duct 450*d* in the floor panel, through exhaust duct 830 in the mechanical block and the outside through the outlet vents 824. Alternatively, vent 450*d* may pass through the air treatment and filtration unit 864 to capture and preserve the heat of the air stream via the heat exchange wheel 866.

Connectors 837 of the door unit 528, 470*c* of the bathroom shaft 430 link with a plurality of air ducts, refrigerant tubing, media cabling and electrical conduits within a floor panel. Note that in some cases, potentially unpleasant, hazardous or flammable fumes, such as those from the intake fan 708 of the kitchen island 700 are simply channeled to the outside using the air conduit 834 within a floor panel 50 and duct 830 within the mechanical room 630. Note that a noise muffling is provided via a silencer 826 preceding the fan 828. The fan 828 may be particularly powerful, thus requiring a silencer 826. Since it is presumed that internal odors and exhausts are not inherently toxic to plants and life forms, no filtration is shown, however, filtration may be easily introduced to further minimize the ecological footprint of the disclosed structure.

Figure 35:
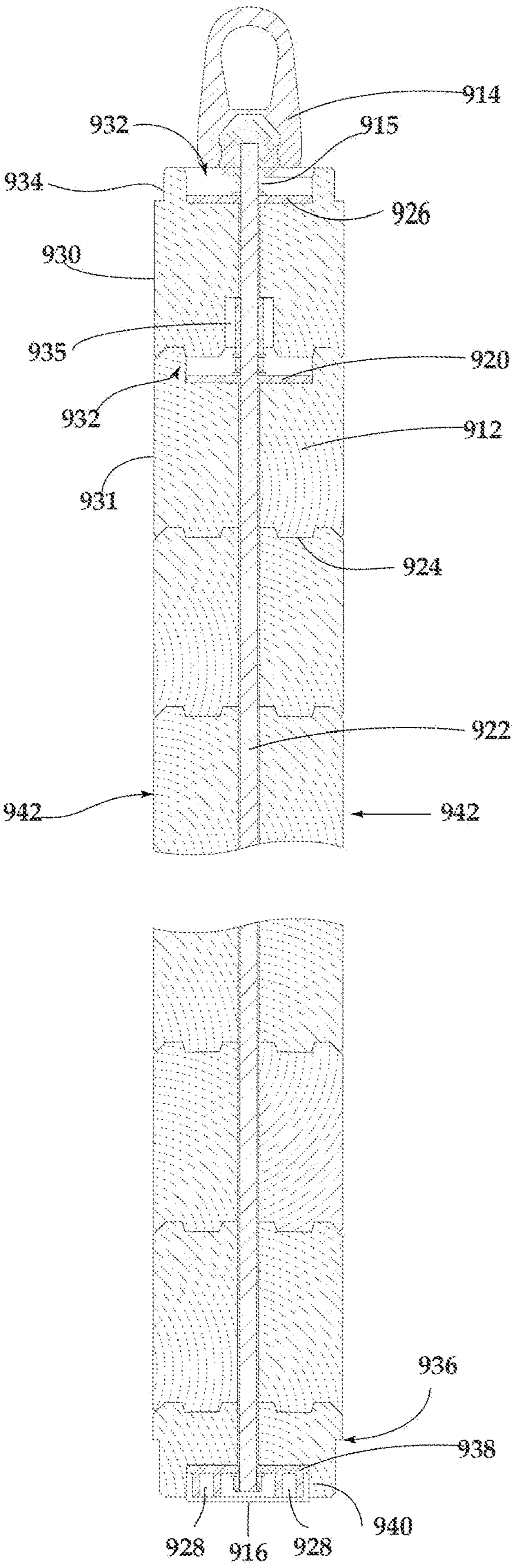
FIG. 35 is a cross-sectional view of a wall system.
Figure 36:
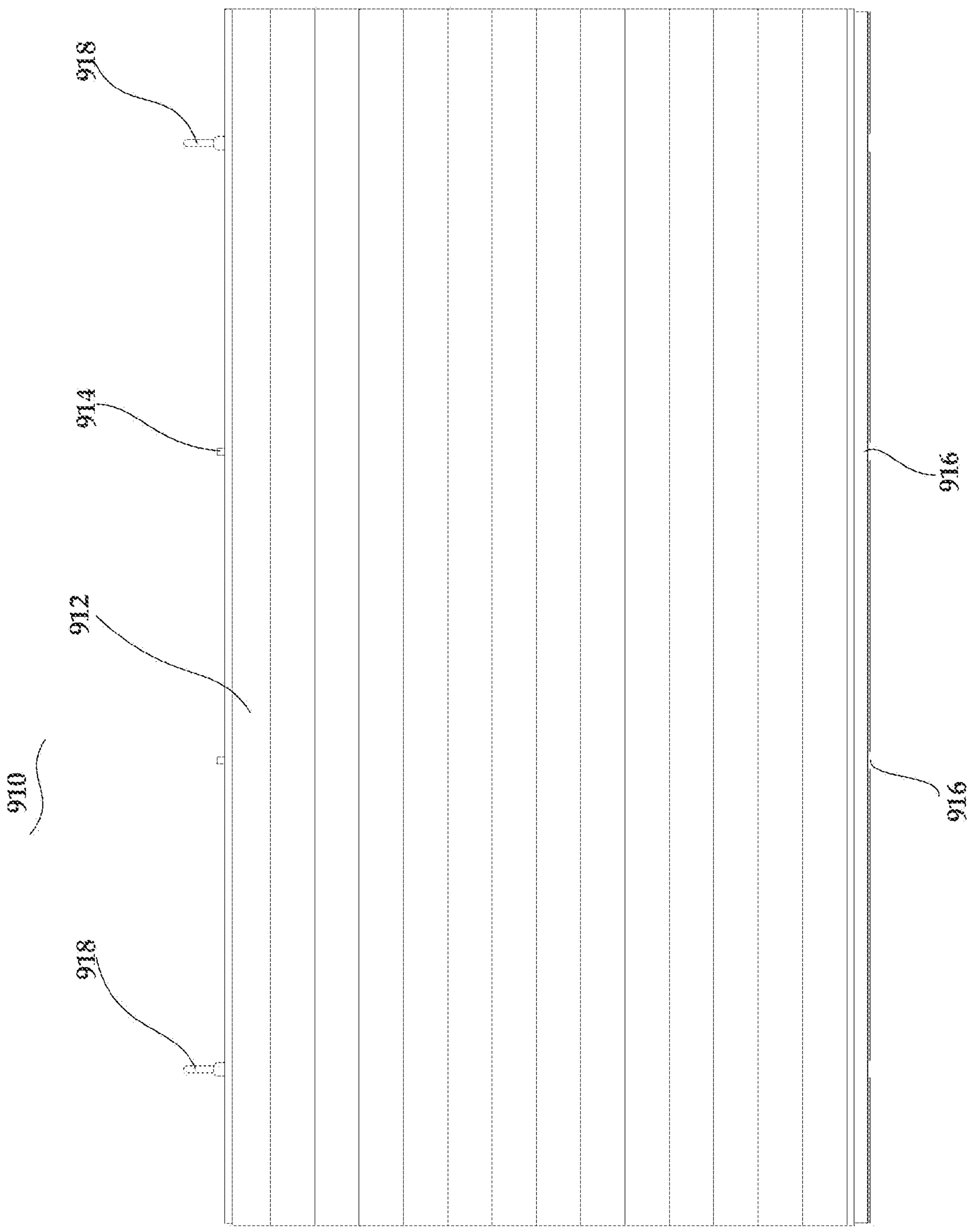
FIG. 36 is a sideview of a wall system.

FIGS. 35 and 36 demonstrate an assembly wall that is used to separate interior spaces into separate rooms. Each wall is assembled from a plurality of manmade beams 912 bound together by at least one central stem 915. It is preferred to utilize an easily regenerating and light timber, such as bamboo shoots for production of the beams 912. The beams 912 are stacked one on top of the other using lock and key lengthwise groves 924 which ensure that the beams are exactly aligned and producing a near seamless wall face 942. The bolts are then tied together using at least one central rod 922 made of steel.

Most of the middle beams 912 are of the same shape. Several beams serve multiple purposes and are therefore shaped differently. The topmost beam 930 contains a depression 932 to accommodate the first adjustable connector 926. The tip of the central stem 915 is threaded, which accommodates both the removable swivel rings 914, attached to permit delivery of the wall unit, and also allows the top of the wall to be bolted into an interfloor floor panel 60, or a roof panel 70. There is an expansion lug 935 to prevent slippage of the upper beam 930 using installation, and a corresponding niche for the log on the beam 930. There is also a slight flange or step 934 since the wall 910 nests beneath its point of attachment under a floor panel. The second beam from the top 931 contains an additional adjustable ring 920 and a depression 932 to house the adjustable ring 920 on the beam 931.

The lowermost beam 938, may be smaller or similar sized than other beams 912. It contains a depression 940 to accommodate an adjustable platform 916. The adjustable connector 926 and adjustable platform 916 tie together the plurality of beams, thus creating a wall. The fastener openings 928 are used to bolt the bottom portion of the wall 910 to the floor panel on which it is mounted. Alternatively, the wall faces 942 may be made of thin veneer mounted on an interior honeycomb core (which would replace all stems 915).

Figure 37:
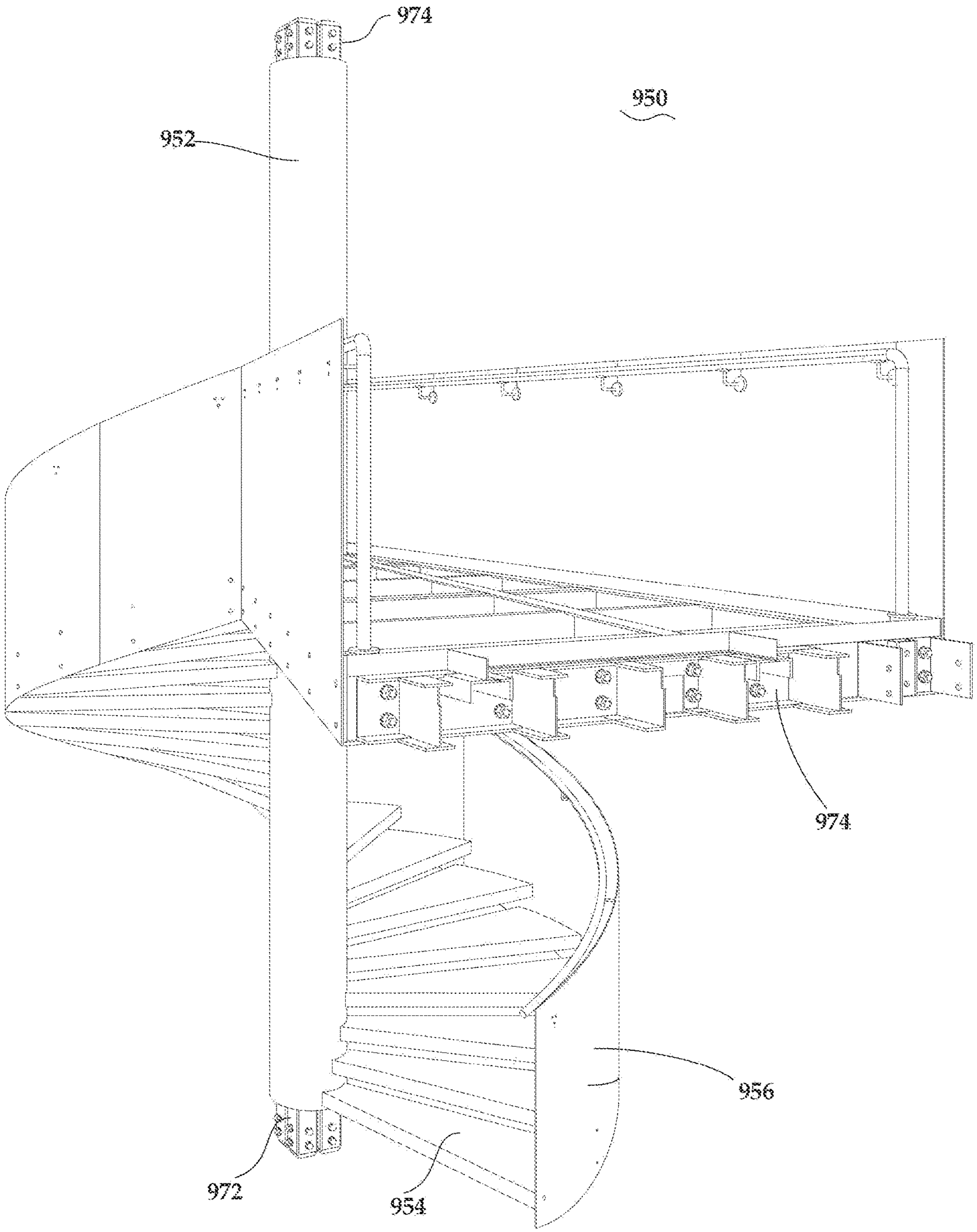
FIG. 37 is a diagram of a circular staircase.

The present invention discloses a structure that is so fundamentally novel, the there is no element that is borrowed from the prior art, including stairs. FIG. 37 discloses a spiral staircase 950. The spiral staircase may be delivered to the construction site in a preassembled state. The steps are built around a central stem 952. The first end 972 is inserted into a connected within the base floor system 50, while, the second end 974 is inserted into a connector of a roof panel 70 or one of the upper floor panel systems 60. The treads 954 have a very shallow rise make this staircase into a very gentle slope that almost functions as a ramp. This is a desirable safety feature that in combination with a solid banister 956 further improves privacy and safety of equivalent staircases. The spiral staircase 950 is completed with a landing 974 which attaches to a floor panel 60. The top surface 976 is then covered with removable tiles.

Figure 38B:
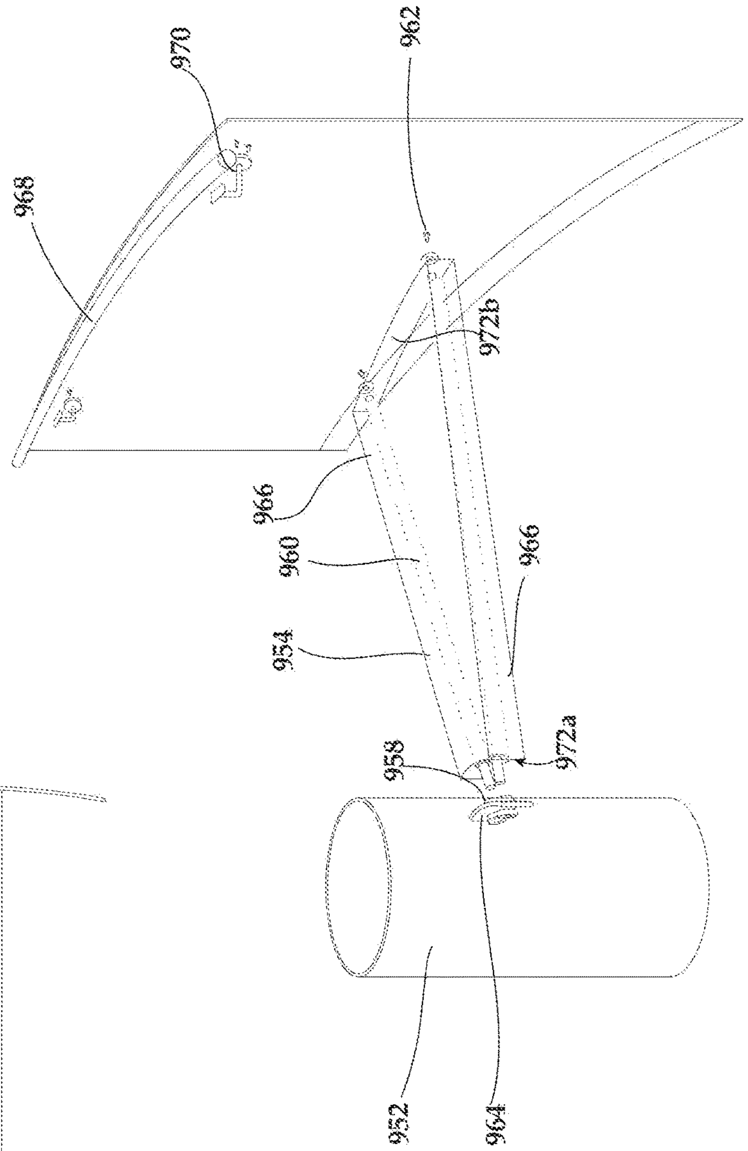
FIG. 38*b* is a diagram of individual treads of a circular staircase.
Figure 38A:
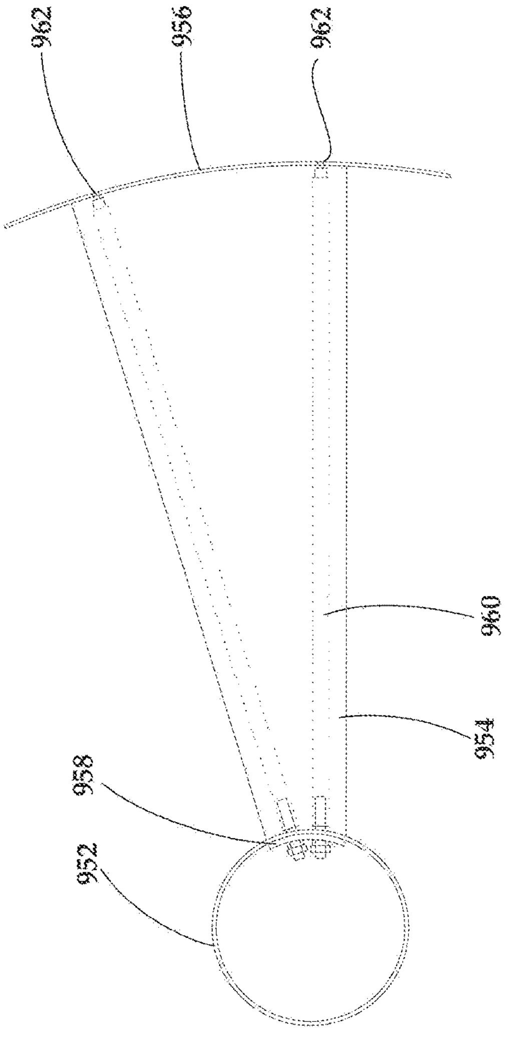
FIG. 38*a* is a diagram of individual treads of a circular staircase.

The treads 954 are presented in greater detail in FIGS. 38*a* and 38*b*. Each tread 954 is mounted onto two cross rods 960 mounted fore and aft beneath the tread 954. Each cross rod 960 is attached to the central stem 952 with fasteners 958 and to the solid banister 956 with fasteners 962. A handrail 968 runs on baluster supports 970. Drapes 966 fore and aft of the tread conceal the cross rods 960. Right and left drapes 972*a* and 972*b* contain an opening for the cross rods 960 and thereby bind the treads 954 to the cross rods 960.

Figure 39:
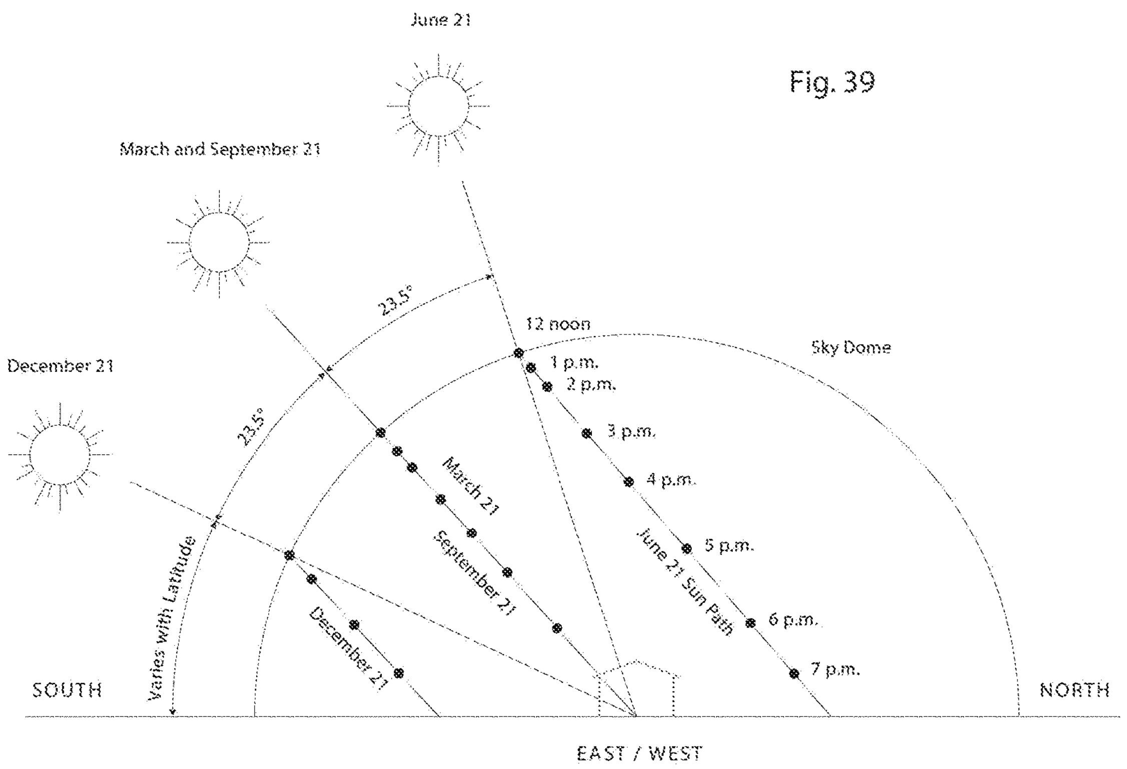
FIG. 39 is a diagram of a sky dome.
Figure 40:
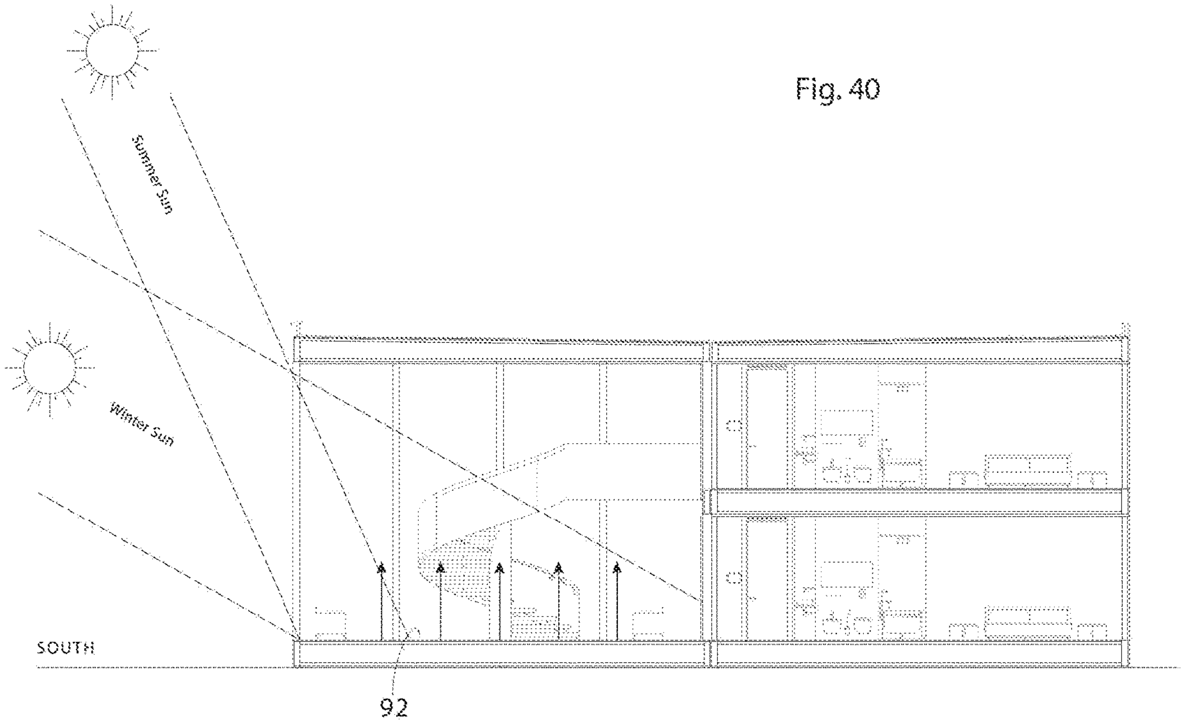
FIG. 40 is a relational diagram of the disclosed structure with respect to the position of the sun.

As demonstrated in FIGS. 39 and 40, the panorama all glass façade inherently maximizes the effect of passive solar heating. The passive heating effect varies in intensity depending on the latitude of the location, but it is always present. In the northern hemisphere, passive solar heating is especially desirable in the winter when the sun is low in its orbit and at angle to capture the largest area of the panel floor 92. With the top surface 92 awash in sunlight, the predominantly light-colored floor reflects heat, which rises and warms the rest of the structure.

On the contrary, during the summer month, it is less desirable to capture passive solar heat, as the temperature outside the structure is often so warm that internal air cooling must be activated. An extensive exposure to the sun would exacerbate the problem. However, since in the summer the sun is relatively high in its orbit, a smaller portion of the floor space is captures and effect of reflected head is more passive. The windowpanes may further contain passive or active darkening capability to lessen the incursion of sunline if desired.

Figure 41:
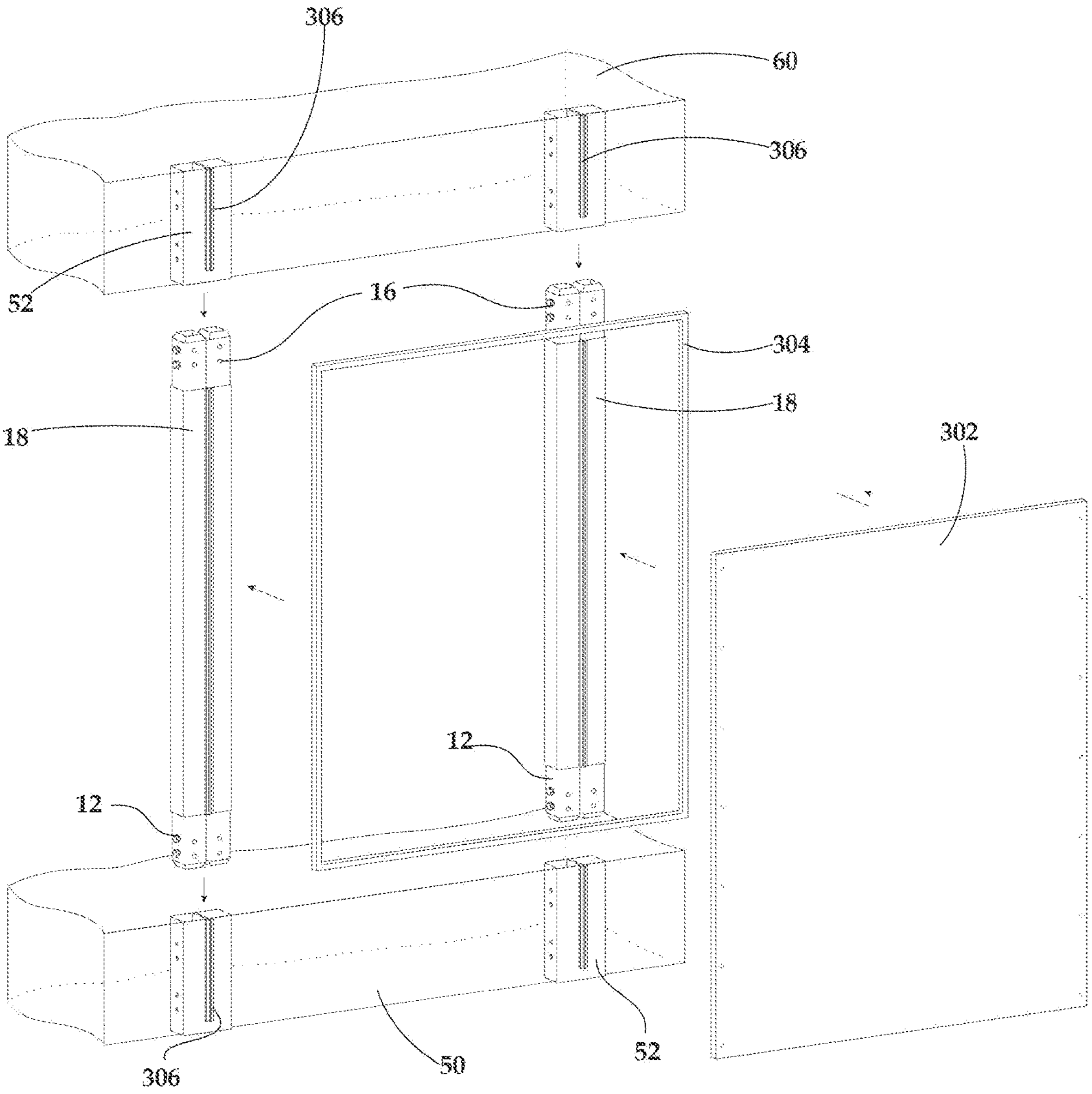
FIG. 41 is an exploded diagram of windowpane installation.
Figure 42:
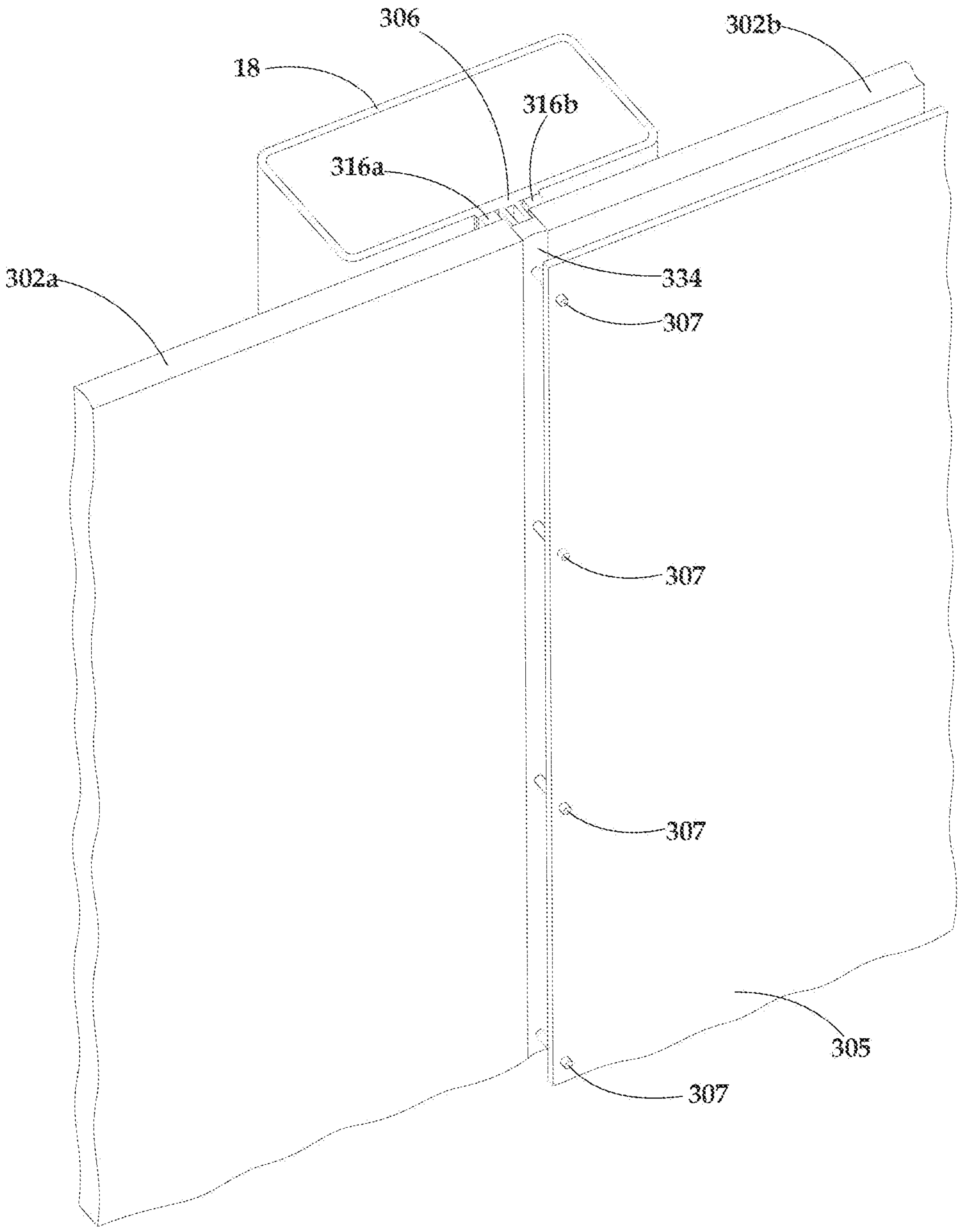
FIG. 42 is an additional diagram of windowpane installation.

FIGS. 41 and 42 disclose the installation of the glass paneling 302 which makes up the glass façade 300 of the disclosed structure. Also visible is the four in one function of the load bearing columns 18. The load bearing columns 18 bear the lateral weight of the structure once the first ends 12 and the second ends 16 are within the connectors 52 of the base floor system panel 50 and interfloor floor system panel 60 (or between two interfloor panels or base or interfloor panel and a roof panel). The first and second ends 12 and 16 respectively represent the anchor for function of the load bearing column, fusing the disclosed structure with strength that will remain for many years to come. The load bearing columns 18 also present the glass mounting brackets 306, thus representing a mount point for a curtain wall of a structure. Individual glass panes 302 (or 302*a* and 302*b*) are attached to steel or aluminum frames 304 which are then attached to glass mounting brackets 306. The glass mounting brackets 306 are deployed on the external side of the load bearing columns 18 and continue over the connectors 52.

Finally, the load bearing columns 18 represent the mounting points for the decorative panels 305. Since all glass panoramic view is not always practical or desirable, such as when the disclosed structure is built within close proximity of adjoining buildings, glass panes may be undesirable or even illegal. Furthermore, situations and neighborhoods may change over time. Therefore, what was once a peaceful meadow may one day become a developed lot or a public thoroughfare. However, a change in the scenery should not require a fundamental change in the façade structure of the disclosed business. Instead, privacy panes 305 are mounted on top of existing windowpanes 302*b* (or 302*a* if applicable), and right into the load bearing columns 18, without requiring a separate façade bearing framework, as is present in the current art of construction. A privacy pane 305 is bolted on using fasteners 307, which pierce the foam rod 334 and are anchored within the mounting bracket 306.

Figure 43:
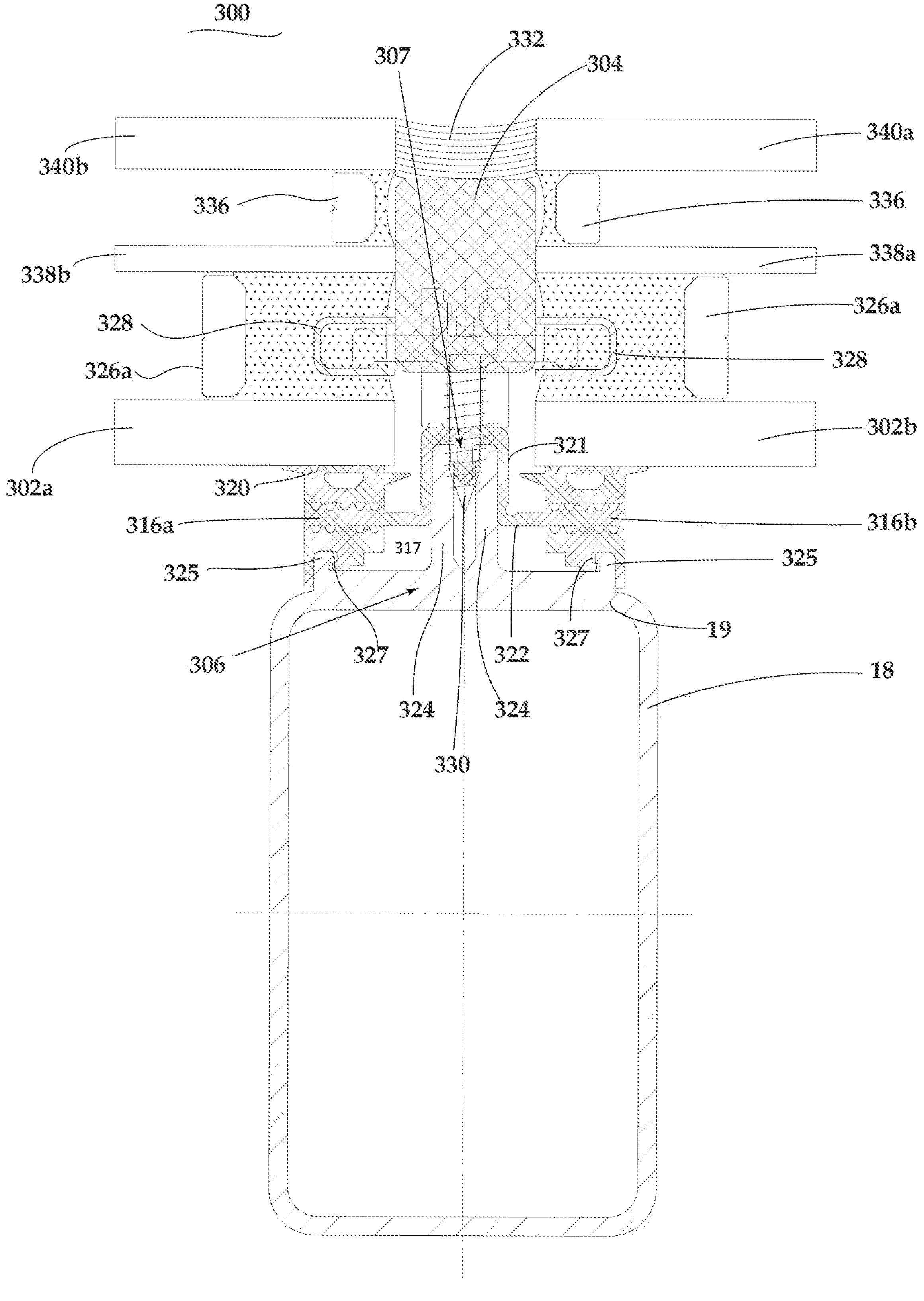
FIG. 43 is a cross-sectional diagram of windowpane mountpoint.
Figure 44:
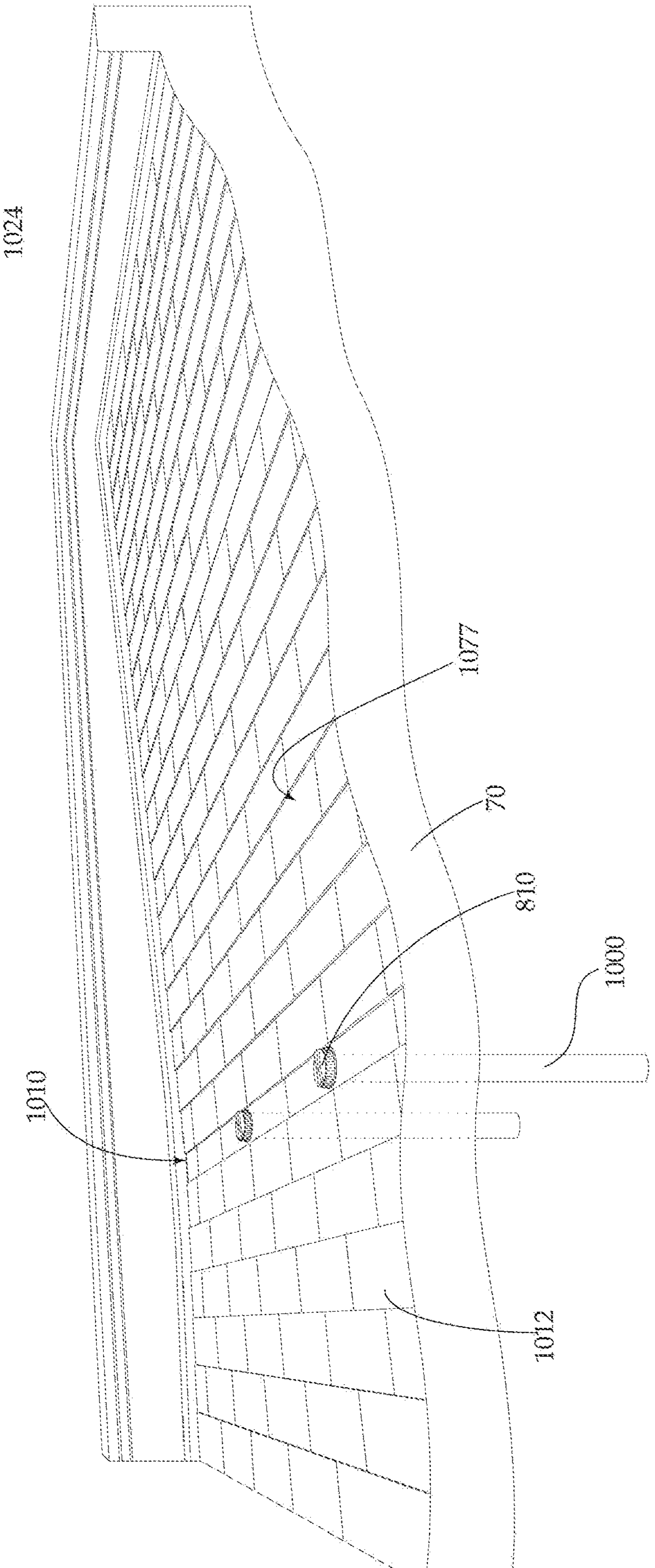
FIG. 44 is a cross-sectional diagram of a roof and drainage system.

FIG. 43 is a closeup of the mounting bracket 306. The load bearing column 18 contains an exterior facing wall 19 having the mounting bracket 306. The mounting bracket 306 having two outwardly protruding rims 325. The tip 327 of each of the outwardly protruding rims 325 having or forming a barb. The barbs 327 face each other in a parallel spaced apart configuration. Two parallel walls 324 extending outwardly between two protruding rims 325. A rubber gasket made of two rubber blocks 316*a* and 316*b*. Each rubber block 316*a* having a groove 317 for coupling with the barb 325. Each rubber block 316 further having a substantially flat surface 320 in a snug configuration with the first layer of glass 302*a* and 302*b*. A flexible diaphragm 321 spanning the two parallel walls 324 and connecting to each rubber block 316*a* and *b*. The two parallel walls 324 interrupt the first layer of glass 302*a* and *b*. A spacer 326*a* and 326*b* separates each pane 302*a* and 302*b* of the first layer of glass from panes forming a second layer of glass 338*a* and *b*. A foam rod 304 being between and interrupting the panes forming the second layer of class 302*a*. The spacers 326*a* and *b* having a channel 328, which receives an axially protruding spoke 334 emanating from the foam rod 334. An expansion rib 330 protruding out of the foam rod 304 toward the axis column 18, wedges into a space between the two parallel walls 524, thereby firmly affixing the first glass layer 302*a* and *b* and the second glass layer 338*a* and *b* firmly into place. Additionally, there may be a third layer of glass panes 340*a* and *b*. The third glass layer 340*a* and *b* is separated from the second glass layer 338*a* and *b* by a second spacer 336. The spacer 336 and the third layer 338*a* and *b* would be held together and in the attached state with respect the first two layers, by the silicone extension 332 protruding from the foam rod 304. The fasteners 307 of the privacy pane 305 are mounted by piercing the silicone extension 332, the foam spacer 305, until reaching the two parallel walls 324.

The disclosed attachment system of glass panes ire preferably the same for the entire class façade. It is preferred that at least one or all of the glass panels are configured to be able to filter ultra violet light and infrared and convert these into an electrical current to supplement electrical supply being otherwise produced by solar panels of the structure. Furthermore, some or all of the disclosed glass layers may have capabilities known in the art as privacy glass and additional contain heated elements to interrupt cold radiating into the interior space or to prevent the glass from become foggy or misty.

FIGS. 44-47 describe the rainwater collection and drainage system. Rainwater is collected on the roof surface 1012. The roof surface 1012 slopes gradually toward a drainage channel 1010. Rainwater collectors 810 channel the water through rainwater drainage pipes 1000. As described in FIG. 33, the drainage pipes 1000 may are then passed downwards and through the bathroom shaft 430. The drainage pipes 1000 may instead pass through a channel 1020 behind a wall mounted shelving 1018. The purpose of the shelving 1018, aside from serving as a convenient storage space for books and other personal items, serves as concealment means for hiding one or more drainage pipes 1000. Spacers 1022 may interpose between the shelving 1018. Alternatively, drainage pipes 1000 may be installed behind the spacers 1022 and then covered by the spacers. A plurality of removable shelving 1003 provides space for anything from books to close to toys. It should be noted that the roof surface in FIG. 44 appears to be made out of shingles 1077 such as porcelain or shale. The shingles 1077 may also be a plurality of solar panels that also function as additional protective layer for the roof panel 70.

Figure 45:
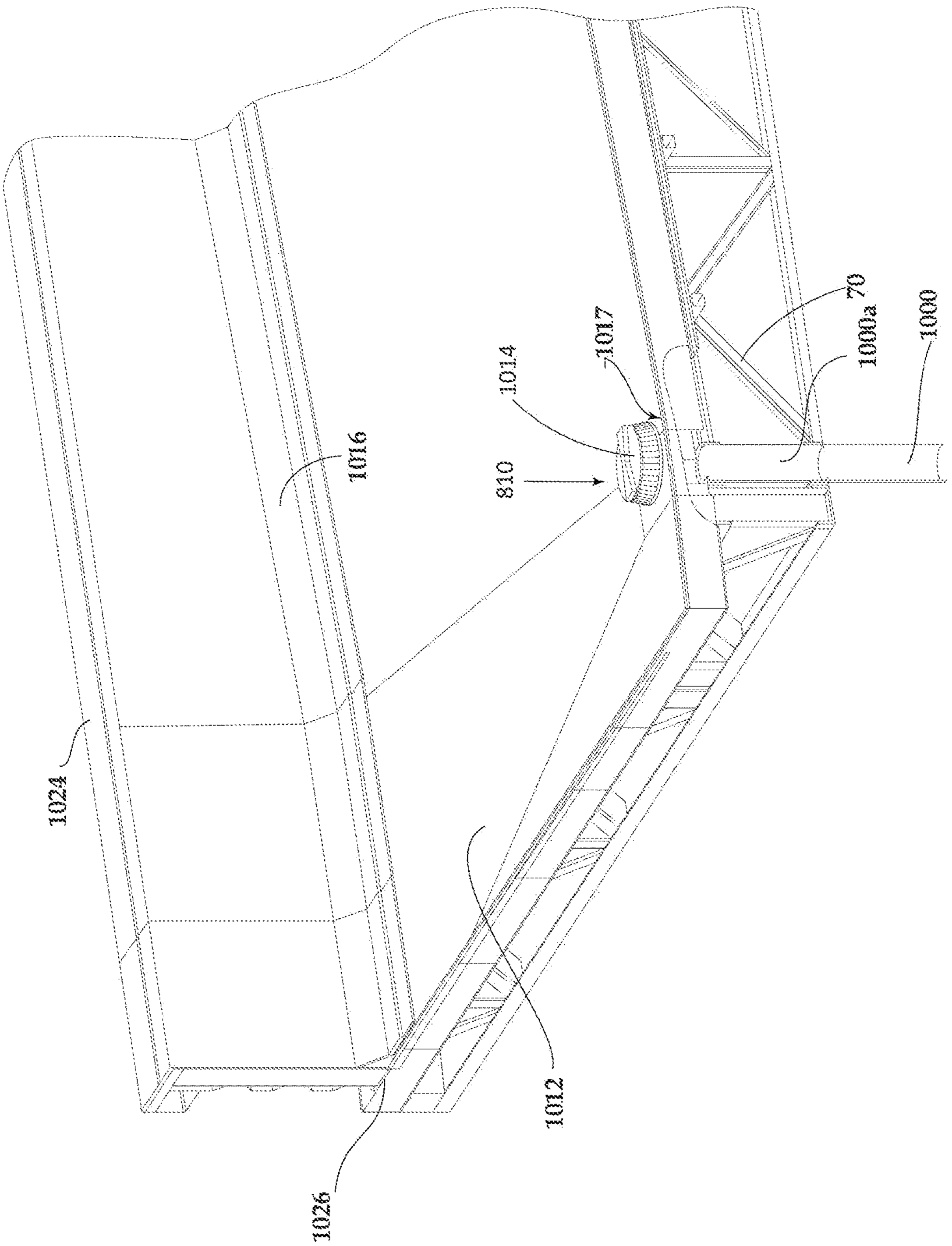
FIG. 45 is a cross-sectional diagram of a roof and drainage system
Figure 46:
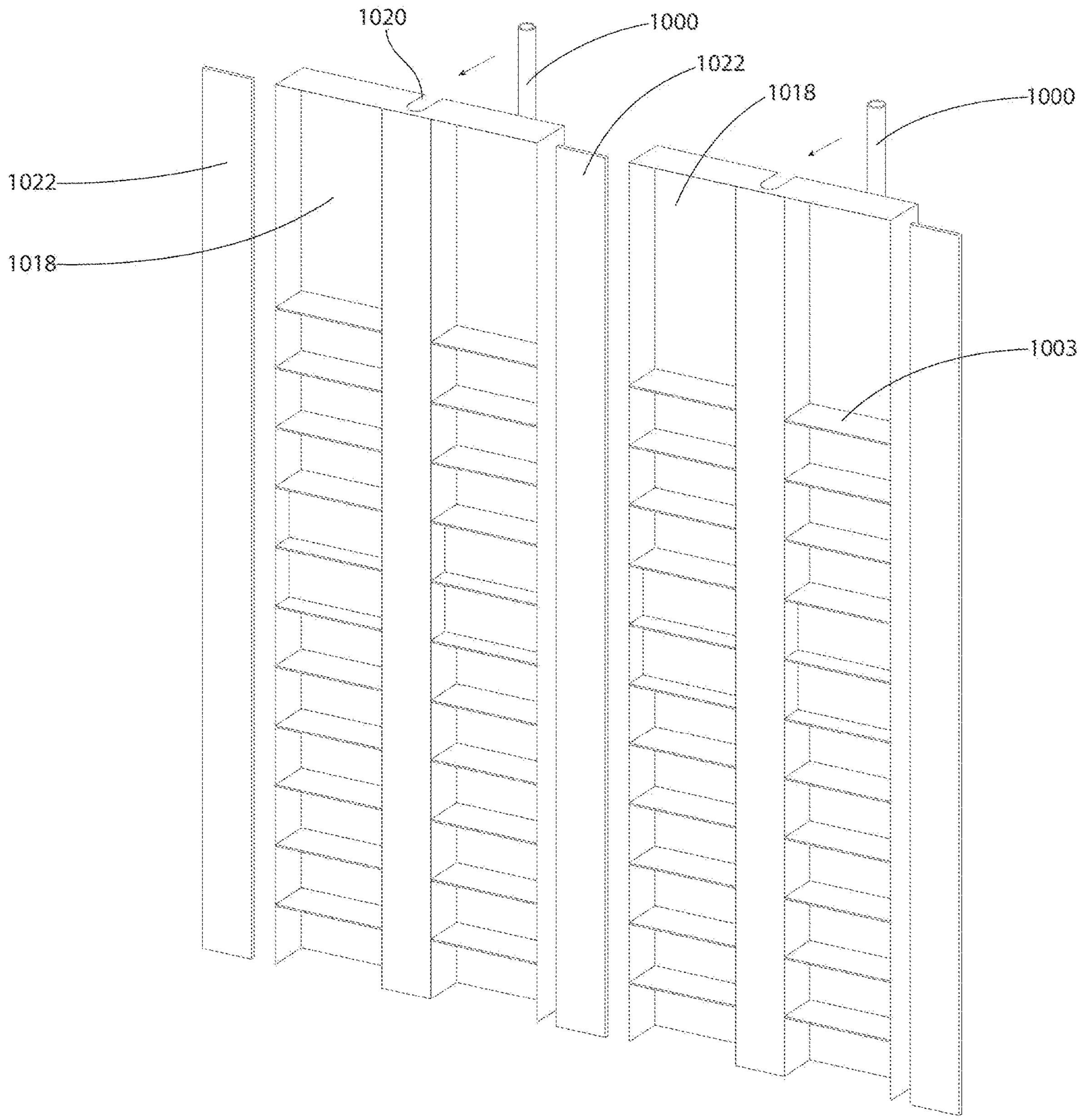
FIG. 46 is a diagram of a bookcase wall system.
Figure 47:
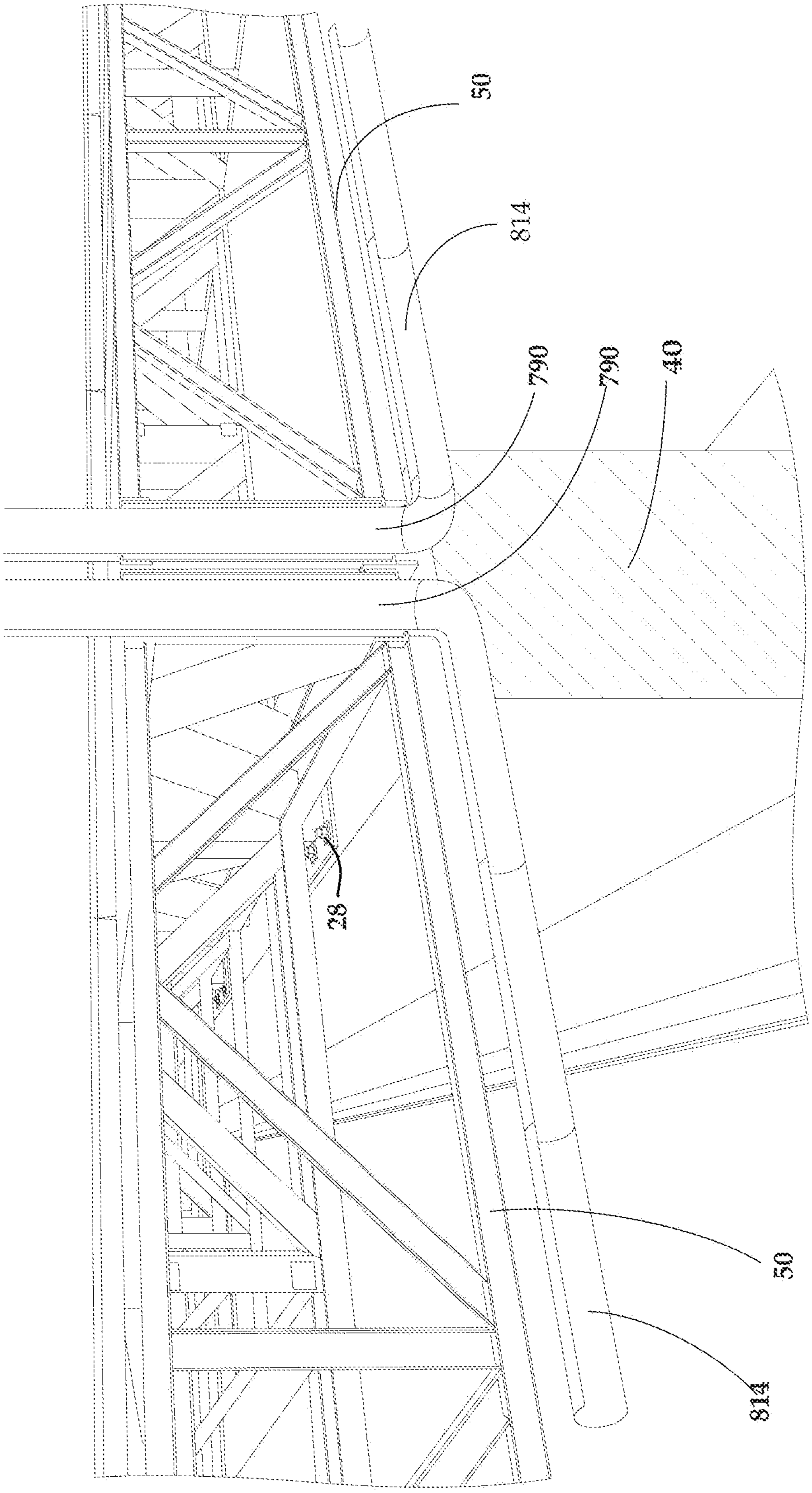
FIG. 47 is a cross-sectional diagram of a base floor panel, showing the drainage pipe.

As visible in FIG. 45, roof edges 1024 are provided for safety and to further facilitate rainwater collection. For this reason, the edge wall 1024 appears to be slightly leaning outwardly, meeting the roof surface at as light angle at point 1026. A drainage directing footer 1016 provides a convex surface prevent standing water at joint 1026 where the edge wall 1024 meets the roof surface 1012. The roof surface 1012 slopes downward until it reaches the lowest point 1017 containing the rainwater collector 810.

The rainwater collector 810 is covered by a removable grate 1014. After the water flows through the openings in the grate 1014, it flows through the roof panel section of the drainage pipe 1000*a*, which connects to the main drainage pipe 1000, and continues to travel downwards until it reaches the pipe 790 within the base floor panel 50. The pipe 790 channels rainwater to the pipe 814 that runs within the foundation 40, and which directs rainwater to the rainwater storage tank 804.

Figure 48:
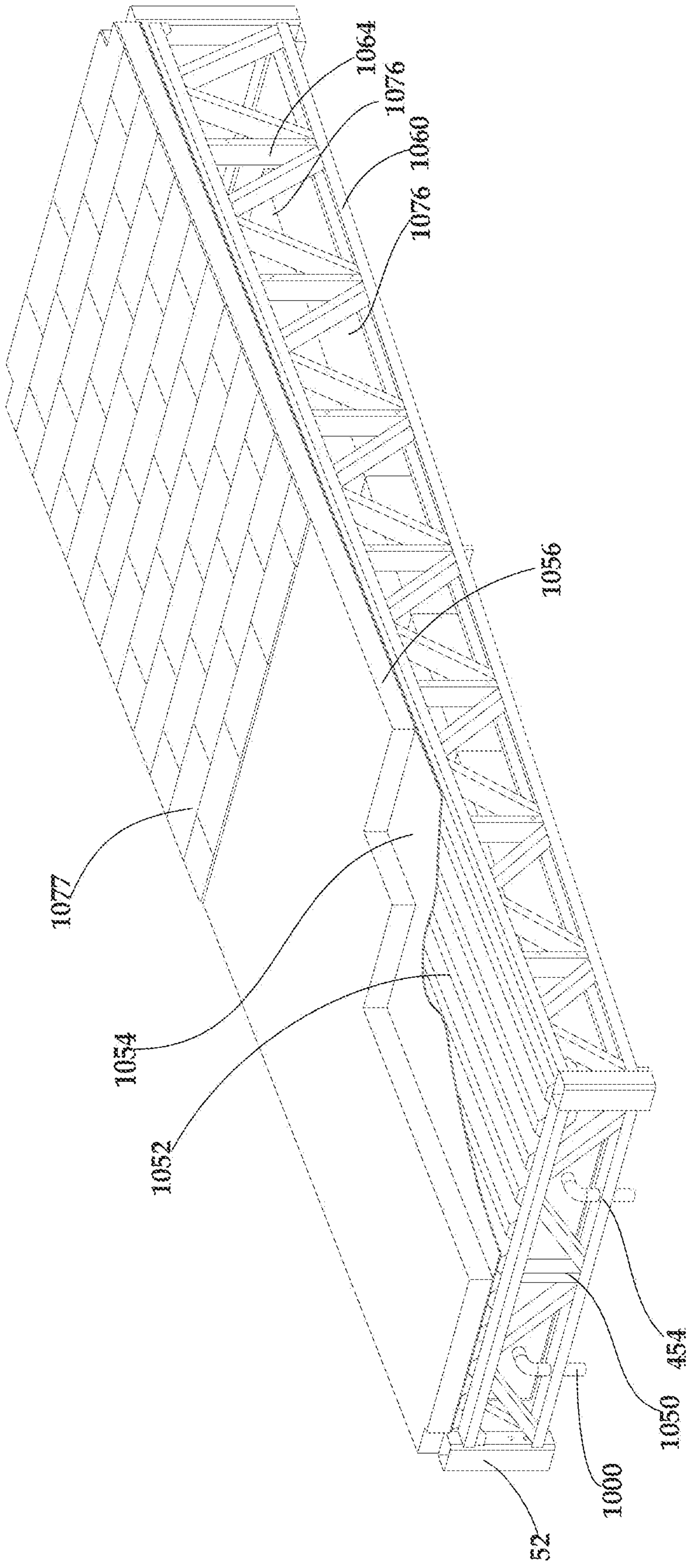
FIG. 48 is a cutaway diagram of a roof panel.

FIG. 48 describes a roof panel 70. The roof panel 70 is attached to the second ends 16 of the topmost load bearing columns 18 using the connectors 52. The roof panel 70 shown in FIG. 48 is made of latticework of trusses 1050, 1062 and 1064. The bottom surface of the roof panel 70 is covered with thermally insulating surface 1060, which also provides protection from noise and moisture. The top surface of the roof panel 70 is first covered with corrugated steel sheets. 1052. A membrane 1054 then covers the still sheets. The membrane 1054 is intended to create an air gap between the troughs of the corrugated layer 1052 and insulating foam layer 1056. The foam layer is then further covered with shingle 1058, such as the shingle made of charge gathering solar panels. The panel also contains a backup water storage tank 1076, a water feed pipe 454 and a drainage pipe 1000

Figure 49:
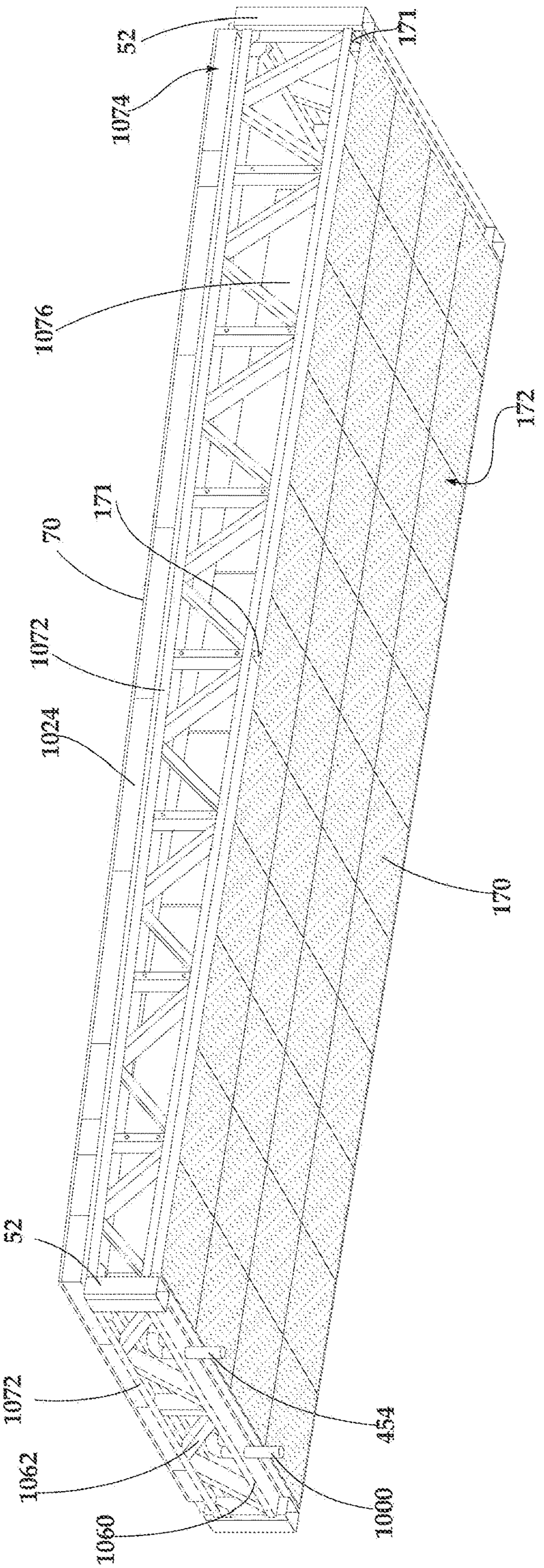
FIG. 49 is a bottom view of a fully assembled, roof panel.

FIG. 49 demonstrates the underside of the roof panel 70. Shown is the sky lighting surface 170 that is comprised of a plurality of LED lamps 171 covered by a membrane, preferably a stretchable fabric membrane. A plurality of LED lamps are installed as ceiling panes 172, which are preferably installed adjacently across the entire bottom surface 1060. This is done to create a ceiling wide lighting surface and to easily replace LED fixtures by swapping out panels rather than individuals lamps 1060 The sky lighting is mounted on beams attached to the lowest trusses 1060 of the panel 70. The same mounting methodology for the sky lighting system is employed for any other interfloor floor panel. The end 1072 is shown being lower than the opposite end 1074. The end 1072 links with another end 1072 of an adjacent roof panel 70 to create a drainage channel between two floor panels 70. The sky lighting surface 170 is preferably configured to maintain highly recommended and healthy Circadian rhythm lighting system, which is used to regulate wake sleep cycle and repeats on each rotation of the Earth roughly every 24 hours.

Figure 50:
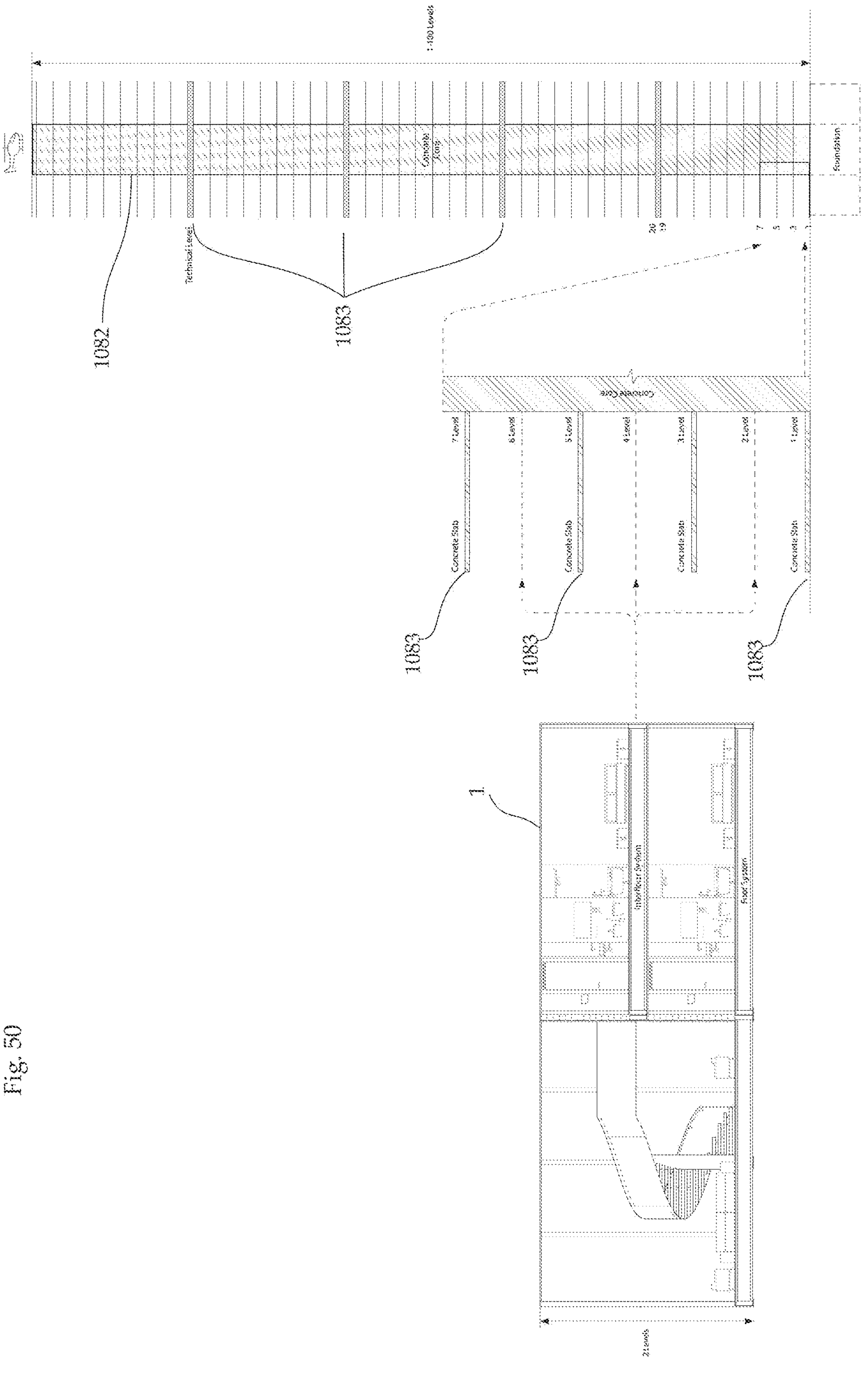
FIG. 50 is a diagram explaining the application of the disclosed construction methodologies in the context of high-rise construction.

FIG. 50 demonstrates how the disclosed floor panels may be assembled to form a high-rise building. A high-rise building will consist of floor concrete slabs 1083. The slabs surround a core of the building 1082. The slabs may be placed at every two or three floors, or at any other vertical distance apart. The space between the concrete slabs 1083 will be filled with floor panels 50 and interfloor panels 60. Once a core of the building 1082 is constructed, individual floor panels can then be delivered to form occupied and utility spaces of each floor. Connections between lateral and vertical panels can be established as described in the previous figures.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A door system for a prefabricated modular structure comprising; an air duct; said air duct further comprising two parallel upright ducts configured to adjacently connect to a wall: wherein a first ends of each of said two parallel upright ducts connecting to a floor panel; and wherein a second ends of each of said two parallel upright configured to connect to an interfloor floor panel; said air duct further comprising a horizontal beam spanning said two parallel ducts and connecting obliquely thereto below said second ends; a first portion of a door frame, said first portion forming a perimeter around one side of said air duct; a flange of said first portion, wherein said flange extending inwardly through aperture created by said air duct; a second portion forming a perimeter around a side of said air duct opposite said one side being covered by said first portion; a flange of said second portion extending forward through said aperture to couple with said flange of said first portion; and a door, said door hingingly attaching to said second portion.

2. The door system for a prefabricated modular structure of claim 1, wherein said air duct being in air communication, with said floor panel.

3. The door system of a prefabricated modular structure of claim 1, wherein said second ends of said air ducts being in air communication with an infloor floor panel.

4. The door system of a prefabricated modular structure of claim 3, wherein said horizontal beam further comprises a plurality of air vents, said air vents creating an air communication between an air volume moving through said air duct and external air.

5. The door system of a prefabricated modular structure of claim 4, wherein said first portion conceals a plurality of electronic devices wherein said electronic devices being electronically and networkly enabled through a decoupalable connection with said floor panel.

6. The door system of 6*a* prefabricated modular structure of claim 5, wherein said plurality of electronic devices may be controlled from a remote location through a wireless network or through a decouplable electronic or media connection with said floor panel.

7. The door system of a prefabricated modular structure of claim 6, wherein said plurality of electronic devices is made of a group consisting of: a wireless repeater, a wireless magnetic device charger, a usb connector, a magnetic tablet holder, said magnetic tablet holder being adjacent to said usb connector; wherein said door frame further comprising a power supply, retractable outlets; a switch to an aurora lighting system; a switch to an electrically triggered bolt locking; and a first portion of magnetic latch; said first portion of magnetic latch corresponding to a second portion of magnetic latch on said door, or any combination thereof.

8. The door system of claim 5, wherein said first portion and said second portions are reversible.

9. The door system of claim 1, wherein said door being formed of at least one layer of veneer surface attached to a central core.

10. A door system for a prefabricated modular structure comprising; an air duct; said air duct further comprising two parallel upright ducts configured to adjacently connect to a wall; wherein a first ends of each of said two parallel upright ducts connecting to a floor panel; and wherein a second ends of each of said two parallel upright configured to connecting to an interfloor floor panel; said air duct further comprising a horizontal beam spanning said two parallel ducts and connecting obliquely thereto below said second ends; a first portion of a door frame, said first portion forming a perimeter around one side of said air duct; a flange of said first portion, wherein said flange extending inwardly through aperture created by said air duct; a second portion forming a perimeter around a side of said air duct opposite said one side being covered by said first portion; a flange of said second portion said flange of said second portion extending forward through said aperture to couple with said flange of said first portion; and a door, said door hingingly attaching to said second portion; wherein one section of said duct being in first air channeling communication with said floor panel; and wherein a second section of said duct being in an independent air communication with said floor panel and with said interfloor floor panel above said floor panel.

11. The door system for a prefabricated modular structure of claim 10, wherein said horizontal beam further comprises a plurality of air vents, said air vents creating an air communication between an air volume moving through said air duct and external air.

12. The door system of a prefabricated modular structure of claim 11, wherein said first portion conceals a plurality of electronic devices wherein said electronic devices being electronically and networkly enabled through a decoupalable connection with said floor panel.

13. The door system of a prefabricated modular structure of claim 11, wherein said plurality of electronic devices may be controlled from a remote location through a wireless network or through a decouplable electronic or media connection with said floor panel.

14. The door system of a prefabricated modular structure of claim 11, wherein said plurality of electronic devices is made of a group consisting of: a wireless repeater, a wireless magnetic device charger, a usb connector, a magnetic tablet holder, said magnetic tablet holder being adjacent to said usb connector; wherein said door frame further comprising a power supply, retractable outlets; a switch to an aurora lighting system: a switch to an electrically triggered bolt locking; and a first portion of magnetic latch; said first portion of magnetic latch corresponding to a second portion of magnetic latch on said door, or any combination thereof.

15. The door system of claim 14, wherein said first portion and said second portion of said magnetic latch are reversible.

16. The door system of claim 10, wherein said door being formed of at least one layer of veneer surface attached to a central core.

17. In combination a door system for a prefabricated modular structure comprising; an air duct; said air duct further comprising two parallel upright ducts configured to adjacently connect to a wall; wherein a first ends of each of said two parallel upright ducts connecting to a floor panel; and wherein a second ends of each of said two parallel upright configured to connecting to an interfloor floor panel; said air duct further comprising a horizontal beam spanning said two parallel ducts and connecting obliquely thereto below said second ends; a first portion of a door frame, said first portion forming a perimeter around one side of said air duct; a flange of said first portion, wherein said flange extending inwardly through aperture created by said air duct; a second portion forming a perimeter around a side of said air duct opposite said one side being covered by said first portion; a flange of said second portion said flange of said second portion extending forward through said aperture to couple with said flange of said first portion; and a door, said door hingingly attaching to said second portion; wherein at least one section of said duct being in first air channeling communication with said floor panel; wherein said first or said second portions configured to detect security or household device control settings of an approaching user; and wherein said second portion capable of magnetically capturing a mobile device attached thereto.

18. The combination of claim 17, wherein security or household device control settings are detected using devices consisting of: a group of a video camera, a voice recorder, a biometric scanner, a retinal scanner, a behavior analyzer or any combination thereof.

19. The combination of claim 18, further comprising a coupler to decouplingly connect said devices to a circuitry of said floor system.

20. The combination of claim 17, wherein security and household device control settings may be controllable by said user remotely, through proximity to said door system, through voice commands, or any combination thereof.

* * * * *